United States Patent
Chun

(10) Patent No.: US 11,297,171 B2
(45) Date of Patent: Apr. 5, 2022

(54) METHOD AND APPARATUS FOR EDGE COMPUTING SERVICE

(71) Applicant: SAMSUNG ELECTRONICS CO., LTD., Suwon-si (KR)

(72) Inventor: Byonggon Chun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/899,955

(22) Filed: Jun. 12, 2020

(65) Prior Publication Data

US 2021/0075892 A1    Mar. 11, 2021

(30) Foreign Application Priority Data

Sep. 9, 2019   (KR) .................. 10-2019-0111559

(51) Int. Cl.
```
H04L 29/06      (2006.01)
H04L 29/08      (2006.01)
H04L 69/24      (2022.01)
H04L 67/141     (2022.01)
```
(52) U.S. Cl.
CPC ........... *H04L 69/24* (2013.01); *H04L 67/141* (2013.01)

(58) Field of Classification Search
CPC .............................. H04L 69/24; H04L 67/141
USPC ........................................................ 709/230
See application file for complete search history.

(56) References Cited

U.S. PATENT DOCUMENTS

| | | | |
|---|---|---|---|
| 8,655,974 B2 | 2/2014 | Frey et al. | |
| 8,769,036 B2 | 7/2014 | Frey et al. | |
| 9,940,240 B2 | 4/2018 | Metzler et al. | |
| 9,948,740 B1 | 4/2018 | Benson et al. | |
| 9,954,979 B2 | 4/2018 | Herr et al. | |
| 10,841,974 B1* | 11/2020 | Young | H04W 48/16 |
| 10,999,377 B2 | 5/2021 | Zhao et al. | |
| 2013/0007180 A1* | 1/2013 | Talpey | H04L 47/39 709/212 |
| 2015/0100667 A1 | 4/2015 | Freyria et al. | |
| 2015/0288763 A1* | 10/2015 | Kamper | H04L 69/161 709/212 |
| 2017/0085683 A1* | 3/2017 | Herr | H04L 43/0894 |
| 2017/0181211 A1* | 6/2017 | Han | H04L 47/122 |

(Continued)

FOREIGN PATENT DOCUMENTS

WO    2017/129742    8/2017

OTHER PUBLICATIONS

IEEE, A Cloud-Enabled Small Cell Architecture in 5G Networks for Broadcast/Multicast Services, Jun. 2019 (Year: 2019).*

(Continued)

*Primary Examiner* — Schquita D Goodwin
(74) *Attorney, Agent, or Firm* — Nixon & Vanderhye, P.C.

(57) ABSTRACT

An example method for an edge computing service, of identifying a network protocol to be used by an application client, includes: executing the application client; based on the application client being executed, transmitting a request message for verifying the network protocol to be used by the application client to an edge data network; receiving, from the edge data network, a response message indicating the network protocol to be used by the application client; updating a network protocol policy corresponding to the network protocol to be used by the application client to a data socket, based on the response message.

16 Claims, 22 Drawing Sheets

(56) References Cited

U.S. PATENT DOCUMENTS

| | | |
|---|---|---|
| 2018/0103126 A1 | 4/2018 | Ellison et al. |
| 2018/0146038 A1 | 5/2018 | Hefty |
| 2019/0173960 A1 | 6/2019 | Zhao et al. |
| 2019/0303345 A1* | 10/2019 | Zhu .......................... G06F 13/28 |
| 2020/0242258 A1* | 7/2020 | Smith ................... G06F 21/335 |
| 2020/0259797 A1* | 8/2020 | Fan .......................... H04L 67/28 |
| 2021/0007166 A1* | 1/2021 | Liao ...................... H04W 76/15 |
| 2021/0058329 A1* | 2/2021 | Perras ..................... H04L 45/24 |

OTHER PUBLICATIONS

Neeser et al., "SoftRDMA: Implementing iWARP over TCP kernel sockets", IBM J. Res. & Dev., vol. 54, No. 1, paper 5, Jan. 1, 2010, 16 pages.

[Online], https://github.com/zrlio/softiwarp-for-linux-rdma, printed Oct. 28, 2019, 2 pages.

[Online], https://github.com/zrlio/softiwarp-user-for-linux-rdma, printed Oct. 28, 2019, 3 pages.

[Online], https://github.com/zrlio/softiwarp, printed Oct. 28, 2019, 2 pages.

International Search Report and Written Opinion of the ISA for PCT/KR2019/014723 dated Jun. 8, 2020, 9 pages.

* cited by examiner

METHOD AND APPARATUS FOR EDGE COMPUTING SERVICE

CROSS-REFERENCE TO RELATED APPLICATION

This application is based on and claims priority under 35 U.S.C. § 119 to Korean Patent Application No. 10-2019-0111559, filed on Sep. 9, 2019, in the Korean Intellectual Property Office, the disclosure of which is incorporated by reference herein in its entirety.

BACKGROUND

1. Field

The disclosure relates to a method and apparatus for an edge computing service (for example, a multi-access edge computing (MEC) service).

2. Description of Related Art

Recently, edge computing technology for transmitting data by using an edge server has been discussed. The edge computing technology may include, for example, multi-access edge computing (MEC) or fog computing (FOC). The edge computing technology may denote a technology of providing data to an electronic apparatus through a separate server (hereinafter, an 'edge data network' or an 'MEC server') provided at a location geographically close to the electronic apparatus, for example, inside or near a base station. For example, an application requiring a low latency from among at least one application installed in the electronic apparatus may transmit or receive data through an edge server provided at a geographically close location instead of a server located in an external data network (DN) (for example, the Internet).

Recently, a service using the edge computing technology (hereinafter, referred to as an 'MEC-based service' or an 'MEC service') has been discussed and research and development on an electronic apparatus are being conducted to support the MEC-based service. For example, the application of the electronic apparatus may transmit or receive edge computing-based data on the edge server (or an application of the edge server) or an application layer.

As the research and development are being conducted to support the MEC-based service, methods for reducing a latency of an edge data network (for example, an MEC server) providing the MEC-based service are being discussed. For example, methods for reducing a process time in the edge data network are being discussed.

SUMMARY

Embodiments of the disclosure provide a method and apparatus for an edge computing service, based on the aforementioned discussion.

Embodiments of the disclosure also provide a method and apparatus for reducing a process time in an edge data network.

Embodiments of the disclosure also provide a method and apparatus for using a remote direct memory access (RDMA) protocol during a data exchange between an electronic apparatus and an edge data network.

Embodiments of the disclosure also provide a method and apparatus, performed by an edge data network, for selecting a network protocol to be used by an application client (for a user equipment (UE) application) of an electronic apparatus.

Embodiments of the disclosure also provide a method and apparatus, performed by an electronic apparatus, for verifying a network protocol to be used by an application client through an edge enabler client (or a multi-access edge computing (MEC) enabling layer (MEL)).

Embodiments of the disclosure also provide a method and apparatus for transmitting or receiving data between an electronic apparatus and an edge data network, according to a network protocol selected by an edge data network.

Additional aspects will be set forth in part in the description which follows and, in part, will be apparent from the description, or may be learned by practice of the presented embodiments of the disclosure.

According to an example embodiment of the disclosure, a method, performed by an electronic apparatus, of identifying a network protocol to be used by an application client includes: executing the application client; based on the the application client being executed, transmitting a request message for verifying the network protocol to be used by the application client to an edge data network; receiving, from the edge data network, a response message indicating the network protocol to be used by the application client; updating a network protocol policy corresponding to the network protocol to be used by the application client to a data socket, based on the response message; selecting a network socket corresponding to the network protocol to be used by the application client, by using the data socket; and receiving data generated with respect to the application client, from the edge data network by using the selected network socket.

According to another example embodiment of the disclosure, a method, performed by an edge data network, of identifying a network protocol to be used by an application client of an electronic apparatus includes: based on the electronic apparatus executing the application client, receiving, from the electronic apparatus, a request message for verifying a network protocol to be used by the application client; selecting the network protocol to be used by the application client from among a plurality of network protocols; transmitting a response message indicating the network protocol to be used by the application client to the electronic apparatus, based on a result of the selecting; and transmitting, to the electronic apparatus, data generated with respect to the application client by using a network socket selected based on the response message.

According to another example embodiment of the disclosure, an electronic apparatus for identifying a network protocol to be used by an application client includes: a network interface; a memory in which a plurality of instructions are stored; and a processor configured to execute the plurality of instructions to control the electronic apparatus to: execute the application client; based on the application client being executed, transmit, to an edge data network, a request message for verifying the network protocol to be used by the application client; receive, from the edge data network, a response message indicating the network protocol to be used by the application client; updating a network protocol policy corresponding to the network protocol to be used by the application client to a data socket, based on the response message; select a network socket corresponding to the network protocol to be used by the application client by using the data socket; and receive, from the edge data network, data generated with respect to the application client by using the selected network socket.

According to another example embodiment of the disclosure, an edge data network for identifying a network protocol to be used by an application client of an electronic apparatus includes: a network interface; a memory in which a plurality of instructions are stored; and a processor configured to execute the plurality of instructions to: based on the electronic apparatus executing the application client, receive, from the electronic apparatus, a request message for verifying the network protocol to be used by the application client; select the network protocol to be used by the application client from among a plurality of network protocols; transmit, to the electronic apparatus, a response message indicating the network protocol to be used by the application client, based on a result of the selection; and transmitting, to the electronic apparatus, data generated with respect to the application client by using a network socket selected based on the response message.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
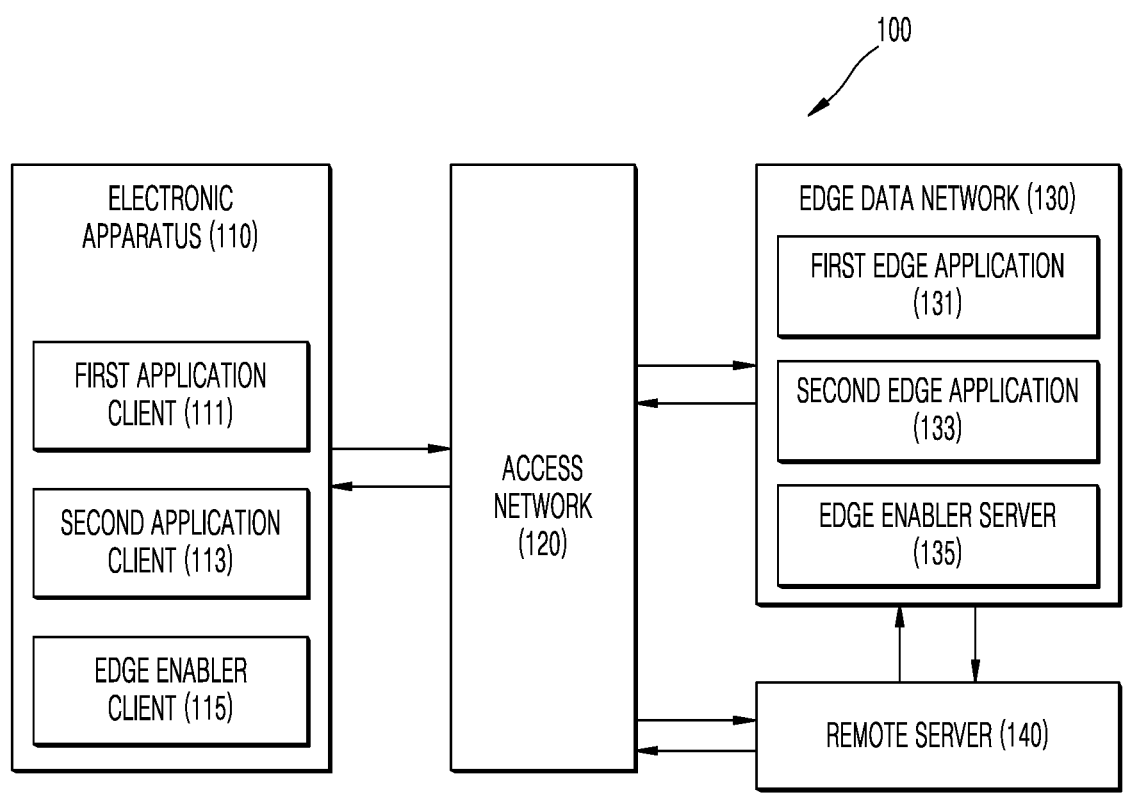
FIG. 1 is a diagram illustrating an example multi-access edge computing (MEC) technology in a network environment, according to an example embodiment of the disclosure.

Hereinafter, various example embodiments of the disclosure will be described in greater detail below with reference to the accompanying drawings.

In describing the embodiments of the disclosure, descriptions of technical contents that are well known in the technical field to which the disclosure belongs and are not directly related to the disclosure will be omitted. By omitting the unnecessary description, the gist of the disclosure may be more clearly conveyed without obscuring the subject matter.

For the same reasons, components may be exaggerated, omitted, or schematically illustrated in drawings for clarity. Also, the size of each component illustrated in the drawings does not necessarily reflect the actual size. In the drawings, like reference numerals denote like elements.

Advantages and features of one or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that this disclosure will be thorough and complete and will fully convey the concept of the present embodiments of the disclosure to one of ordinary skill in the art, and the disclosure will only be defined by the appended claims.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur in a different order. For example, two blocks illustrated successively may actually be executed substantially concurrently, or the blocks may sometimes be performed in a reverse order according to the corresponding function.

Here, the term "unit" used in the embodiments of the disclosure may refer, for example, to a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments of the disclosure, the "unit" may include at least one processor.

FIG. 1 is a diagram for describing a multi-access edge computing (MEC) technology in a network environment 100, according to an example embodiment of the disclosure.

Referring to FIG. 1, the network environment 100 of the disclosure may include an electronic apparatus 110, an access network (AN) 120, an edge data network 130, and a remote server 140. However, components included in the network environment 100 are not limited thereto.

According to an embodiment of the disclosure, each of the components included in the network environment 100 may denote a physical entity unit or denote a software or module unit capable of performing an individual function.

According to an embodiment of the disclosure, the electronic apparatus 110 may denote an apparatus used by a user. For example, the electronic apparatus 110 may be a terminal, a user equipment (UE), a mobile station, a subscriber station, a remote terminal, a wireless terminal, or a user device. Referring to FIG. 1, the electronic apparatus 110 may include a first application client (or an application client) 111, a second application client 113, and an edge enabler client (or an MEC enabling layer (MEL)) 115. The electronic apparatus 110 may perform a necessary task by using the edge enabler client 115 so as to use an MEC service. Details about the edge enabler client 115 will be described below.

According to an embodiment of the disclosure, the electronic apparatus 110 may perform a plurality of applications. For example, the electronic apparatus 110 may execute the first application client 111 and the second application client 113. The plurality of applications may require different network services based on at least one of a required data transmission speed, a latency (or a speed), reliability, the number of electronic apparatuses accessing a network, a network accessing cycle of the electronic apparatus 110, or average data usage. The different network services may include, for example, enhanced mobile broadband (eMBB), ultra-reliable and low latency communication (URLLC), or massive machine type communication (mMTC).

An application client of the electronic apparatus 110 may denote a basic application pre-installed in the electronic apparatus 110 or an application provided by a third party. In other words, the application client may denote a client application program driven in the electronic apparatus 110 for a particular application service. Several application clients may be driven in the electronic apparatus 110. At least one of the application clients may use a service provided from the edge data network 130. For example, the application client is an application installed in and executed by the electronic apparatus 110, and may provide a function of transmitting or receiving data through the edge data network 130. The application client of the electronic apparatus 110 may denote application software executed on the electronic apparatus 110 to use a function provided by at least one particular edge application.

According to an embodiment of the disclosure, the first and second application clients 111 and 113 of the electronic apparatus 110 may perform data transmission with the remote server 140 based on a required network service type or perform edge computing-based data transmission with the edge data network 130. For example, when the first application client 111 does not require low latency, the first application client 111 may perform data transmission with the remote server 140. As another example, when the second application client 113 requires low latency, the second application client 113 may perform MEC-based data transmission with the edge data network 130.

According to an embodiment of the disclosure, an application of the electronic apparatus 110 may be referred to as an application client, a client application (client app), or a UE application (UE app). For convenience of description, hereinafter, an application of the electronic apparatus 110 is referred to as an application client in the disclosure.

According to an embodiment of the disclosure, the AN 120 may provide a channel for wireless communication with the electronic apparatus 110. For example, the AN 120 may denote a radio access network (RAN), a base station, an eNodeB (eNB), a 5th generation (5G) node, a transmission/reception point (TRP), or a 5th generation nodeB (5GNB)

According to an embodiment of the disclosure, the edge data network 130 may denote a server accessed by the electronic apparatus 110 to use the MEC service. The edge data network 130 may be provided at a location geographically close to the electronic apparatus 110, for example, inside a base station or near the base station. According to an embodiment of the disclosure, the edge data network 130 may transmit or receive data to or from the electronic apparatus 110 without passing through an external data network (DN) (for example, the Internet). According to an embodiment of the disclosure, MEC may stand for multi-access edge computing or mobile-edge computing.

According to an embodiment of the disclosure, the edge data network 130 may be referred to as an MEC host, an edge computing server, a mobile edge host, an edge computing platform, or an MEC server. For convenience of description, hereinafter, the MEC server is referred to as the edge data network 130 in the disclosure. Referring to FIG. 1, the edge data network 130 may include a first edge application 131, a second edge application 133, and an edge enabler server (or an MEC platform (MEP)) 135. The edge enabler server 135 is a component providing the MEC service or performing traffic control by the edge data network 130, and details about the edge enabler server 135 will be described below.

According to an embodiment of the disclosure, the edge data network 130 may execute a plurality of applications. For example, the edge data network 130 may execute the first edge application 131 and the second edge application 133. According to an embodiment of the disclosure, an edge application may denote an application provided by a third party in an edge data network providing an MEC service and may be referred to as an edge application. The edge application may be used to form a data session with an application client so as to transmit or receive data related to the application client. In other words, the edge application may form the data session with the application client. According to an embodiment of the disclosure, a data session may denote a communication path formed such that an application client of the electronic apparatus 110 and an edge application of the edge data network 130 transmit or receive data.

According to an embodiment of the disclosure, an application of the edge data network 130 may be referred to as an MEC application (MEC app or ME app), an edge application server, or an edge application. For convenience of description, hereinafter, the application of the edge data network 130 is referred to as an edge application in the disclosure. Here, the edge application may denote an application server present in an edge data network.

According to an embodiment of the disclosure, the remote server 140 may provide content related to an application. For example, the remote server 140 may be managed by a content provider. According to an embodiment of the disclosure, the remote server 140 may transmit or receive data with the electronic apparatus 110 through an external DN (for example, the Internet).

Although not shown in FIG. 1, a core network (CN) and a DN may be present between the AN 120 and the edge data network 130. According to an embodiment of the disclosure, the DN may provide a service (for example, an Internet service or an IP multimedia subsystem (IMS) service) by transmitting or receiving data (or a data packet) to or from the electronic apparatus 110 through the CN and the AN 120.

For example, the DN may be managed by a communication provider. According to an embodiment of the disclosure, the edge data network 130 may be connected to the AN 120 or the CN through a DN (for example, a local DN).

According to an embodiment of the disclosure, based on the electronic apparatus 110 executing the first application client 111 or the second application client 113, the electronic apparatus 110 may access the edge data network 130 through the AN 120 to transmit or receive data for executing the application client. Here, when the data is transmitted from the electronic apparatus 110 to the edge data network 130 or from the edge data network 130 to the electronic apparatus 110, transmission latency may occur. According to an embodiment of the disclosure, the transmission latency may be referred to as end-to-end transmission latency.

According to an embodiment of the disclosure, when the electronic apparatus 110 and the edge data network 130 transmit or receive data, latency in the electronic apparatus 110, network transmission latency, and latency in the edge data network 130 may occur.

In the disclosure, a method of reducing latency in the edge data network 130 will be described. For example, the edge data network 130 may select a network protocol to be used by a UE application, the network protocol being capable of reducing the latency in the edge data network 130, from among a plurality of network protocols. According to an embodiment of the disclosure, the network protocol to be used by the UE application may denote a network protocol policy of the UE application.

The electronic apparatus 110 may select a network socket for communication, based on the network protocol selected by the edge data network 130. The electronic apparatus 110 may transmit or receive data to or from the edge data network 130 by using the selected network socket. Hereinafter, an example of a method for reducing the latency in the edge data network 130 will now be described with reference to FIG. 2.

Figure 2:
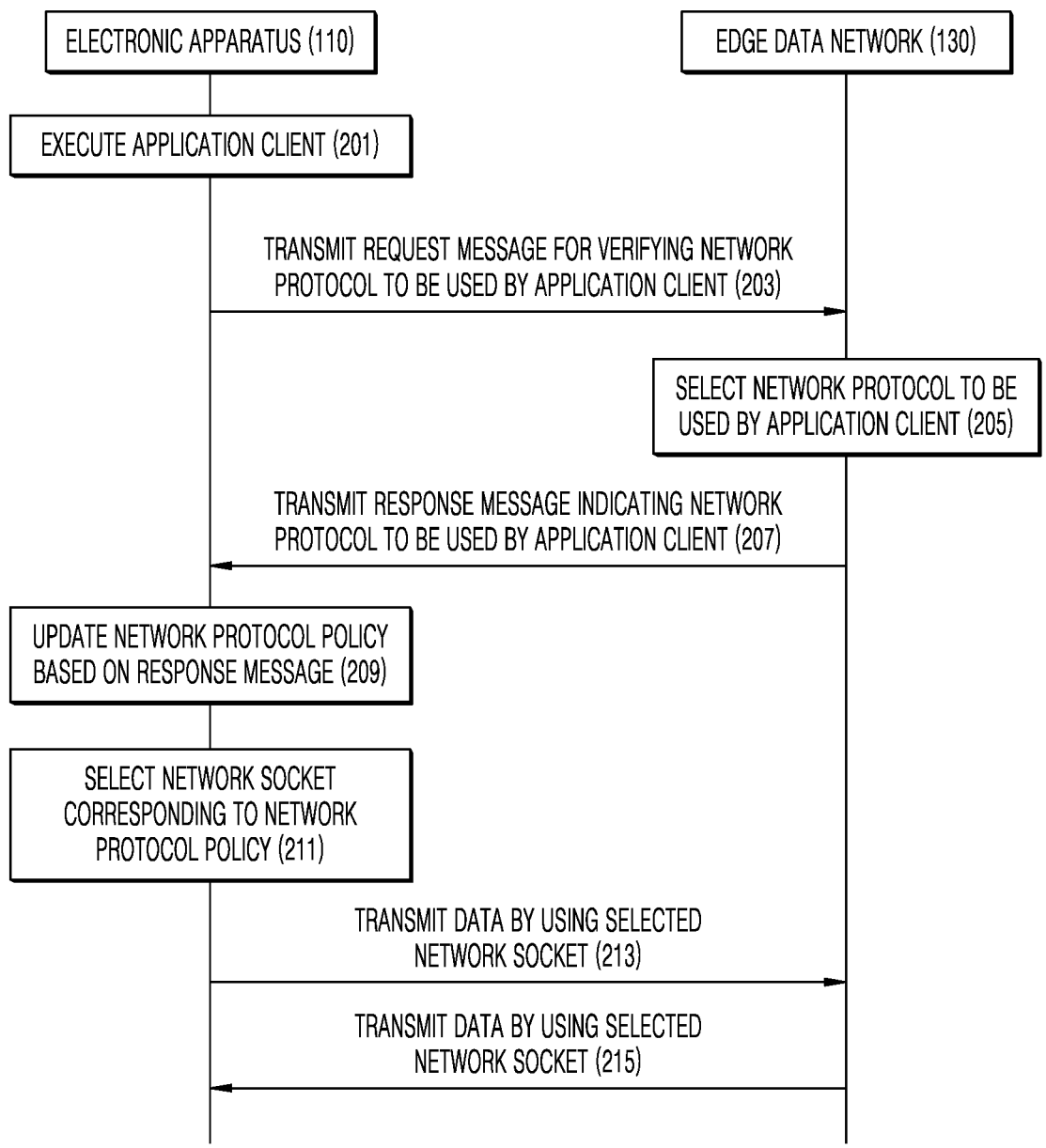
FIG. 2 is a sequence diagram showing an example operation procedure between an electronic apparatus and an edge data network, according to an example embodiment of the disclosure.

FIG. 2 is a sequence diagram showing an operation procedure between the electronic apparatus 110 and the edge data network 130, according to an example embodiment of the disclosure.

Referring to FIG. 2, in operation 201, the electronic apparatus 110 may execute an application client. For example, the electronic apparatus 110 may execute the first application client 111 (see FIG. 1) or the second application client 113 (see FIG. 1). According to an embodiment of the disclosure, the electronic apparatus 110 may execute a media streaming application to stream media content. Also, the electronic apparatus 110 may execute a game application to execute a game. The electronic apparatus 110 may access the edge data network 130 to receive data related to the executed application client.

In operation 203, the electronic apparatus 110 may transmit a request message for verifying a network protocol to be used by the application client. According to an embodiment of the disclosure, the network protocol may denote a mutually agreed rule (protocol) used to allow data to be transmitted and received between electronic apparatuses on a network. Accordingly, the network protocol may define when and how electronic apparatuses exchange data through a network. For example, the network protocol may include a transmission control protocol (TCP)/internet protocol (IP) (hereinafter, referred to as TCP), a remote direct memory access (RMDA) protocol, or a multipath transmission control protocol (MTCP).

Also, a network protocol policy may denote a type of a network protocol available to a particular application client.

For example, when the first application client 111 uses TCP, a network protocol policy of the first application client 111 may denote TCP. For example, when the second application client 113 uses an RDMA protocol, a network protocol policy of the second application client 113 may denote an RDMA protocol. Also, when a third application client uses MPTCP, a network protocol policy of the third application client may denote MPTCP.

According to an embodiment of the disclosure, the electronic apparatus 110 may transmit or receive data related to the executed application client by using a particular network protocol. Here, the electronic apparatus 110 may transmit a message to the edge data network 130 to verify the network protocol to be used by the application client. According to an embodiment of the disclosure, the message transmitted to the edge data network 130 may include information about a network protocol supported by the electronic apparatus 110. For example, the message may include information about whether the electronic apparatus 110 supports the RDMA protocol or information about whether the electronic apparatus 110 supports MPTCP. The information related to the electronic apparatus 110 (for example, the information about whether the electronic apparatus 110 supports the RDMA protocol or the information about whether the electronic apparatus 110 supports MPTCP) included in the message may be used by the edge data network 130 to select the network protocol to be used by the application client.

In operation 205, the edge data network 130 may select the network protocol to be used by the application client. In other words, the edge data network 130 may select the network protocol to be used by the application client from among a plurality of network protocols.

According to an embodiment of the disclosure, the plurality of network protocols may denote one or more network protocols available during communication between the electronic apparatus 110 and the edge data network 130. For example, the plurality of network protocols may include a TCP, an RDMA protocol, and MPTCP. The edge data network 130 may select one protocol among the TCP, the RDMA protocol, and MPTCP. According to an embodiment of the disclosure, the edge data network 130 may select the network protocol to be used by a UE application, based on whether an edge application and an edge data network (for example, the edge data network 130 or at least one other edge data network connected to the edge data network 130) supports the RDMA protocol, whether the electronic apparatus 110 supports the RDMA protocol, whether a network interface card (NIC) supporting the RDMA protocol is currently available, or a standard pre-set in the edge data network 130 in relation to selecting of the network protocol.

According to an embodiment of the disclosure, an NIC supporting the RDMA protocol may denote an NIC basically supporting TCP and additionally supporting the RDMA protocol.

According to an embodiment of the disclosure, an NIC supporting MPTCP may denote an NIC basically supporting TCP and additionally supporting MPTCP.

In operation 207, the edge data network 130 may transmit a response message indicating the network protocol to be used by the application client. For example, the edge data network 130 may transmit, to the electronic apparatus 110, the response message including the information about the network protocol to be used by the application client, the network protocol being selected in operation 205.

In operation 209, the electronic apparatus 110 may update the network protocol policy based on the response message. For example, the network protocol policy of the application client may be pre-set as TCP, but the network protocol to be used by the application client indicated by the response message may be the RDMA protocol or MPTCP. In this case, the electronic apparatus 110 may update the network protocol policy from TCP to the RDMA protocol or MPTCP. However, when the network protocol pre-set with respect to the application client and the network protocol to be used by the application client indicated by the response message are the same, operation 209 may be omitted.

In operation 211, the electronic apparatus 110 may select a network socket corresponding to the network protocol policy. For example, the electronic apparatus 110 may update the network protocol policy based on the response message and select the network socket corresponding to the updated network protocol policy. For example, the electronic apparatus 110 may select a network socket (for example, a TCP socket) corresponding to TCP, a network socket (for example, rSocket) corresponding to the RDMA protocol, or a network socket (for example, an MPTCP socket) corresponding to MPTCP. The network socket may be an internal endpoint or a node transmitting or receiving data in a communication network. According to an embodiment of the disclosure, the network socket may be implemented in a software manner in the electronic apparatus 110 to transmit or receive data in the communication network, and data may be exchanged between the electronic apparatus 110 and the edge data network 130 through the network socket.

In operation 213, the electronic apparatus 110 may transmit data by using the selected network socket. For example, when the selected network socket is the network socket corresponding to TCP, the electronic apparatus 110 may transmit the data to the edge data network 130 according to TCP. Also, when the selected network socket is the network socket corresponding to the RDMA protocol, the electronic apparatus 110 may transmit the data to the edge data network 130 according to the RDMA protocol. Also, when the selected network socket is the network socket corresponding to MPTCP, the electronic apparatus 110 may transmit the data to the edge data network 130 according to MPTCP.

In operation 215, the edge data network 130 may transmit the data by using the selected network socket. In other words, the edge data network 130 may transmit, to the electronic apparatus 110, the data generated with respect to the application client by using the network socket selected based on the response message. Also, the electronic apparatus 110 may receive, from the edge data network 130, the data generated with respect to the application client by using the selected network socket.

For example, when the selected network socket is the network socket corresponding to TCP, the edge data network 130 may transmit the data to the electronic apparatus 110 according to TCP. Also, when the selected network socket is the network socket corresponding to the RDMA protocol, the edge data network 130 may transmit the data to the electronic apparatus 110 according to the RDMA protocol. Also, when the selected network socket is the network socket corresponding to MPTCP, the edge data network 130 may transmit the data to the electronic apparatus 110 according to MPTCP.

According to an embodiment of the disclosure, based on the edge application used to form the data session with the application client being generated by the edge data network 130, the electronic apparatus 110 may receive the generated data from the edge data network 130 through the data session generated by using the edge application.

According to an embodiment of the disclosure, operation 209 may be performed before operation 201. In other words, the electronic apparatus 110 may select the network socket before the application client is executed. For example, the electronic apparatus 110 may verify the network protocol to be used by the electronic apparatus 110 when first accessing the network. Also, the electronic apparatus 110 may update the pre-set network protocol of the application client according to the verified network protocol. Also, the electronic apparatus 110 may select the network socket corresponding to the updated network protocol.

As described with reference to FIG. 2, the electronic apparatus 110 may request the edge data network 130 for verification to verify the network protocol to be used by a UE application before transmitting or receiving the data related to the application client. The edge data network 130 may select the RDMA protocol as the network protocol to be used by the application client according to various standards. In this case, the latency in the edge data network 130 may be reduced because the electronic apparatus 110 and the edge data network 130 transmit and receive data through the RDMA protocol. Hereinafter, an example of a plurality of edge data networks through which an edge application is distributable according to an embodiment of the disclosure will be described with reference to FIG. 3.

Figure 3:
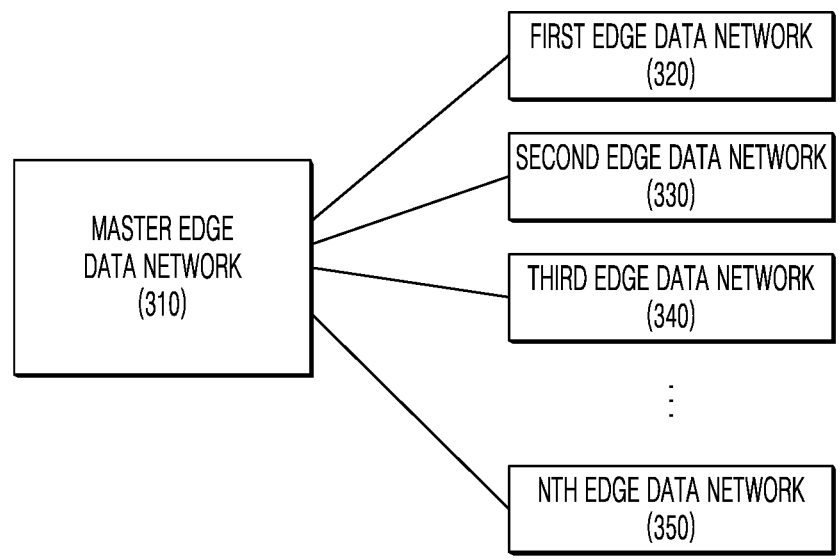
FIG. 3 illustrates an example of a plurality of edge data networks included in an edge system, according to an example embodiment of the disclosure.

FIG. 3 illustrates an example of a plurality of edge data networks included in an edge system, according to an example embodiment of the disclosure.

Referring to FIG. 3, the edge system according to an embodiment of the disclosure may be arranged in a network of a communication distributer and used for MEC-based data transmission. According to an embodiment of the disclosure, the edge system may be referred to as an MEC system. The edge system may include a data network supporting distributed deployment of an edge hosting environment.

According to an embodiment of the disclosure, a plurality of edge data networks may be clustered in the edge system. For example, the edge system may include the plurality of edge data networks. Referring to FIG. 3, the edge system may include a master edge data network 310, a first edge data network 320, a second edge data network 330, a third edge data network 340, and an Nth edge data network 350.

According to an embodiment of the disclosure, when the plurality of edge data networks is clustered in the edge system, the edge system may include one server designated as a management server. According to an embodiment of the disclosure, the management server may denote a master server managing clustered edge data networks. For example, in the example of FIG. 3, the edge system may include the master edge data network 310 as the master server. The master edge data network 310 may manage at least one other edge data network (for example, the first edge data network 320, the second edge data network 330, the third edge data network 340, or the Nth edge data network 350) connected to the master edge data network 310.

According to an embodiment of the disclosure, a server driving an edge application may be referred to as an edge data network, an MEC host, a mobile edge host, an MEC application server, an edge application server, or an edge server. For convenience of description, hereinafter, the server driving the edge application is referred to as the edge data network in the disclosure related to FIG. 3.

According to an embodiment of the disclosure, a server for managing an edge data network may be referred to as a master edge data network, an edge enabler server, or a mobile edge platform manager. For convenience of description, hereinafter, the server for managing the edge data network is referred to as the master edge data network in the disclosure related to FIG. 3.

According to an embodiment of the disclosure, the master edge data network 310 may select at least one edge data network to which to distribute the edge application. According to an embodiment of the disclosure, the at least one edge data network may denote at least one of the master edge data network 310 (for example, the edge data network 130) or at least one other edge data network (for example, the first edge data network 320, the second edge data network 330, the third edge data network 340, or the Nth edge data network 350) connected to the master edge data network 310.

For example, the master edge data network 310 may select at least one edge data network from among the master edge data network 310 and the at least one other edge data network (for example, the first edge data network 320, the second edge data network 330, the third edge data network 340, or the Nth edge data network 350) connected to the master edge data network 310. The master edge data network 310 may distribute the edge application used to form a data session with an application client of the electronic apparatus 110, to the selected at least one edge data network. According to an embodiment of the disclosure, the edge data network 130 of FIG. 1 may denote the master edge data network 310. In other words, in order to select the edge application used to form the data session with the application client executed in the electronic apparatus 110, the edge data network 130 may select the edge data network 130 or at least one other edge data network, and distribute the edge application to the selected edge data network.

According to an embodiment of the disclosure, the master edge data network 310 may monitor and store information related to standards used while the network protocol to be used by the application client is selected (for example, whether the RDMA protocol of the edge data network or edge application is supported, whether the RDMA protocol of the electronic apparatus 110 is supported, and whether NIC supporting the RDMA protocol is currently available). Also, based on the above standards being changed, the master edge data network 310 may update the stored information related to the standards. Here, the updating may be performed periodically or aperiodically.

In the disclosure, a configuration of the edge data network included in the edge system is not limited to that shown in FIG. 3, and the edge system may include edge data networks having various connection structures. For example, the edge system may include a plurality of clustered edge data networks. The plurality of clustered edge data networks may each include a master edge data network.

Hereinafter, a specific method by which an edge data network selects a network protocol to be used by an application client will be described with reference to FIGS. 4 through 6.

Figure 4:
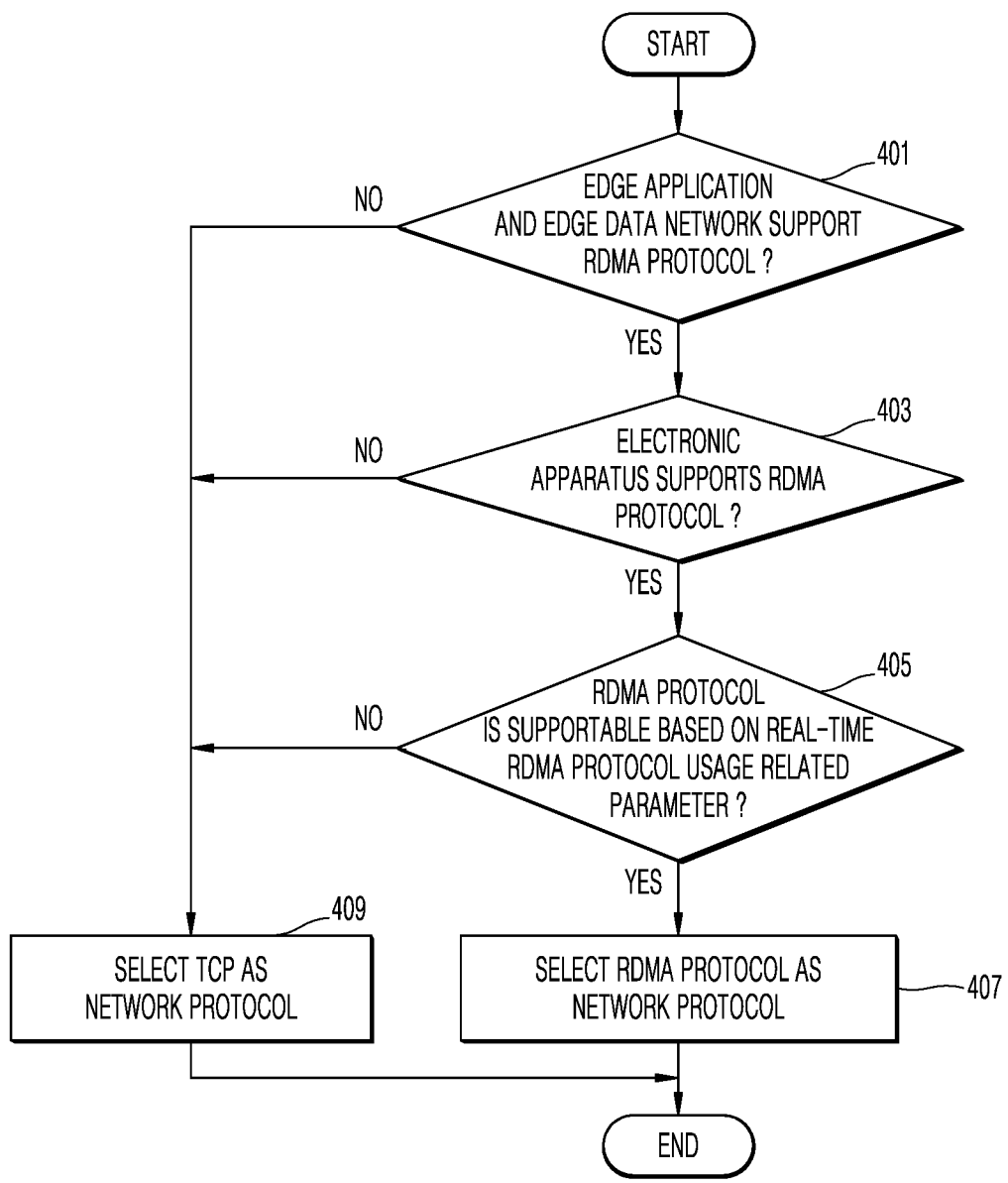
FIG. 4 is a flowchart of a method, performed by an edge data network, of selecting a network protocol to be used by an application client, according to an example embodiment of the disclosure.

FIG. 4 is a flowchart of a method, performed by the edge data network 130, of selecting a network protocol to be used by an application client, according to an example embodiment of the disclosure. Operations 401 through 409 of FIG. 4 may be included in operation 205 of FIG. 2.

Although not shown in FIG. 4, the edge data network 130 may receive a request message for verifying the network protocol to be used by the application client before operation 401 is performed. For example, the request message for verifying the network protocol may be transmitted to the edge data network 130 based on an application client being executed, when a certain period of time is passed periodically after an application client is executed, based on a new application client being executed after a pre-executed application client is ended, based on the AN 120 being accessed by the electronic apparatus 110 changing, or based on a service relocation such as handover occurring. In other words, the request message for verifying the network protocol may be transmitted to the edge data network 130, based on a real-time change like the above conditions, not only when the electronic apparatus 110 first accesses the edge data network 130 but also when the electronic apparatus 110 and the edge data network 130 communicate with each other. The edge data network 130 may start operation 401 described below after receiving the request message for verifying the network protocol.

According to an embodiment of the disclosure, the network protocol to be used by the application client may include TCP, an RDMA protocol, or MPTCP. The edge data network 130 may receive a message transmitted by the electronic apparatus 110 so as to verify the network protocol to be used by the application client from among TCP, the RDMA protocol, or MPTCP. According to an embodiment of the disclosure, the message transmitted to the edge data network 130 may include information about a network protocol supported by the electronic apparatus 110. For example, the message may include information about whether the electronic apparatus 110 supports the RDMA protocol or information about whether the electronic apparatus 110 supports MPTCP. The information related to the electronic apparatus 110 (for example, the information about whether the electronic apparatus 110 supports the RDMA protocol or the information about whether the electronic apparatus 110 supports MPTCP) included in the message may be used by the edge data network 130 to select the network protocol to be used by the application client.

Referring to FIG. 4, in operation 401, the edge data network 130 may verify whether an edge application and the edge data network 130 support the RDMA protocol. Also, the edge data network 130 may verify whether the edge application and the edge data network 130 support MPTCP. According to an embodiment of the disclosure, the edge data network 130 may select an edge data network to which to distribute the edge application used to form a data session with the application client.

In other words, the edge data network 130 is the master edge data network 310 (see FIG. 3), and may determine another edge data network (for example, the first edge data network 320, the second edge data network 330, the third edge data network 340, or the Nth edge data network 350) connected to the master edge data network 310, based on a pre-set standard related to distribution of the edge application. Then, the edge application may be distributed to the determined edge data network. According to an embodiment of the disclosure, the pre-set standard related to the distribution of the edge application may denote information about to which edge data network a particular edge application is distributed.

According to an embodiment of the disclosure, the edge data network to which the edge application is distributed may be the other edge data network (for example, the first edge data network 320, the second edge data network 330, the third edge data network 340, or the Nth edge data network 350) connected to the master edge data network 310. Alternatively, the edge data network 130 itself may be selected as the edge data network to which the edge application is distributed, according to the pre-set standard related to the distribution of the edge application. In this case, the edge data network 130 may distribute the edge application to the edge data network 130 itself.

Also, the edge application may be distributed to the other edge data network connected to the master edge data network 310 based on the other edge data network (for example, the first edge data network 320, the second edge data network 330, the third edge data network 340, or the Nth edge data network 350) connected to the edge data network 130 that is the master edge data network 310 (see FIG. 3) being selected as the edge data network to which the edge application is distributed, according to the pre-set standard related to the distribution of the edge application.

The edge data network 130 may verify whether the edge application supports the RDMA protocol or supports MPTCP. Also, the edge data network 130 may verify whether the edge data network to which the edge application is distributed supports the RDMA protocol or MPTCP.

According to an embodiment of the disclosure, the edge application supporting the RDMA protocol may denote that software (for instructions) for transmitting or receiving data via the RDMA protocol is included in the edge application. Also, according to an embodiment of the disclosure, the edge application supporting the RDMA protocol may denote that the edge application may invoke software for transmitting or receiving data via the RDMA protocol and use the invoked software.

Also, according to an embodiment of the disclosure, the edge application supporting MPTCP may denote that software for transmitting or receiving data via MPTCP is included in the edge application. Also, according to an embodiment of the disclosure, the edge application supporting MPTCP may denote that the edge application may invoke the software for transmitting or receiving data via MPTCP and use the invoked software.

Also, according to an embodiment of the disclosure, the edge data network supporting the RDMA protocol may denote that an NIC supporting the RDMA protocol is included in the edge data network.

Also, according to an embodiment of the disclosure, the edge data network supporting MPTCP may denote that an NIC supporting MPTCP is included in the edge data network.

The edge data network 130 may perform operation 409 when the edge application does not support the RDMA protocol or when the edge data network to which the edge application is distributed does not support the RDMA protocol, based on a result of the verification. The edge data network 130 may perform operation 403 when the edge application supports the RDMA protocol and the edge data network to which the edge application is distributed supports the RDMA protocol, based on the result of the verification.

Although not shown in FIG. 4, the edge data network 130 may perform operation 409 when the edge application does not support MPTCP or when the edge data network to which the edge application is distributed does not support MPTCP, based on the result of the verification. When the edge application supports MPTCP and the edge data network to which the edge application is distributed supports MPTCP, based on the result of the verification, the edge data network 130 may verify whether the electronic apparatus 110 supports MPTCP.

In operation 403, the edge data network 130 may verify whether the electronic apparatus 110 supports the RDMA protocol. Although not shown in FIG. 4, the edge data network 130 may verify whether the electronic apparatus 110 supports MPTCP. According to an embodiment of the disclosure, information about whether the electronic apparatus 110 supports the RDMA protocol or MPTCP may be included in the request message transmitted from the electronic apparatus 110 to the edge data network 130.

For example, information indicating that the electronic apparatus 110 supports the RDMA protocol may be included in the request message when an NIC supporting the RDMA protocol is included in the electronic apparatus 110 or when the RDMA protocol is implemented in a software manner in the electronic apparatus 110. Information indicating that the electronic apparatus 110 is unable to support the RDMA protocol may be included in the request message when the NIC supporting the RDMA protocol is not included in the electronic apparatus 110 or when the RDMA protocol is not implemented in a software manner in the electronic apparatus 110.

Also, for example, information indicating that the electronic apparatus 110 supports MPTCP may be included in the request message when an NIC supporting MPTCP is included in the electronic apparatus 110 or when MPTCP is implemented in a software manner in the electronic apparatus 110. Information indicating that the electronic apparatus 110 is unable to support MPTCP may be included in the request message when the NIC supporting MPTCP is not included in the electronic apparatus 110 or when MPTCP is not implemented in a software manner in the electronic apparatus 110.

When the electronic apparatus 110 is unable to support the RDMA protocol based on a result of verifying the request message, the edge data network 130 may perform operation 409. When the electronic apparatus 110 is able to support the RDMA protocol based on the result of verifying the request message, the edge data network 130 may perform operation 405.

According to an embodiment of the disclosure, when the electronic apparatus 110 is unable to support MPTCP based on the result of verifying the request message, the edge data network 130 may perform operation 409. When the electronic apparatus 110 is able to support MPTCP based on the result of verifying the request message, the edge data network 130 may verify whether the NIC supporting MPTCP is available.

In operation 405, the edge data network 130 may verify whether the edge data network 130 supports the RDMA protocol based on a real-time RDMA protocol usage related parameter.

For example, the real-time RDMA protocol usage related parameter may include a parameter related to whether an NIC supporting the RDMA protocol included in the edge data network 130 is available, a parameter related to a central processing unit (CPU) of the edge data network 130, parameters related to a rate per second, a total packet error, a dropped rate, and a count of RX/TX for each NIC of the edge data network 130, and a parameter related to a latency required by the application client. The edge data network 130 may perform operation 409 when the edge data network 130 is unable to support the RDMA protocol, based on the real-time RDMA protocol usage related parameter. Alternatively, the edge data network 130 may perform operation 407 when the edge data network 130 is able to support the RDMA protocol, based on the real-time RDMA protocol usage related parameter.

According to an embodiment of the disclosure, the edge data network 130 may verify whether the NIC supporting the RDMA protocol is available. In other words, the edge data network 130 may determine whether to use the RDMA protocol by verifying an available bandwidth of the NIC supporting the RDMA protocol in the edge data network to which the edge application is distributed. Alternatively, although not shown in FIG. 4, the edge data network 130 may verify whether the NIC supporting MPTCP is available.

For example, when the edge data network to which the edge application is distributed supports the RDMA protocol, the edge data network to which the edge application is distributed may include a NIC supporting the RDMA protocol. However, even when the edge data network to which the edge application is distributed includes the NIC supporting the RDMA protocol, the NIC supporting the RDMA protocol may be currently in use. Accordingly, the edge data network 130 may verify a currently available NIC among NICs supporting the RDMA protocol provided by the edge data network to which the edge application is distributed. Also, according to an embodiment of the disclosure, the edge data network 130 may verify a currently available NIC among NICs supporting MPTCP provided by the edge data network to which the edge application is distributed.

When the NIC supporting the RDMA protocol is not currently available as a result of the verification, the edge data network 130 may perform operation 409. When the NIC supporting the RDMA protocol is currently available as the result of the verification, the edge data network 130 may perform operation 407. According to an embodiment of the disclosure, operation 403 may be performed before operation 401 or after operation 405.

According to an embodiment of the disclosure, when the NIC supporting the MPTCP is not currently available as the result of the verification, the edge data network 130 may perform operation 409. When the NIC supporting MPTCP is currently available as the result of the verification, the edge data network 130 may select the MPTCP as the network protocol.

In operation 407, the edge data network 130 may select the RDMA protocol as the network protocol. For example, when edge application and the edge data network to which the edge application is distributed support the RDMA protocol, the electronic apparatus 110 supports the RDMA protocol, and the edge data network 130 is able to support the RDMA protocol based on the real-time RDMA protocol usage related parameter (for example, when the NIC supporting the RDMA protocol is currently available in the edge data network to which the edge application is distributed), the edge data network 130 may determine and update the network protocol to be used by the application client to the RDMA protocol.

For example, when the current edge data network is able to perform communication using the RDMA protocol and user space CPU occupancy is not high, the edge data network 130 may perform the communication using the RDMA protocol on a newly distributed edge application such that system occupancy of the CPU is not further increased.

In operation 409, the edge data network 130 may select TCP as the network protocol. For example, when the edge application and the edge data network to which the edge application is distributed do not support the RDMA protocol, the electronic apparatus 110 does not support the RDMA protocol, and the edge data network 130 is not able to support the RDMA protocol based on the real-time RDMA protocol usage related parameter (for example, when the NIC supporting the RDMA protocol is not currently available in the edge data network to which the edge application is distributed), the edge data network 130 may determine and update the network protocol to be used by the application client to TCP.

For example, when the current edge data network is unable to perform communication using the RDMA protocol, the edge data network 130 may perform communication using TCP on the newly distributed edge application.

Although not shown in FIG. 4, the edge data network 130 may respond with the selected network protocol. For example, the edge data network 130 may select the RDMA protocol as the network protocol in operation 407 or select TCP as the network protocol in operation 409. Also, although not shown in FIG. 4, the edge data network 130 may select MPTCP as the network protocol. The edge data network 130 may transmit, to the electronic apparatus 110, a response message including information about the selected network protocol. The electronic apparatus 110 may transmit or receive data to or from the edge data network 130 based on the received network protocol.

According to an embodiment of the disclosure, the response message may further include information determined in operations 401 and 405 in addition to information about a network protocol policy selected in operations 407 and 409. For example, the response message may include information about whether the edge application supports the RDMA protocol, information abut whether the edge data network to which the edge application is distributed supports the RDMA protocol, or information about whether the NIC supporting the RDMA protocol is available in the edge data network to which the edge application is distributed.

In FIG. 4 described above, the electronic apparatus 110 simply transmits the request message and the edge data network 130 determines the network protocol to be used by the application client. Hereinafter, an example in which an edge application is distributed to an edge data network based on a standard related to selecting of a network protocol and a network protocol to be used by an application client is selected based on whether NIC supporting an RDMA protocol or an NIC supporting an MPTCP is currently available in the edge data network to which the edge application is distributed will be described with reference to FIGS. 5 and 6.

Figure 5:
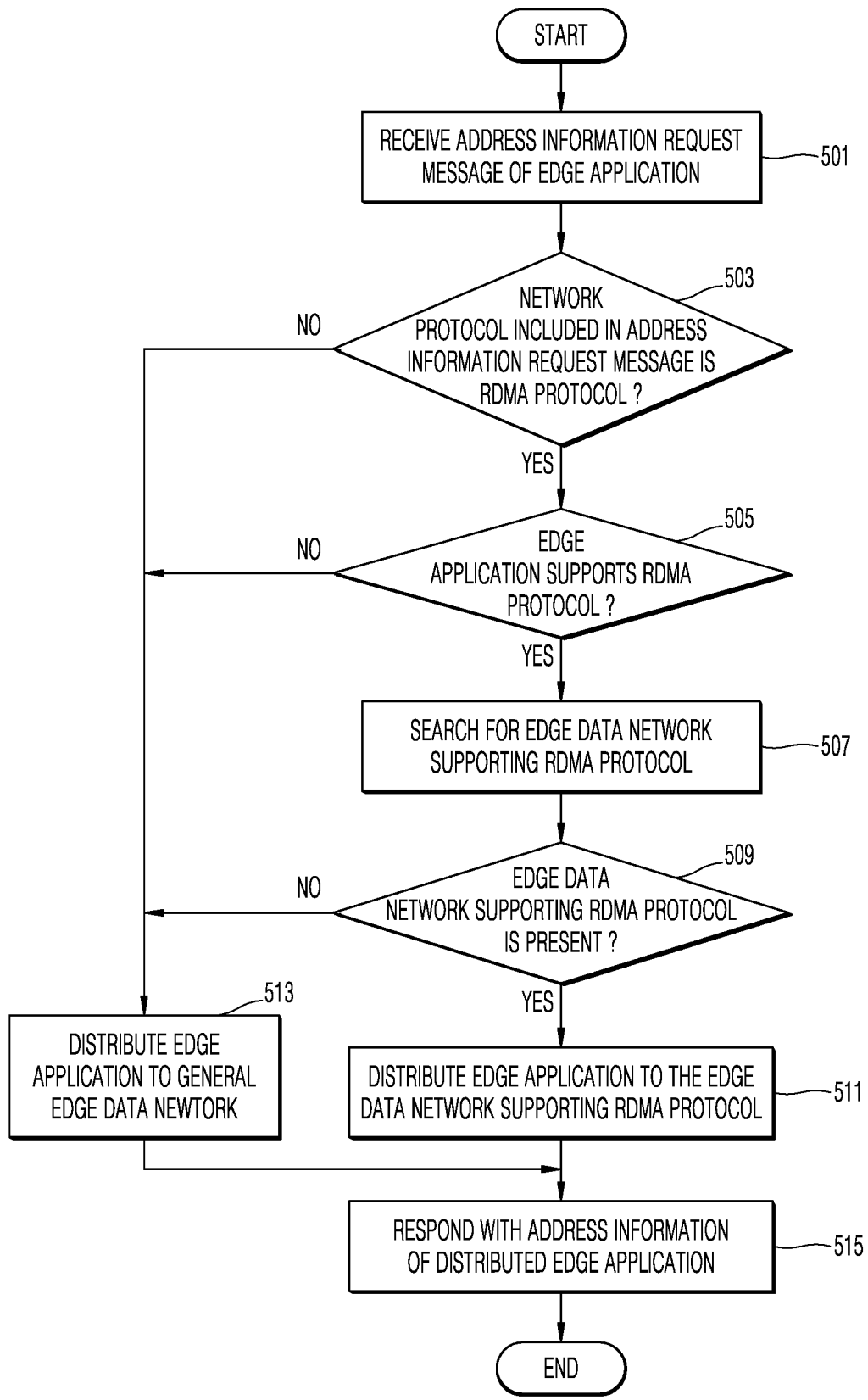
FIG. 5 is a flowchart of a method, performed by an edge data network, of distributing an edge application, according to an example embodiment of the disclosure.

FIG. 5 is a flowchart of a method, performed by the edge data network 130, of distributing the edge application, according to an example embodiment of the disclosure. The edge data network 130 for performing the method of FIG. 5 may be the master edge data network 310 of FIG. 3. Operations 501 through 515 of FIG. 5 may be performed before operation 205 of FIG. 2.

Referring to FIG. 5, in operation 501, the edge data network 130 may receive an address information request message of an edge application. According to an embodiment of the disclosure, the address information request message of the edge application may denote a message of an edge data network configuration server requesting the edge data network 130 to distribute an edge application corresponding to an application client, after the electronic apparatus 110 transmits a message for an app context generation request related to the application client to the edge data network configuration server (or an MEC management proxy (MMP)).

According to an embodiment of the disclosure, the address information request message of the edge application may include information indicating a standard related to selecting of a network protocol. For example, the electronic apparatus 110 may add information about a preferred network protocol to the address information request message. According to an embodiment of the disclosure, the preferred network protocol may denote a network protocol capable of reducing latency in the edge data network 130 when the electronic apparatus 110 executes the application client.

According to an embodiment of the disclosure, the standard related to the selecting of the network protocol may be pre-determined by a manufacturer of the electronic apparatus 110, a developer of the application client, or a mobile carrier, and stored in the electronic apparatus 110. Alternatively, the information indicating the standard related to the selecting of the network protocol may be stored in the edge data network configuration server requesting the edge data network 130 to distribute the edge application.

In operation 503, the edge data network 130 may verify whether the network protocol included in the address information request message is the RDMA protocol. For example, the address information request message may include information indicating TCP or the RDMA protocol. Accordingly, the edge data network 130 may verify the information included in the address information request message to verify whether the network protocol indicated by the standard related to the selecting of the network protocol is the RDMA protocol. Also, the edge data network 130 may verify whether the network protocol included in the address information request message is MPTCP.

Based on the network protocol included in the address information request message being determined not to be the RDMA protocol as a result of the verification, the edge data network 130 may perform operation 513. Based on the network protocol included in the address information request message being determined to be the RDMA protocol as the result of the verification, the edge data network 130 may perform operation 505.

Although not shown in FIG. 5, according to an embodiment of the disclosure, based on the network protocol included in the address information request message being determined not to be MPTCP as the result of the verification, the edge data network 130 may perform operation 513. Based on the network protocol included in the address information request message being determined to be MPTCP as the result of the verification, the edge data network 130 may verify whether the edge application supports MPTCP.

In operation 505, the edge data network 130 may verify whether the edge application supports the RDMA protocol. For example, the edge data network 130 may verify whether the edge application supports the RDMA protocol by verifying metadata included in an edge application used to form a data session with the application client executed by the electronic apparatus 110. According to an embodiment of the disclosure, the metadata included in the edge application may denote a virtual network function (VNF) descriptor (VNFD), a container descriptor, or a virtual machine (VM) descriptor. Also, the edge data network 130 may further verify whether the edge application supports MPTCP.

Based on the edge application being determined to not support the RDMA protocol as a result of the verification, the edge data network 130 may perform operation 513. Based on the edge application being determined to support the RDMA protocol as the result of the verification, the edge data network 130 may perform operation 507.

Although not shown in FIG. 5, according to an embodiment of the disclosure, based on the edge application being determined to not support MPTCP as the result of the verification, the edge data network 130 may perform operation 513. Based on the edge application being determined to support MPTCP as the result of the verification, the edge data network 130 may search for an edge data network supporting MPTCP.

In operation 507, the edge data network 130 may search for an edge data network supporting the RDMA protocol.

For example, the edge data network 130 is the master edge data network 310 and may search for the edge data network supporting the RDMA protocol from among the edge data network 130 and edge data networks (for example, the first edge data network 320, the second edge data network 330, the third edge data network 340, and the Nth edge data network 350) connected to the edge data network 130. Also, the edge data network 130 may search for an edge data network supporting MPTCP.

In operation 509, the edge data network 130 may verify whether the edge data network supporting the RDMA protocol is present. For example, it may be verified whether the edge data network supporting the RDMA protocol is present from among the edge data network 130 and the edge data networks (for example, the first edge data network 320, the second edge data network 330, the third edge data network 340, and the Nth edge data network 350) connected to the edge data network 130, as a result of the searching in operation 507. Here, the edge data network supporting the RDMA protocol may denote an edge data network including an NIC supporting the RDMA protocol. Also, the edge data network 130 may further verify whether an edge data network supporting MPTCP is present.

Based on the edge data network supporting the RDMA protocol being determined to not be present as a result of the verification, the edge data network 130 may perform operation 513. Based on the edge data network supporting the RDMA protocol is determined to be present as the result of the verification, the edge data network 130 may perform operation 511. According to an embodiment of the disclosure, operations 507 and 509 may be performed as one operation.

Although not shown in FIG. 5, according to an embodiment of the disclosure, based on the edge data network supporting MPTCP being determined to not be present as the result of the verification, the edge data network 130 may perform operation 513. Based on the edge data network supporting MPTCP being determined to be present as the result of the verification, the edge data network 130 may distribute the edge application to the edge data network supporting MPTCP.

In operation 511, the edge data network 130 may distribute the edge application to the edge data network supporting the RDMA protocol. For example, the edge data network 130 may verify the edge data network supporting the RDMA protocol via operations 507 and 509. Accordingly, the edge data network 130 is the master edge data network 310 and may distribute the edge application to the edge data network supporting the RDMA protocol from among the edge data network 130 and edge data networks (for example, the first edge data network 320, the second edge data network 330, the third edge data network 340, and the Nth edge data network 350) connected to the edge data network 130.

In operation 513, the edge data network 130 may distribute the edge application to a general edge data network. For example, based on the network protocol included in the address information request message not being the RDMA protocol, the edge application not supporting the RDMA protocol, and the edge data network supporting the RDMA protocol not being present, the edge data network 130 may distribute the edge application to any edge data network among the plurality of edge data networks (for example, the edge data network 130, the first edge data network 320, the second edge data network 330, the third edge data network 340, and the Nth edge data network 350). A standard of the edge data network 130 distributing the edge application to any edge data network may be pre-set and stored in the edge data network 130. According to an embodiment of the disclosure, the general edge data network of operation 513 may denote an edge data network that does not support the RDMA protocol.

In operation 515, the edge data network 130 may respond with address information of the distributed edge application. In other words, the edge data network 130 may respond, to the electronic apparatus 110, with the address information of the edge application used to form the data session with the application client executed by the electronic apparatus 110. According to an embodiment of the disclosure, the address information may be indicated in a form of an internet protocol (IP), a uniform resource locator (URL), or a fully qualified domain name (FQDM). According to an embodiment of the disclosure, based on the edge data network 130 responding with the address information of the edge application to the electronic apparatus 110, the edge data network 130 may also transmit, together with a response message, information about whether an edge data network of a corresponding address supports the RDMA protocol.

In FIG. 5, an example in which the edge application is distributed to the edge data network based on the standard related to the selecting of the network protocol has been described. Hereinafter, an example in which a network protocol to be used by an application client is determined based on whether an NIC supporting an RDMA protocol is available in an edge data network to which an edge application is distributed will be described with reference to FIG. 6.

Figure 6:
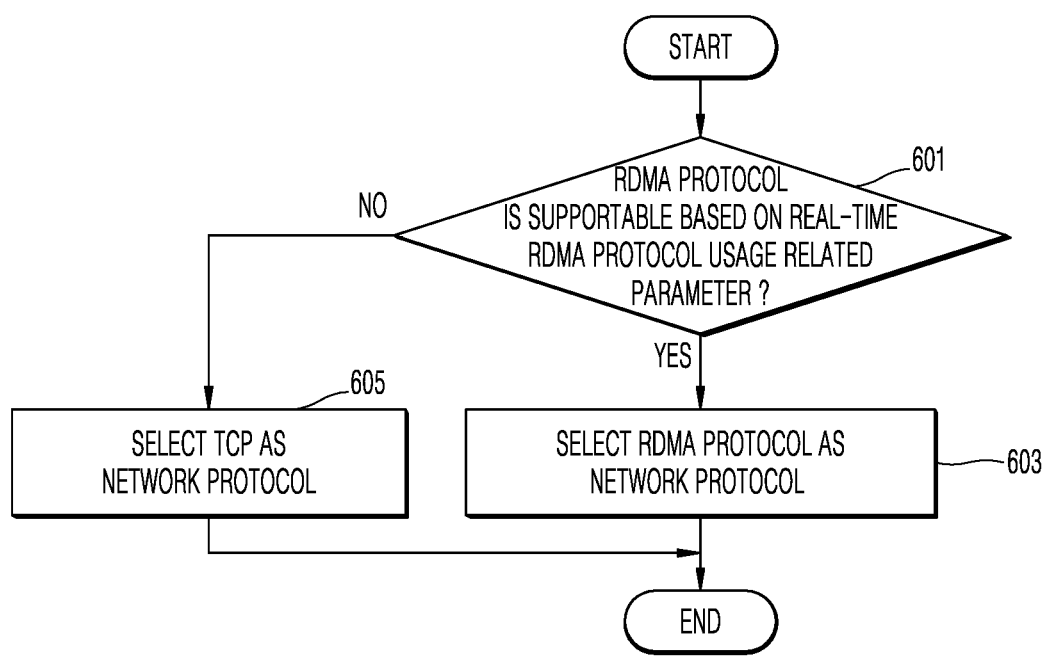
FIG. 6 is a method, performed by an edge data network, of selecting a network protocol to be used by a user equipment (UE) application, according to an example embodiment of the disclosure.

FIG. 6 is a method, performed by the edge data network 130, of selecting a network protocol to be used by an application client, according to another example embodiment of the disclosure. The edge data network 130 for performing the method of FIG. 6 may denote the master edge data network 310 of FIG. 3. Operations 601 through 605 of FIG. 6 may be included in operation 205 of FIG. 2.

Although not shown in FIG. 6, the edge data network 130 may receive a request message for verifying a network protocol to be used by an application client. According to an embodiment of the disclosure, the network protocol to be used by the application client may include TCP, an RDMA protocol, or MPTCP. The edge data network 130 may receive a message transmitted by the electronic apparatus 110 so as to verify the network protocol to be used by the application client from among TCP, the RDMA protocol, or MPTCP.

Referring to FIG. 6, in operation 601, the edge data network 130 may verify whether the edge data network 130 supports the RDMA protocol based on a real-time RDMA protocol usage related parameter. For example, the real-time RDMA protocol usage related parameter may include, as described with reference to FIG. 4, a parameter related to whether an NIC supporting the RDMA protocol included in the edge data network 130 is available, a parameter related to a CPU of the edge data network 130, parameters related to a rate per second, a total packet error, a dropped rate, and a count of RX/TX for each NIC of the edge data network 130, and a parameter related to a latency required by the application client. The edge data network 130 may perform operation 605 when the edge data network 130 is unable to support the RDMA protocol, based on the real-time RDMA protocol usage related parameter. Alternatively, the edge data network 130 may perform operation 603 when the edge data network 130 is able to support the RDMA protocol, based on the real-time RDMA protocol usage related parameter.

According to an embodiment of the disclosure, the edge data network 130 may verify whether the NIC supporting the RDMA protocol is available. For example, the edge data network 130 may determine whether to use the RDMA protocol by verifying an available bandwidth of the NIC supporting the RDMA protocol in the edge data network to which the edge application is distributed. According to an embodiment of the disclosure, an available bandwidth of the NIC supporting the RDMA protocol may denote whether the NIC supporting the RDMA protocol is currently available in the edge data network to which the edge application is distributed. According to an embodiment of the disclosure, the edge data network 130 may verify whether the NIC supporting the MPTCP is available.

For example, the edge data network to which the edge application is distributed may include the NIC supporting the RDMA protocol. However, even when the edge data network to which the edge application is distributed includes the NIC supporting the RDMA protocol, the NIC supporting the RDMA protocol may be currently in use. Accordingly, the edge data network 130 may verify whether the NIC supporting the RDMA protocol is currently available in the edge data network to which the edge application is distributed. As such, the edge data network 130 may also verify whether the NIC supporting the MPTCP is currently available.

According to an embodiment of the disclosure, based on the edge data network to which the edge application is distributed not supporting the RDMA protocol, based on the NIC supporting the RDMA protocol not being currently available in the edge data network to which the edge application is distributed as a result of the verification, or based on the NIC supporting MPTCP not currently being available, the edge data network 130 may perform operation 605. Based on the NIC supporting the RDMA protocol currently being available in at least one edge data network to which the edge application is distributed as the result of the verification, the edge data network 130 may perform operation 603.

In operation 603, the edge data network 130 may select the RDMA protocol as the network protocol. In other words, the edge data network 130 may select the RDMA protocol as the network protocol based on the NIC supporting the RDMA protocol currently being available in the edge data network to which the edge application is distributed. Although not shown in FIG. 6, according to an embodiment of the disclosure, based on the NIC supporting MPTCP currently being available, the edge data network 130 may select MPTCP as the network protocol.

In operation 605, the edge data network 130 may select TCP as the network protocol. In other words, based on the edge data network to which the edge application is distributed not supporting the RDMA protocol or based on the NIC supporting the RDMA protocol not being currently available in the edge data network to which the edge application is distributed as the result of the verification, the edge data network 130 may select TCP as the network protocol.

Although not shown in FIG. 6, the edge data network 130 may respond with the selected network protocol. For example, the edge data network 130 may select the RDMA protocol as the network protocol, select TCP as the network protocol, or select MPTCP as the network protocol. The edge data network 130 may transmit, to the electronic apparatus 110, a response message including information about the selected network protocol. The electronic apparatus 110 may transmit or receive data to or from the edge data network 130 based on the received network protocol.

According to an embodiment of the disclosure, in operation 205 of FIG. 2, based on the edge data network 130 selects the network protocol to be used by the application client, following parameters may be considered. According to an embodiment of the disclosure, based on the edge data network 130 selecting the network protocol to be used by the application client, elements described in operation 205 (for example, whether the edge data network or the edge application supports the RDMA protocol or MPTCP, whether the electronic apparatus 110 supports the RDMA protocol or MPTCP, whether the NIC supporting the RDMA protocol is currently available, or whether the NIC supporting MPTCP is currently available) and the following parameters may be considered individually or together.

According to an embodiment of the disclosure, a parameter that may be considered based on the network protocol to be used by the application client being selected in FIGS. 2 and 4 through 6 may include a CPU-related parameter indicating user space occupancy per CPU core and system (kernel space) occupancy per CPU core of the edge data network 130.

Also, for example, a parameter that may be considered based on the network protocol to be used by the application client being selected may include an NIC-related parameter indicating a rate per second of RX/TX per NIC, total packet error, dropped rate and count, and latency per TCP connection.

According to an embodiment of the disclosure, the edge data network 130 may verify that the system occupancy of CPU increases and the latency per TCP connection increases when network traffic increases rapidly, by using the CPU-related parameter or the NIC-related parameter. When it is verified that the system occupancy of CPU increases and the latency per TCP connection increases, the edge data network 130 may verify that excessive network traffic is concentrated on the current edge data network (for example, at least one edge data network including the edge data network 130).

According to an embodiment of the disclosure, the edge data network 130 may distribute the edge application requested to be distributed to another edge data network where traffic is not concentrated, considering indicators described above (for example, the excessive network traffic being concentrated on the current edge data network).

According to an embodiment of the disclosure, when the current edge data network is able to perform communication using the RDMA protocol and user space CPU occupancy is not high, the edge data network 130 may perform the communication using the RDMA protocol on a newly distributed edge application such that system occupancy of the CPU is not further increased.

According to an embodiment of the disclosure, the parameter that may be considered based on the network protocol to be used by the application client being selected may include a latency required by the application client (app latency, maximum latency tolerated by the application client).

According to an embodiment of the disclosure, the latency required by the application client may be included in application descriptor attributes (see ETSI standard), and the edge data network 130 may obtain the application descriptor attributes from the remote server 140 or a master edge data network (see FIG. 3) managing the edge data network 130.

According to an embodiment of the disclosure, the edge data network 130 may consider latencies required by a plurality of application clients when the network protocols to be used by the plurality of application clients are selected. For example, based on a latency (for example, 5 ms)

required by a first application client being shorter than a latency (for example, 20 ms) required by a second application client, the first application client may use the RDMA protocol or MPTCP and the second application client may use TCP.

In FIGS. 4 through 6 described above, examples in which the network protocol to be used by the application client is selected are described. Hereinafter, an example of a network protocol to be used by an application client will be described with reference to FIG. 7.

Figure 7:
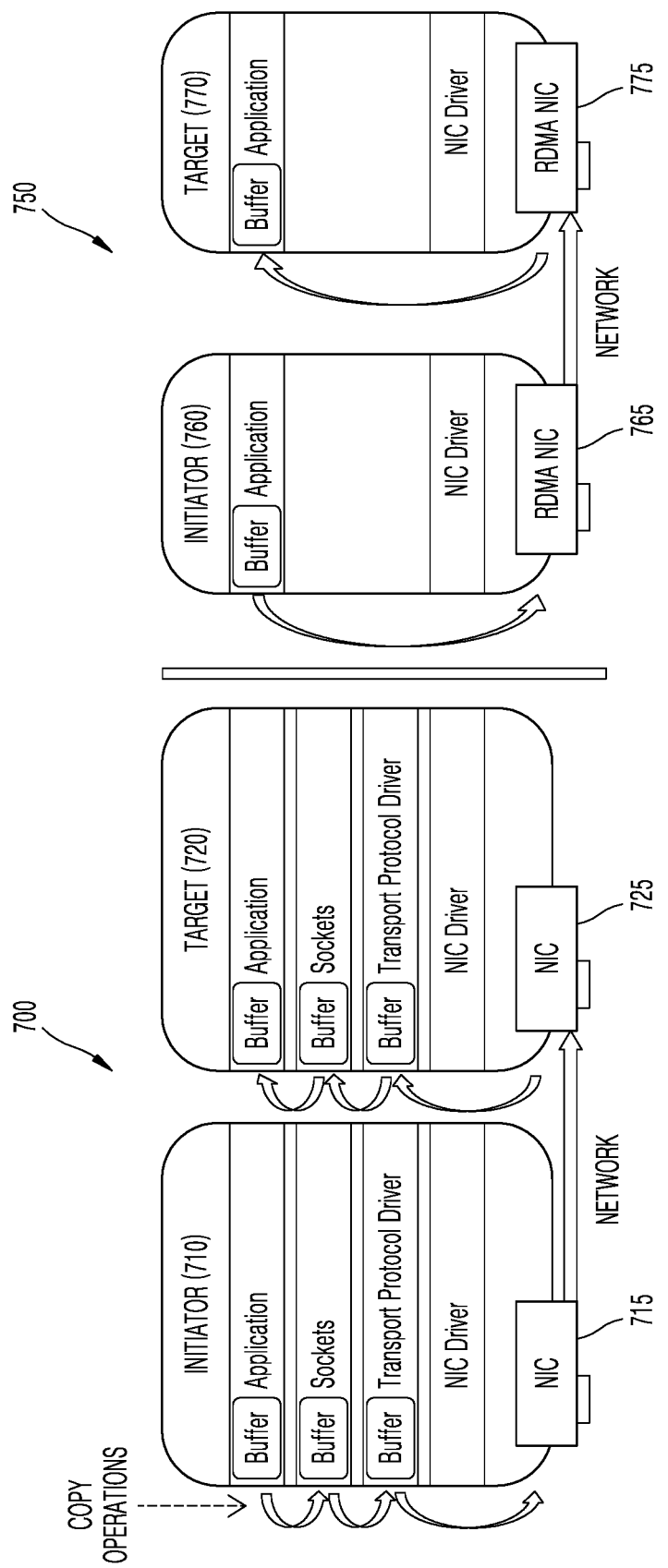
FIG. 7 illustrates an example in which data is transmitted or received according to a network protocol to be used by a UE application, according to an example embodiment of the disclosure.

FIG. 7 illustrates an example in which data is transmitted or received according to a network protocol to be used by an application client, according to an example embodiment of the disclosure.

Referring to FIG. 7, an environment 700 in which data is transmitted by using TCP (for example, a TCP stack) and an environment 750 in which data is transmitted by using an RDMA protocol are shown. In FIG. 7, an initiator 710 or 760 may denote an object transmitting data or may denote a server computer or an electronic apparatus. Also, a target 720 or 770 may denote an object receiving data from the initiator 710 or 760 or may denote a server computer or an electronic apparatus.

According to an embodiment of the disclosure, in the environment 700 where the data is transmitted by using TCP, the initiator 710 may transmit data to the target 720 by using TCP. Here, the initiator 710 may perform copy operations to transmit the data. For example, the initiator 710 may copy data to be transmitted in an order of a buffer of an application, a buffer of a socket, and a buffer of a transport protocol driver. Then, the initiator 710 may transmit the data to the target 720 through a network by using an NIC 715 for TCP.

The target 720 may receive the data from the network by using an NIC 725 for TCP. Also, the target 720 may perform the copy operations to use the received data. For example, the target 720 may copy the data in an order of the buffer of the transport protocol driver, the buffer of the socket, and the buffer of the application. As described above, in the environment 700 where the data is transmitted by using the TCP, latency of data transmission may occur because a plurality of copy operations is to be performed. The RDMA protocol has been devised to prevent the latency of the data transmission.

According to an embodiment of the disclosure, the RDMA protocol may denote a technology in which computers in a network exchange data in a main memory without intervention of a processor, a cache, or an operating system (OS) of a computer. According to an embodiment of the disclosure, the RDMA protocol may directly move data in and out of a server by implementing a transport protocol in an NIC. Also, the RDMA protocol may support a feature called zero-copy networking in which data is directly read from a main memory of one computer and data is directly written on a main memory of another computer.

For example, in the environment 750 where the data is transmitted by using the RDMA protocol, the initiator 760 may move data stored in the buffer of the application to an NIC 765 supporting the RDMA protocol without a copy operation. Also, the initiator 760 may transmit the data to the target 770 through a network by using the NIC 765 supporting the RDMA protocol. The target 770 may receive data from the network by using an NIC 775 supporting the RDMA protocol. Also, the target 770 may move the received data to the buffer of the application without a copy operation, so as to use the received data.

According to an embodiment of the disclosure, based on the RDMA protocol being used, the application may perform data transmission without involvement of a network software stack. Here, the data may be directly transmitted to the buffer without being copied between network layers. This may be referred to as zero-copy.

According to an embodiment of the disclosure, based on the RDMA protocol being used, the applications may directly perform data transmission in a user space without having to perform context switches. This may be referred to as kernel bypass.

According to an embodiment of the disclosure, based on the RDMA protocol being used, the applications may access a remote memory without having to use a CPU of a remote machine. The remote memory may be read without intervention of a remote processor (or a processor). Here, a cache of a remote CPU may not be filled with content of an accessed memory.

As described above, when the RDMA protocol is used between the electronic apparatus 110 and the edge data network 130, the latency of the data transmission may be reduced. Accordingly, the edge data network 130 may select the RDMA protocol as the network protocol to be used by the application client when available and notify the electronic apparatus 110 of the selected RDMA protocol. Accordingly, the electronic apparatus 110 may transmit or receive data to or from the edge data network 130 by using the RDMA protocol. Hereinafter, a method, performed by an electronic apparatus, of determining a network protocol to be used by an application client will be described with reference to FIGS. 8A and 8B.

Figure 8A:
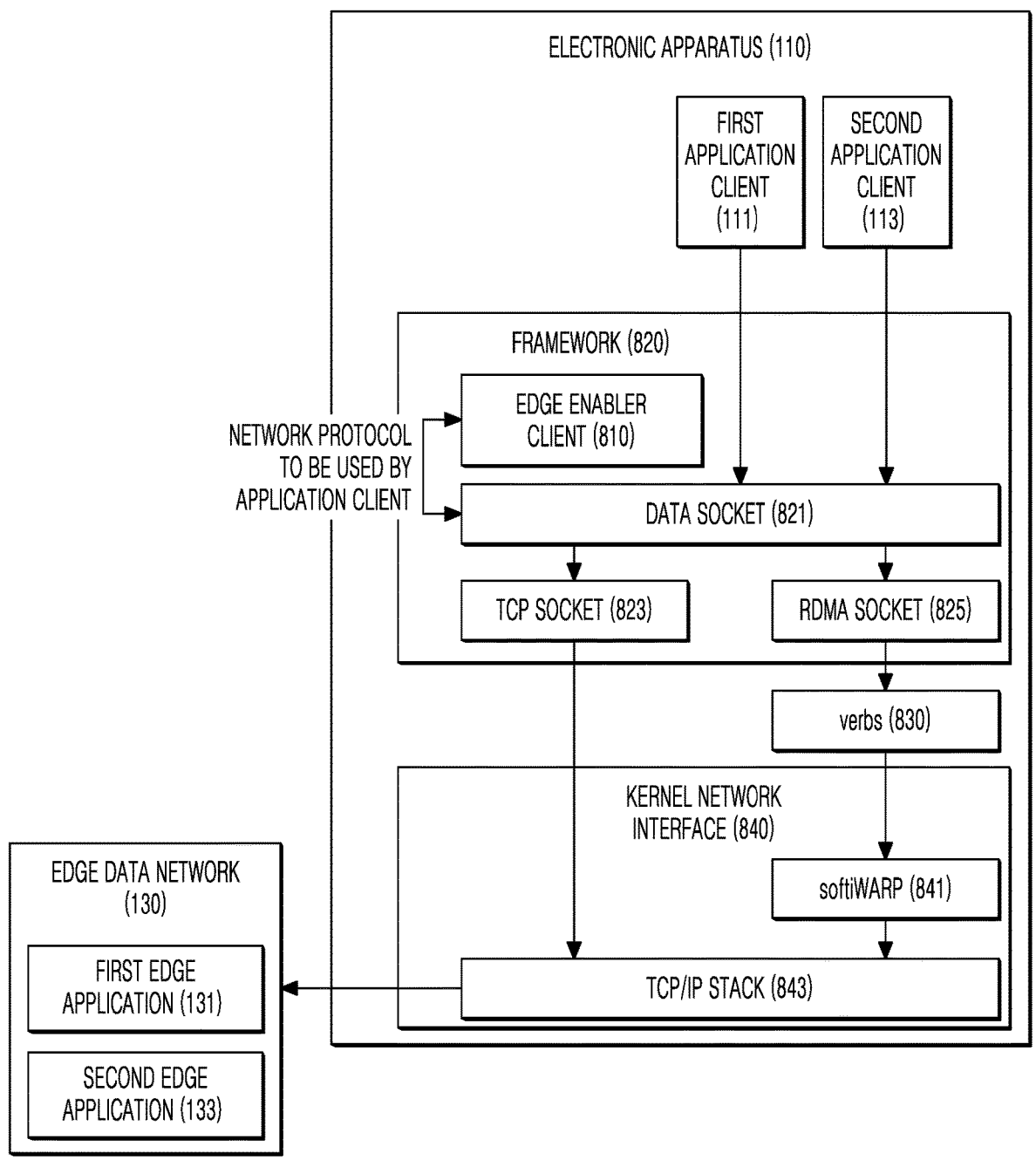
FIG. 8A is a diagram of an internal configuration of an electronic apparatus, according to an example embodiment of the disclosure.

FIG. 8A is a diagram of an internal configuration of the electronic apparatus 110, according to an example embodiment of the disclosure.

Referring to FIG. 8A, according to an embodiment of the disclosure, each component included in the electronic apparatus 110, and the first edge application 131 and the second edge application 133 included in the edge data network 130 may denote a physical entity unit or may denote a software or module unit capable of performing an individual function.

According to an embodiment of the disclosure, the electronic apparatus 110 may include the first application client 111, the second application client 113, a framework (F/W) 820, verbs 830, and a kernel network interface 840. The F/W 820 may include an edge enabler client 810, a data socket 821, a TCP socket 823, and an RDMA socket (rSocket) 825. The kernel network interface 840 may include a softiWARP 841 and a TCP/IP stack 843.

According to an embodiment of the disclosure, the first application client 111 and the second application client 113 may denote a basic application pre-installed in the electronic apparatus 110 or an application provided by a third party. For example, the first application client 111 and the second application client 113 may denote an application for providing media content, such as Youtube, Twitch, or game streaming. According to an embodiment of the disclosure, the first application client 111 and the second application client 113 may correspond to an application layer (for example, an Android application) in an Android architecture.

According to an embodiment of the disclosure, the edge enabler client 810 may denote the sum of a multi-access service agent (MSA) and a multi-access service enabler (MSE). Also, the edge enabler client 810 may denote a device application or an MEL.

According to an embodiment of the disclosure, the MSA may receive information related to authentication, authorization and policy (for example, an app routing policy, a discovery policy, or a monitoring policy). The MSE may set a route according to the policy and manage MEC-based data transmission.

According to an embodiment of the disclosure, the edge enabler client 810 may perform a task required to use an MEC service among services of the MSE. Specific functions of the MEL will be described below with reference to FIG. 18. According to an embodiment of the disclosure, the MEL may provide certain functions to the first application client 111 and the second application client 113. Accordingly, the MEL may correspond to an application framework layer providing a certain function to the Android application in the Android architecture.

According to an embodiment of the disclosure, the F/W 820 may include an Android framework, an 105 framework, or a window framework. According to an embodiment of the disclosure, the F/W 820 may denote a configuration including an application framework layer or a library layer in an OS architecture. For example, the F/W 820 may denote a Bluetooth framework (BT F/W) allowing access to a BT function of the electronic apparatus 110 or a notification F/W allowing management of notification. In FIG. 8A, the F/W 820 may include the edge enabler client 810, the data socket 821, the TCP socket 823, and the RDMA socket (rSocket) 825.

According to an embodiment of the disclosure, the data socket 821 may be implemented as a framework in Android. The first application client 111 or the second application client 113 may transmit or receive data by using the data socket 821. According to an embodiment of the disclosure, the edge enabler client 810 (for example, MEL) may apply a network protocol to be used for each application client by using the data socket 821.

For example, the data socket 821 may inquire the edge enabler client 810 (for example, MEL) of the network protocol to be used by the application client. For example, based on the data socket 821 being generated after the application client (for example, the first application client 111 or the second application client 113) is executed in the electronic apparatus 110, the data socket 821 may inquire the edge enabler client 810 of the network protocol to be used by the application client. For example, based on the electronic apparatus 110 being generated the data socket 821 for communication with a server after a Youtube application is executed in the electronic apparatus 110, the data socket 821 may inquire the edge enabler client 810 of a network protocol to be used by the Youtube application during the generation.

Also, according to an embodiment of the disclosure, based on the electronic apparatus 110 accessing a network (for example, a 5th generation (5G) network) other than a currently accessed network (for example, a 4G network), the data socket 821 may inquire the edge enabler client 810 of the network protocol to be used by the application client. Also, the data socket 821 may periodically inquire the edge enabler client 810 of the network protocol to be used by the application client. Here, an inquiry cycle may be pre-set in the electronic apparatus 110.

Also, when an edge data network accessible by the electronic apparatus 110 changes because the electronic apparatus 110 moves, the data socket 821 may inquire the edge enabler client 810 of the network protocol to be used by the application client. Also, when a base station accessible by the electronic apparatus 110 changes because the electronic apparatus 110 moves, the data socket 821 may inquire the edge enabler client 810 of the network protocol to be used by the application client. Also, the data socket 821 may inquire the edge enabler client 810 of the network protocol to be used by the application client even when the application client using the edge data network is executed.

According to an embodiment of the disclosure, the edge enabler client 810 may store information about the network protocol to be used by the application client, which is received from the edge data network 130. For example, the network protocol to be used by the first application client 111 may be stored as TCP and the network protocol to be used by the second application client 113 may be stored as the RDMA protocol. According to an embodiment of the disclosure, the network protocol to be used by the application client may denote a network protocol policy of the application client. For example, when the network protocol to be used by the first application client 111 is TCP, the network protocol policy of the first application client 111 may be TCP. Also, when the network protocol to be used by the second application client 113 is the RDMA protocol, the network protocol policy of the second application client 113 may be the RDMA protocol.

The edge enabler client 810 may transmit the stored information about the network protocol to be used by the application client to the data socket 821. The data socket 821 may enable the first application client 111 or the second application client 113 to use a corresponding network protocol, based on the information about the network protocol received from the edge enabler client 810. For example, the data socket 821 may enable the first application client 111 or the second application client 113 to use TCP or the RDMA protocol.

According to an embodiment of the disclosure, the TCP socket 823 may denote a network socket used to perform data transmission and reception according to TCP. According to an embodiment of the disclosure, the TCP socket 823 may correspond to a library layer in the Android architecture.

According to an embodiment of the disclosure, the RDMA socket 825 may denote a network socket used by the electronic apparatus 110 to use the RDMA protocol. According to an embodiment of the disclosure, the RDMA socket 825 is a library abstracting verbs API and may correspond to a library layer of the Android architecture. According to an embodiment of the disclosure, the verbs 830 may denote a concept that abstractly indicate a function provided to an application for using the RDMA protocol.

According to an embodiment of the disclosure, the electronic apparatus 110 may select and use a network socket according to the network protocol designated by the data socket 821, when the data is transmitted or received by executing the first application client 111 or the second application client 113. For example, when the network protocol to be used by the first application client 111 is designated as TCP and the network protocol to be used by the second application client 113 is designated to be the RDMA protocol in the information received by the data socket 821 from the edge enabler client 810, the electronic apparatus 110 may use the TCP socket 823 to transmit or receive data for the first application client 111 and use the RDMA socket 825 to transmit or receive data for the second application client 113.

According to an embodiment of the disclosure, the verbs 830 may denote a library in which RDMA API of various vendors are standardized. According to an embodiment of the disclosure, the verbs 830 may be referred to as libverbs. The verbs 830 may correspond to the library layer in the Android architecture.

According to an embodiment of the disclosure, the kernel network interface 840 may include kernel modules for data communication. For example, the kernel network interface 840 may include the softiWARP 841 and the TCP/IP stack 843. According to an embodiment of the disclosure, the softiWARP 841 may denote an RDMA protocol emulating stack implemented as a kernel module. Here, the softiWARP 841 may correspond to a kernel layer of the Android architecture. According to an embodiment of the disclosure, the TCP/IP stack 843 may denote a stack for executing TCP/IP implemented as a kernel module.

According to an embodiment of the disclosure, when the network protocol selected by the data socket 821 is the RDMA protocol, the RDMA socket 825 may be used. However, because the RDMA protocol is based on TCP/IP, even when the RDMA socket 825 is used, the application client may transmit or receive data by forming the data session with the edge application (for example, the first edge application 131 or the second edge application 133) in the edge data network 130 through the TCP/IP stack 843.

As described with reference to FIG. 8A, the data socket 821 of the electronic apparatus 110 may receive the information about the network protocol to be used by the application client, from the edge enabler client 810 (for example, MEL). The data socket 821 may select the TCP socket 823 or the RDMA socket 825 according to the received information. When the RDMA socket 825 is selected and the application client and the edge application transmit and receive data according to the RDMA protocol, latency in the edge data network 130 may be reduced.

When the data socket 821 is not present, the application client (for example, the first application client 111 or the second application client 113) may need to verify a network protocol supported by the edge data network 130 and invoke a socket using the network protocol whenever the application client accesses the edge application (for example, the first edge application 131 or the second edge application 133) of the edge data network 130. However, as described above, when the data socket 821 is present, the application client may invoke only the data socket 821 without having to verify the network protocol supported by the edge data network 130 and invoke the socket using the network protocol, when accessing the edge application of the edge data network 130. Accordingly, the data socket 821 may verify a network protocol policy of the application client and invoke a socket corresponding to the network protocol to be used by the application client.

Figure 8B:
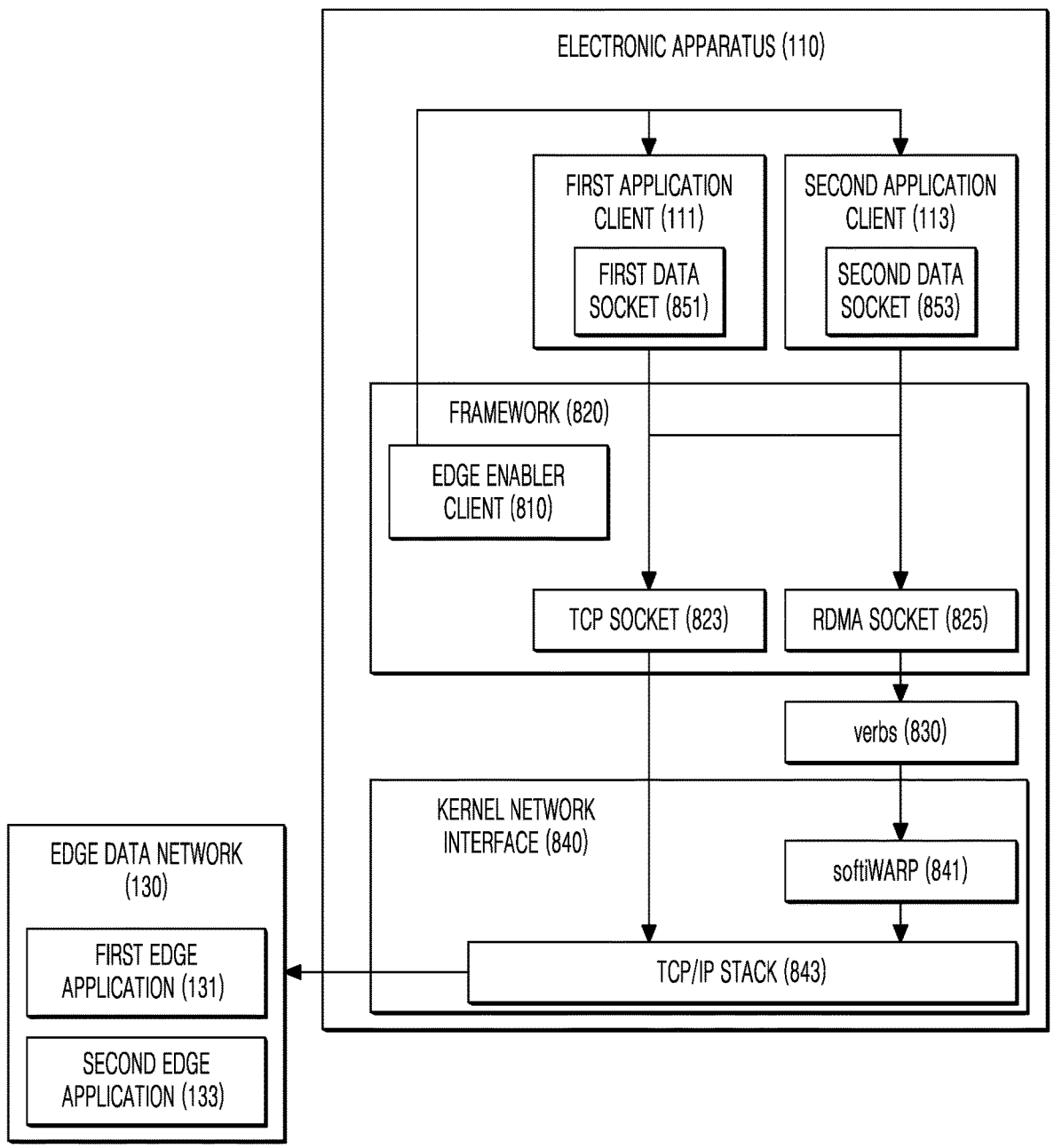
FIG. 8B is a diagram of an internal configuration of an electronic apparatus, according to another example embodiment of the disclosure.

FIG. 8B is a diagram of an internal configuration of the electronic apparatus 110, according to another example embodiment of the disclosure.

Referring to FIG. 8B, according to an embodiment of the disclosure, each component included in the electronic apparatus 110, and the first edge application 131 and the second edge application 133 included in the edge data network 130 may denote a physical entity unit or may denote a software or module unit capable of performing an individual function. For convenience of description, the same description is applied to configurations that are the same as those of FIG. 8A, and redundant details will not be provided in FIG. 8B.

According to an embodiment of the disclosure, the first application client 111 and the second application client 113 executed by the electronic apparatus 110 may each include a configuration of performing a function of the data socket 821 of FIG. 8A. For example, the first application client 111 may include a first data socket 851 and the second application client 113 may include a second data socket 853. However, the first data socket 851 and the second data socket 853 may not be included in the first application client 111 and the second application client 113 as physical objects. For example, software operating as the first data socket 851 and the second data socket 853 may be respectively implemented in the first application client 111 and the second application client 113.

According to an embodiment of the disclosure, based on the edge enabler client 810 receiving information about a network protocol to be used by an application client from the edge data network 130 and updating a pre-stored network protocol accordingly, the edge enabler client 810 may transmit the information about the network protocol to be used by the application client to the first application client 111 and the second application client 113. When the electronic apparatus 110 executes the first application client 111 or the second application client 113, the first data socket 851 or the second data socket 853 may verify a network protocol policy of the application client.

For example, based on the electronic apparatus 110 executing the first application client 111, the first data socket 851 may verify the network protocol of the first application client 111, based on the information received from the edge enabler client 810. For example, when the network protocol indicated by the network protocol policy of the first application client 111 is TCP, the first data socket 851 may invoke the TCP socket 823. When the network protocol indicated by the network protocol policy of the first application client 111 is an RDMA protocol, the first data socket 851 may invoke the RDMA socket 825.

Also, for example, based on the electronic apparatus 110 executing the second application client 113, the second data socket 853 may verify the network protocol policy of the second application client 113, based on the information received from the edge enabler client 810. For example, when the network protocol indicated by the network protocol policy of the second application client 113 is the RDMA protocol, the second data socket 853 may invoke the RDMA socket 825. When the network protocol indicated by the network protocol policy of the second application client 113 is TCP, the second data socket 853 may invoke the TCP socket 823.

Figure 8C:
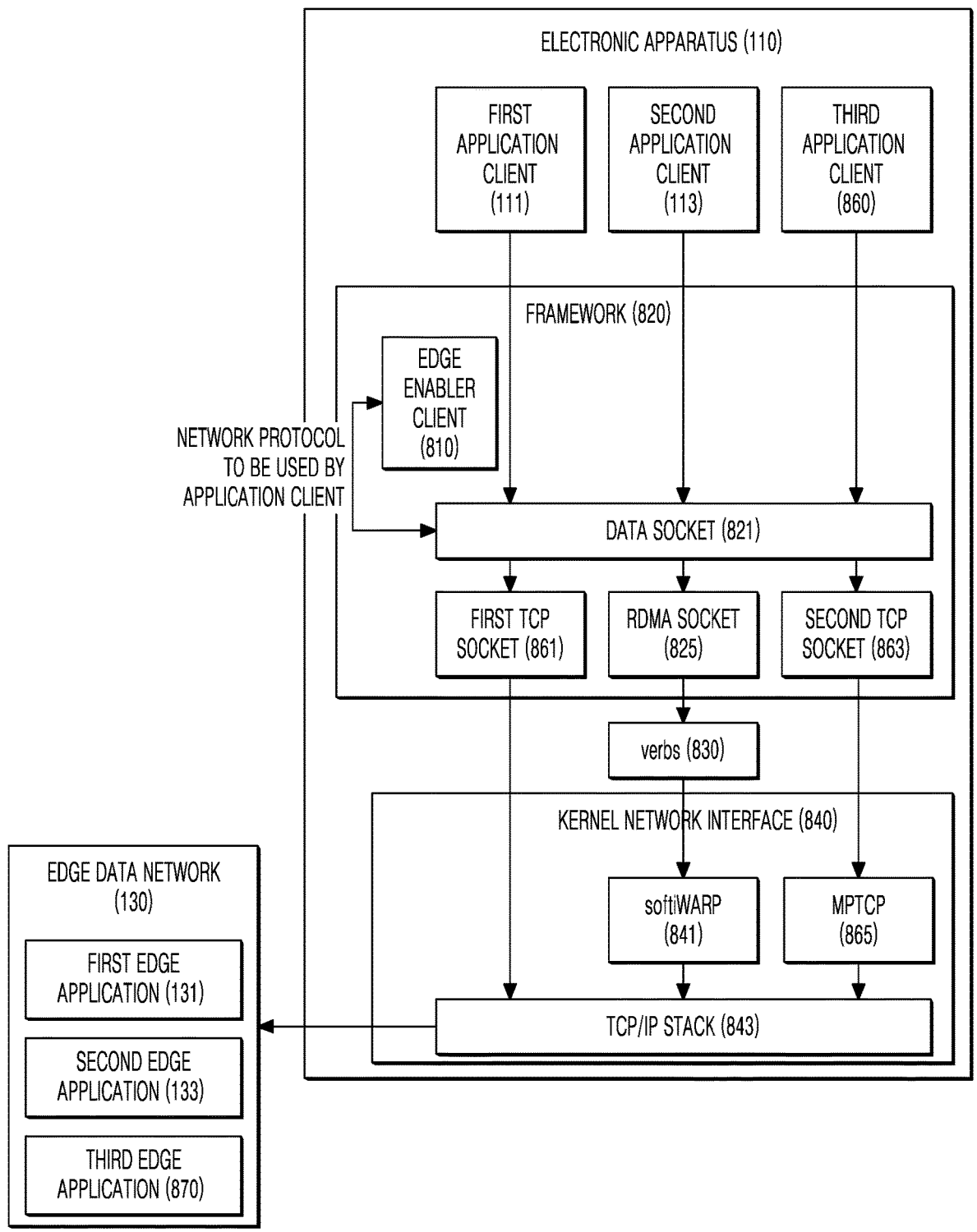
FIG. 8C is a diagram of an internal configuration of an electronic apparatus, according to another example embodiment of the disclosure.

FIG. 8C is a diagram of an internal configuration of the electronic apparatus 110, according to another example embodiment of the disclosure.

Referring to FIG. 8C, according to an embodiment of the disclosure, each component included in the electronic apparatus 110, and the first edge application 131, the second edge application 133, and a third edge application 870 included in the edge data network 130 may denote a physical entity unit or may denote a software or module unit capable of performing an individual function. For convenience of description, the same description is applied to configurations that are the same as those of FIG. 8A, and redundant details will not be provided in FIG. 8C.

According to an embodiment of the disclosure, the electronic apparatus 110 may include the first application client 111, the second application client 113, a third application client 860, the F/W 820, the verbs 830, and the kernel network interface 840. The F/W 820 may include the edge enabler client 810, the data socket 821, a first TCP socket 861, the RDMA socket (rSocket) 825, and a second TCP socket 863. Here, the first TCP socket 861 and the second TCP socket 863 may be the same socket. However, for convenience of description, in FIG. 8C, the first TCP socket 861 and the second TCP socket 863 are separately shown. The first TCP socket 861 and the second TCP socket 863 of FIG. 8C may correspond to the data socket 821 of FIG. 8A.

The kernel network interface 840 may include the softiWARP 841, an MPTCP stack 865, and the TCP/IP stack 843.

According to an embodiment of the disclosure, the first application client 111, the second application client 113, and the third application client 860 may denote a basic application pre-installed in the electronic apparatus 110 or an application provided by a third party.

According to an embodiment of the disclosure, the data socket 821 may be implemented as a framework. The first application client 111, the second application client 113, or the third application client 860 may transmit or receive data by using the data socket 821. According to an embodiment of the disclosure, the edge enabler client 810 (for example, MEL) may apply a network protocol to be used for each application client by using the data socket 821.

For example, the data socket 821 may inquire the edge enabler client 810 (for example, MEL) of the network protocol to be used by the application client. Here, a condition of the inquiry is the same as that described with reference to FIG. 8A.

According to an embodiment of the disclosure, the edge enabler client 810 may store information about the network protocol to be used by the application client, which is received from the edge data network 130. For example, the network protocol to be used by the first application client 111 may be stored as TCP, the network protocol to be used by the second application client 113 may be stored as the RDMA protocol, and the network protocol to be used by the third application client 860 may be stored as MPTCP. According to an embodiment of the disclosure, the network protocol to be used by the application client may denote a network protocol policy of the application client. For example, when the network protocol to be used by the first application client 111 is TCP, the network protocol policy of the first application client 111 may be TCP. Also, when the network protocol to be used by the second application client 113 is the RDMA protocol, the network protocol policy of the second application client 113 may be the RDMA protocol. Also, when the network protocol to be used by the third application client 860 is MPTCP, the network protocol policy of the third application client 860 may be MPTCP.

The edge enabler client 810 may transmit the stored information about the network protocol to be used by the application client to the data socket 821. The data socket 821 may enable the first application client 111, the second application client 113, or the third application client 860 to use a corresponding network protocol, based on the information about the network protocol received from the edge enabler client 810. For example, the data socket 821 may enable the first application client 111, the second application client 113, and the third application client 860 to respectively use TCP, the RDMA protocol, and MPTCP.

According to an embodiment of the disclosure, when the network protocol to be used by the third application client 860 is MPTCP, the electronic apparatus 110 may use the second TCP socket 863 to use MPTCP. Here, the second TCP socket 863 may be the same network socket as the first TCP socket 861 used to transmit or receive data according to TCP.

In other words, when the electronic apparatus 110 is to transmit or receive data by using MPTCP, the data socket 821 may generate the second TCP socket 863 that is the same as the first TCP socket 861. After generating the second TCP socket 863, the data socket 821 may activate the MPTCP stack 865 via a socket option such that the second TCP socket 863 uses the MPTCP stack 865 instead of directly using the TCP/IP stack 843. For example, the data socket 821 may activate an MPTCP_ENABLED option related to activating of the MPTCP stack 865 by using a function related to the socket option such as setsocketopt.

According to an embodiment of the disclosure, the second TCP socket 863 may correspond to a library layer of an Android architecture.

According to an embodiment of the disclosure, based on the use of MPTCP being activated via an MPTCP socket option, the second TCP socket 863 may use the MPTCP stack 865 of the kernel network interface 840. According to an embodiment of the disclosure, the MPTCP stack 865 of FIG. 8C may denote a stack used for MPTCP. According to an embodiment of the disclosure, the MPTCP stack 865 may be configured as a higher layer of the TCP/IP stack 843.

Also, the MPTCP stack 865 may include one session control and a plurality of subflows, and each subflow may be mapped to one IP (LTE/WIFI). A session denotes a starting point to an ending point of communication and may denote communication itself. Also, the subflow of MPTCP may denote communication using TCP, that is, a TCP session. A terminal may communicate with a specific server using an LTE network and a WIFI network at the same time, by using the TCP session of the LTE network and the TCP session of the WIFI network. The IP is a logical address enabling communication, and a mobile phone may have independent addresses for the LTE network and the WIFI network. Also, in the LTE network, IP for data communication and IP for VoLTE communication may be managed separately. Thus, the IP (LTE/WIFI) may denote an IP address for the LTE network or the WIFI network. In other words, the MPTCP stack 865 may include a plurality of subflows indicating a plurality of TCP sessions and a session control function for managing the plurality of TCP sessions, and each subflow may be mapped to an IP address for LTE or WIFI. According to an embodiment of the disclosure, the subflow included in the MPTCP stack 865 includes TCP/IP and thus may be treated in the same manner as a general TCP in an actual network. According to an embodiment of the disclosure, the MPTCP stack 865 may correspond to a kernel layer of the Android architecture.

Figure 9:
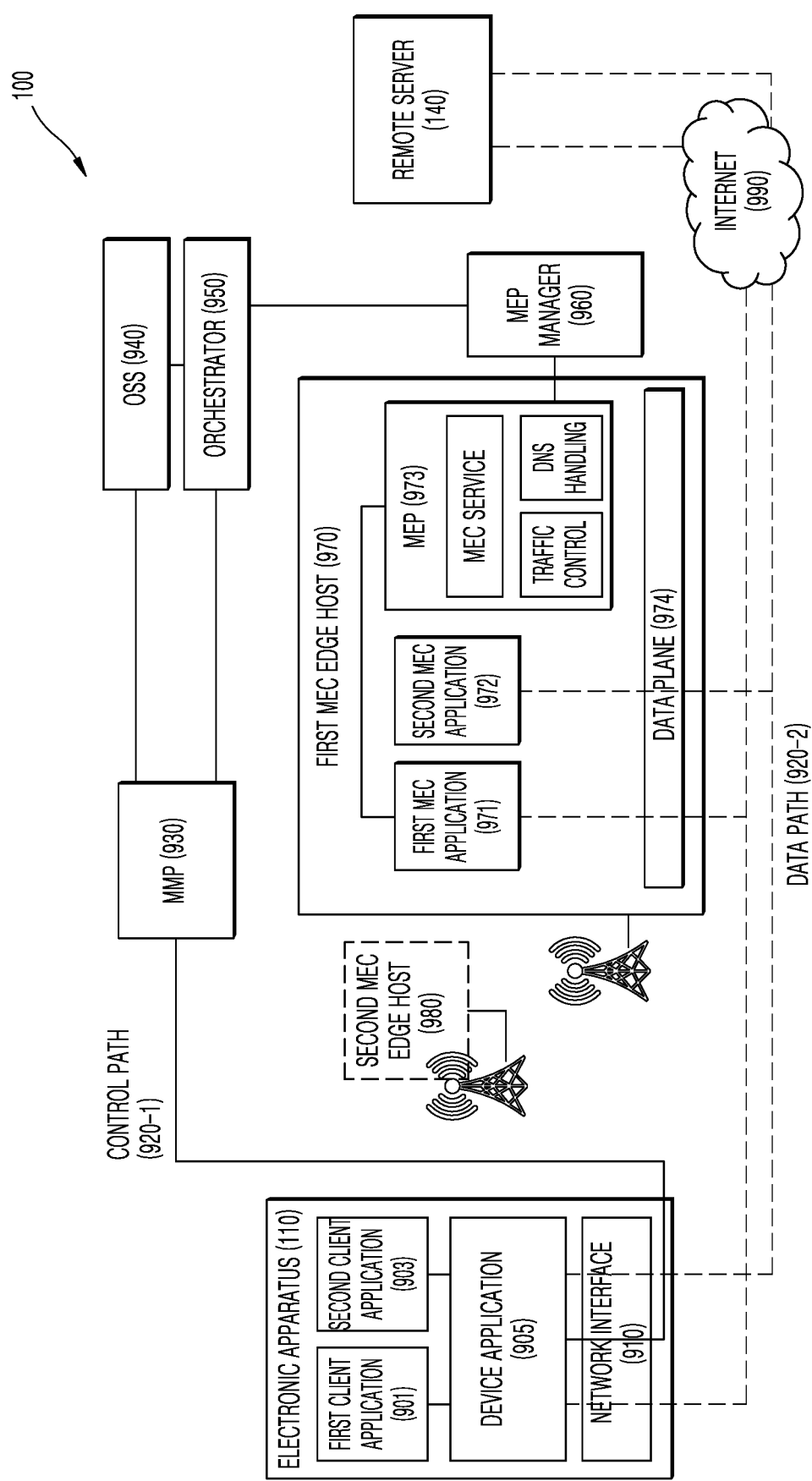
FIG. 9 illustrates a network environment according to an example embodiment of the disclosure.

The internal configurations of the electronic apparatus 110 are shown in FIGS. 8A and 8B, but an overall structure of an MEC system for providing an MEC service to the electronic apparatus 110 and the network environment 100 including the MEC system is shown in FIG. 9.

FIG. 9 illustrates a network environment according to an example embodiment of the disclosure. The network environment of FIG. 9 may denote the network environment 100 of FIG. 1.

Referring to FIG. 9, according to an embodiment of the disclosure, each component included in the network environment 100 may denote a physical entity or may denote a software or module unit capable of performing an individual function.

According to an embodiment of the disclosure, the network environment 100 may include the electronic apparatus 110, an MEC system, the Internet 990, and the remote server 140.

According to an embodiment of the disclosure, the electronic apparatus 110 may include a first client application 901, a second client application 903, and a device application (device app) 905 or a network interface 910. The first client application 901 and the second client application 903 may denote a basic application pre-installed in the electronic apparatus 110 or an application provided by a third party. According to an embodiment of the disclosure, the network interface 910 may denote a communication circuit used by the electronic apparatus 110 to transmit or receive data.

According to an embodiment of the disclosure, the MEC system may include an MEC management proxy (MMP) 930, an operations support system (OSS) 940, an orchestrator 950, an MEP manager 960, a first MEC edge host 970, and a second MEC edge host 980. Although not shown in FIG. 9, the electronic apparatus 110 may perform wireless communication through the AN 120 provided between an MEC edge host (for example, the first MEC edge host 970 or the second MEC edge host 980) and the MMP 930. According to an embodiment of the disclosure, the MMP 930 may also be referred to as a life cycle management proxy.

According to an embodiment of the disclosure, the first MEC edge host 970 may include a first MEC application 971, a second MEC application 972, an MEP 973, and a data plane 974. The second MEC edge host 980 may have the same configuration as the first MEC edge host 970.

Referring to FIG. 9, in the network environment 100, an MEC user plane may denote a path (for example, a data path 920-2) for transmitting a user data packet between applications (for example, the first client application 901 or the second client application 903) of the electronic apparatus 110 and MEC applications (for example, the first MEC application 971 or the second MEC application 972) installed in the first MEC edge host 970, for the electronic apparatus 110 to provide a service to a user. According to an embodiment of the disclosure, an MEC control plane may denote a path (for example, a control path 920-1) for transmitting control information of the MEC system for a user data packet transmitted or received on the user plane.

According to an embodiment of the disclosure, procedures related to authentication, authorization assignment, and discovery may be performed on a control path (for example, the MEC control plane) interworking between a device application 905 and the MMP 930.

When the procedure related to discovery denotes an operation of the electronic apparatus 110 searching for an MEC edge host near the electronic apparatus 110, and according to an embodiment of the disclosure, when a location of the electronic apparatus 110 is not included in a specific MEC edge host section before the procedure related to discovery is performed, the electronic apparatus 110 may pre-determine the network protocol by comparing a client application installed in the electronic apparatus 110 and information about the MEC edge host near the electronic apparatus 110 even when the electronic apparatus 110 does not execute the client application.

Also, according to an embodiment of the disclosure, when the electronic apparatus 110 is mobile while or after the procedure related to discovery is performed, the electronic apparatus 110 may pre-determine the network protocol by comparing information about the MEC edge host near a current location of the electronic apparatus 110 and the client application installed in the electronic apparatus 110.

According to an embodiment of the disclosure, after the procedure related to discovery, an MEC data service may be provided via a data path (for example, the MEC user plane) between UE applications (for example, the first client application 901 or the second client application 903) of the electronic apparatus 110 and MEC applications (for example, the first MEC application 971 or the second MEC application 972) of the first MEC edge host 970. The MEC data plane may denote the data plane 974 of FIG. 9. Although not shown in FIG. 9, a domain name system (DNS) query/response may be separately performed from a DNS server via data path 920-2

According to an embodiment of the disclosure, the MEC system is provided in a network of a communication provider and may denote a system that may be used for MEC-based data transmission. The MEC system may include the MMP 930, the OSS 940, the orchestrator 950, the MEP manager 960, and the MEC edge host. According to an embodiment of the disclosure, there may be a plurality of the MEC edge hosts. For example, the MEC edge hosts may include the first MEC edge host 970 and the second MEC edge host 980.

According to an embodiment of the disclosure, the MMP 930 may be a type of server and provide an edge computing system (for example, a user application interface regarding the MEC system (see the ETSI MEC 016 standard) to a UE (for example, the electronic apparatus 110). For example, the electronic apparatus 110 may request the MMP 930 for information (for example, an available application list) about at least one application providable by the MEC system and transmit an execution request (for example, context creation and context termination) of a particular application to the MEC system. As another example, the MMP 930 may perform management life cycles of applications (for example, the first MEC application 971, the second MEC application 972, and the like) installed in the MEC system. For example, the MMP 930 may receive a request of the electronic apparatus 110 and transmit the received request to the MEC system (for example, the OSS 940 and the orchestrator 950) to manage the life cycles of the applications (for example, the first MEC application 971, the second MEC application 972, and the like) installed in the MEC system.

According to an embodiment of the disclosure, the OSS 940 may grant instantiation or termination of an application. An instance of an application may be a group of instructions for executing the application and instantiation may denote an operation of a processor of the MEC edge host (for example, the first MEC edge host 970 or the second MEC edge host 980) executing an MEC application through the instance.

According to an embodiment of the disclosure, the orchestrator 950 may manage and maintain overall functions of MEC-based data transmission based on at least one of an available resource, an available MEC service, a rule and requirement of an application, a policy of an operator, or topology. For example, the orchestrator 950 may select an MEC edge host (for example, the first MEC edge host 970 or the second MEC edge host 980 of FIG. 9) suitable for the application of the electronic apparatus 110 or may trigger or terminate the instantiation of the application.

According to an embodiment of the disclosure, the MEP manager 960 may manage at least one of the rule, requirement, service approval, or traffic rule of the application.

According to an embodiment of the disclosure, the first MEC edge host 970 may include at least one MEC application (for example, the first MEC application 971 and the second MEC application 972) that may be used to form a data session with each of at least one application (for example, the first client application 901 and the second client application 903) installed in the electronic apparatus 110. According to an embodiment of the disclosure, the first MEC edge host 970 may include the MEP 973. The MEP 973 may receive the traffic rule from the MEP manager 960 and adjust the traffic rule on the MEC user plane.

According to an embodiment of the disclosure, the first MEC edge host 970 or the second MEC edge host 980 may be the master edge data network 310 of FIG. 3. For example, when the first MEC edge host 970 is the master edge data network 310, the second MEC edge host 980 of FIG. 9 may denote one of edge data networks connected to the master edge data network 310 of FIG. 3. Also, when the second MEC edge host 980 is the master edge data network 310, the first MEC edge host 970 of FIG. 9 may be one of edge data networks connected to the master edge data network 310.

According to an embodiment of the disclosure, an MEL server configured to exchange data with an MEC service module (or an MEC service layer) of the electronic apparatus 110 may be included in the electronic apparatus 110 or the edge data network 130 (for example, the first MEC edge host 970 or the second MEC edge host 980 of FIG. 9). In the embodiment of the disclosure, the device application 905 may denote the MEL and the MEL is included in the electronic apparatus 110. However, the disclosure is not limited thereto and the MEL server may be included in the edge data network 130. For example, information in the MEL server and information related to a client application installed in the electronic apparatus 110 may be stored in one or distributed edge data networks. In this case, a client application execution time of the electronic apparatus 110 may be increased because a process of communicating with the one or distributed edge data networks in which the information is stored is added.

According to an embodiment of the disclosure, the MEP 973 may provide the MEC service, perform traffic control, or perform DNS handling. According to an embodiment of the disclosure, the MEC service may collectively refer to a procedure and information related service required to use MEC applications.

According to an embodiment of the disclosure, the electronic apparatus 110 may form the data path 920-2 with the first MEC edge host 970 and connect to the Internet 990 to receive data from the remote server 140 or transmit data to the remote server 140.

As shown in FIG. 9, the network environment 100 may be configured to perform the MEC-based data transmission. Hereinafter, a specific method of determining a protocol policy to be used by a UE application as components included in each of the electronic apparatus 110 and an edge system to transmit and receive messages in the network environment 100 will be described with reference to FIGS. 10 and 11.

Figure 10:
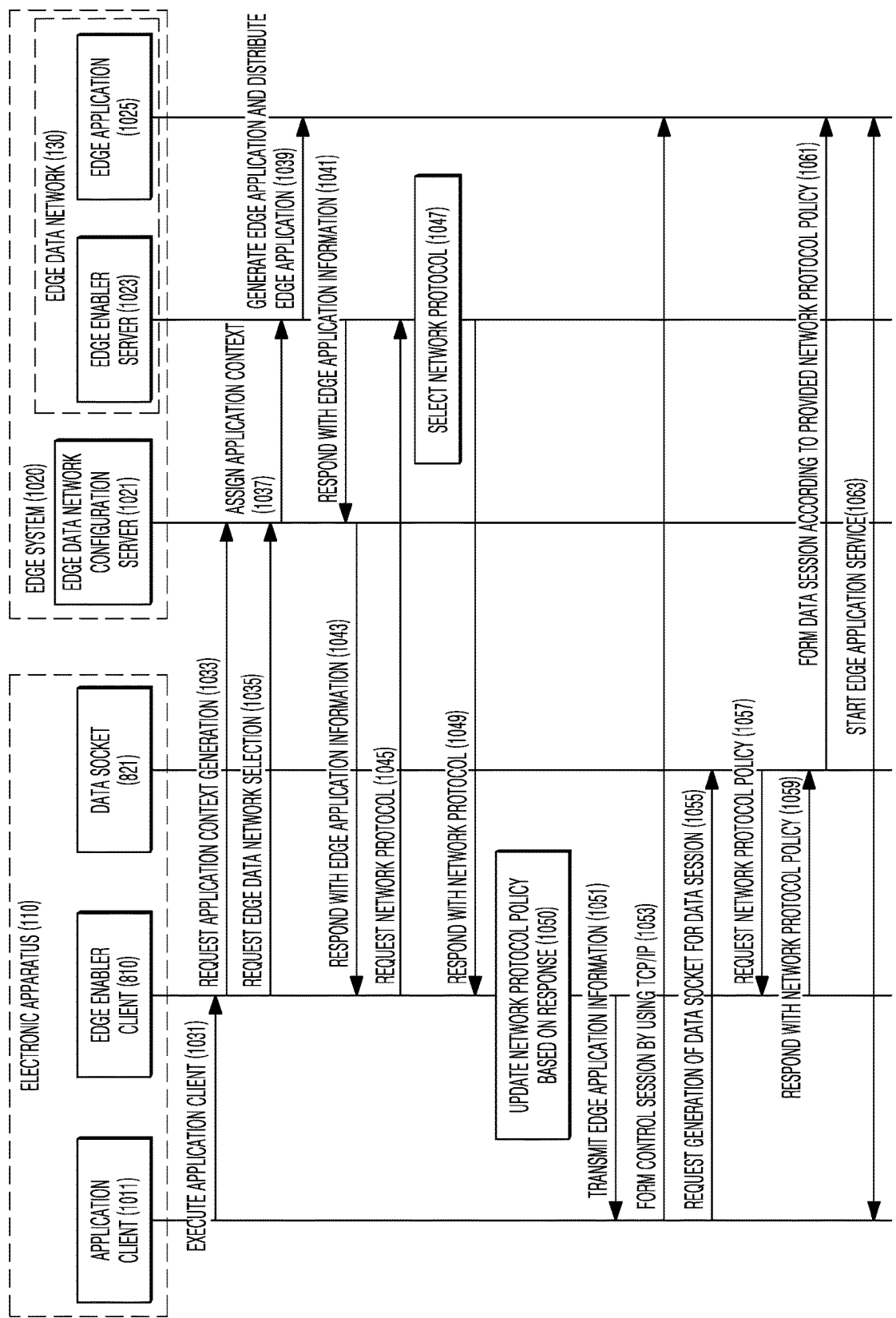
FIG. 10 is a sequence diagram showing a method of determining a network protocol to be used by a UE application, according to an example embodiment of the disclosure.

FIG. 10 is a sequence diagram showing a method of determining a network protocol to be used by a UE application, according to an example embodiment of the disclosure.

In FIG. 10, the electronic apparatus 110 may include an application client 1011, the edge enabler client 810 (for example, an MEL), and the data socket 821. An edge system 1020 may include an edge data network configuration server 1021 and the edge data network 130, and the edge data network 130 may include an edge enabler server 1023 and an edge application 1025. Here, the edge data network 130 may be the master edge data network 310. According to an embodiment of the disclosure, the edge data network configuration server 1021 may denote an MMP server or a DNS server.

Referring to FIG. 10, in operation 1031, the electronic apparatus 110 may execute the application client 1011. For example, the application client 1011 may denote a basic application pre-installed in the electronic apparatus 110 or an application provided by a third party. For example, the application client 1011 may denote an application for providing media content, such as Youtube, Twitch, or game streaming. Also, the application client 1011 may denote an application capable of receiving an MEC-based service. According to an embodiment of the disclosure, based on the electronic apparatus 110 executing the application client 1011, the application client 1011 may transmit information indicating that the application client 1011 is executed, to the edge enabler client 810.

In operation 1033, the edge enabler client 810 may request application context generation. According to an embodiment of the disclosure, application context may denote information regarding the application client 1011 that is valid in the edge system 1020. For example, the application context may include information about an application supporting MEC-based data transmission from among applications (for example, the first application client 111, the second application client 113, and the like) installed in the electronic apparatus 110, identifier (ID) information of the application client 1011, information related to mobility of the electronic apparatus 110, life cycle information of an application, information about a status of the electronic apparatus 110, information obtained via a sensor, or information about network performance. The edge enabler client 810 may transmit a message requesting application context generation to the edge data network configuration server 1021.

In operation 1035, the edge enabler client 810 may request edge data network selection. For example, the edge enabler client 810 may transmit a message requesting the edge data network selection to the edge data network configuration server 1021 so as to select an edge data network for providing an MEC service to the application client 1011. According to an embodiment of the disclosure, the message requesting the edge data network selection may include information about the electronic apparatus 110, information related to a preferred network protocol of an application client, and information related to a user of the electronic apparatus 110.

In operation 1037, the edge data network configuration server 1021 may assign application context. According to an embodiment of the disclosure, the edge data network configuration server 1021 may generate the application context in response to the requests in operations 1033 and 1035 from the edge enabler client 810. The edge data network configuration server 1021 may assign the generated application context to the edge enabler server 1023. In other words, the edge data network configuration server 1021 may transmit an application context assignment message including information related to the generated application context to the edge enabler server 1023.

In operation 1039, the edge enabler server 1023 may generate an edge application and distribute the edge application. For example, the edge enabler server 1023 may generate an MEC application (for example, the edge application 1025) corresponding to the application client 1011, based on the application context regarding the application client 1011 assigned from the edge data network configuration server 1021. According to an embodiment of the disclosure, the edge enabler server 1023 may denote an MEP of the master edge data network 310 in an environment where a plurality of edge data networks are clustered. According to an embodiment of the disclosure, the edge enabler server 1023 may determine at least one edge data network from among the master edge data network 310 and other edge data networks (for example, the first edge data network 320, the second edge data network 330, the third edge data network 340, and the Nth edge data network 350) clustered with the master edge data network 310, based on a pre-set standard related to distribution of the edge application 1025 used to form a data session with the application client 1011.

According to an embodiment of the disclosure, the pre-set standard related to distribution of the edge application 1025 may be stored in the edge enabler server 1023, but is not limited thereto. According to an embodiment of the disclosure, the edge enabler server 1023 may distribute the generated edge application 1025 to the determined at least one edge data network.

In operation 1041, the edge enabler server 1023 may respond with edge application information. According to an embodiment of the disclosure, the edge application information may include address information of the edge application 1025 distributed to the at least one edge data network. For example, the address information of the edge application 1025 may include IP, URL, or FQDN information. The edge enabler server 1023 may transmit, to the edge data network configuration server 1021, a message including the address information of the edge application 1025.

In operation 1043, the edge data network configuration server 1021 may respond with the edge application information. According to an embodiment of the disclosure, the edge data network configuration server 1021 may transmit, to the edge enabler client 810, the edge application information received from the edge enabler server 1023. For example, the edge data network configuration server 1021 may transmit, to the edge enabler client 810, the message including the address information of the edge application 1025 received from the edge enabler server 1023.

In operation 1045, the edge enabler client 810 may request a network protocol. For example, based on the application client 1011 being executed, the edge enabler client 810 may transmit, to the edge enabler server 1023, a request message for verifying a network protocol to be used by the application client 1011. According to an embodiment of the disclosure, the network protocol to be used by the application client 1011 may include TCP or an RDMA protocol.

According to an embodiment of the disclosure, operation 1045 may be performed together with operation 1033 or together with operation 1035. For example, the edge enabler client 810 may request the network protocol while requesting the application context generation. Also, the edge enabler client 810 may request the network protocol while requesting the edge data network selection.

In operation 1047, the edge enabler server 1023 may select the network protocol. According to an embodiment of the disclosure, the edge enabler server 1023 may select the network protocol to be used by the application client 1011 from among a plurality of network protocols.

For example, as described above with reference to operations 401 through 409 of FIG. 4, the edge enabler server 1023 may select the network protocol to be used by the application client 1011 from among the plurality of network protocols. For convenience of description, details that overlap those of FIG. 4 are not provided again. According to an embodiment of the disclosure, in operation 1047, the edge enabler server 1023 may verify a preferred network protocol pre-assigned with respect to the edge application 1025, in addition to a network protocol selecting standard described with reference to FIG. 4, and select the verified network protocol.

According to an embodiment of the disclosure, a preferred network protocol may be pre-assigned for each edge application. For example, the edge enabler server 1023 may provide an interface for pre-assigning the preferred network protocol for each edge application, and store the interface in a database. According to an embodiment of the disclosure, an operator or a system (artificial intelligence (AI) of a telephone company (Telco)) may assign the preferred network protocol for each edge application via the interface provided by the edge enabler server 1023. Accordingly, in operation 1047, the edge enabler server 1023 may verify the network protocol pre-assigned for the edge application 1025 and select the verified network protocol as the network protocol to be used by the application client 1011.

Also, it may be further verified whether the edge system 1020 supports MPTCP. For example, the edge enabler server 1023 may verify whether the edge application 1025 and the edge data network to which the edge application 1025 is distributed support MPTCP.

According to an embodiment of the disclosure, in order to verify whether the edge application 1025 support MPTCP, the edge enabler server 1023 may verify whether the edge application 1025 includes software for transmitting and receiving data via MPTCP. Also, the edge enabler server 1023 may further verify whether the edge application 1025 is able to invoke the software for transmitting and receiving data via MPTCP and use the invoked software.

According to an embodiment of the disclosure, in order to verify whether the edge data network to which the edge application 1025 is distributed supports MPTCP, the edge enabler server 1023 may verify whether an NIC supporting MPTCP is included in the edge data network to which the edge application 1025 is distributed, whether the NIC supporting MPTCP is currently available, or whether an MPTCP socket option is applied to the edge data network to which the edge application 1025 is distributed and an MPTCP stack is able to be activated.

According to an embodiment of the disclosure, the edge enabler server 1023 may select the network protocol to be used by the application client 1011 from among the plurality of network protocols (for example, TCP, the RDMA protocol, and MPTCP).

In operation 1049, the edge enabler server 1023 may respond with the network protocol. For example, the edge enabler server 1023 may select the network protocol to be used by the application client 1011 in operation 1047. Then, the edge enabler server 1023 may transmit, to the edge enabler client 810, a message including information about the selected network protocol to be used by the application client 1011. According to an embodiment of the disclosure, operation 1049 may be performed together with operation 1043. For example, when the edge system 1020 responds with the edge application information, the information about the selected network protocol may also be transmitted.

In operation 1050, the edge enabler client 810 may update the network protocol to be used by the application client 1011, based on the response. For example, the edge enabler client 810 may update the network protocol to be used by the application client 1011, based on the information about the network protocol, which is received from the edge enabler server 1023. For example, a network protocol policy of the application client 1011 may be pre-set as TCP, but the network protocol to be used by the application client 1011 indicated by the response may be the RDMA protocol or MPTCP. In this case, the electronic apparatus 110 may update the network protocol to be used by the application client 1011 from TCP to the RDMA protocol or MPTCP. In this case, the network protocol policy of the application client 1011 may denote the updated network protocol (for example, the RDMA protocol or MPTCP).

In operation 1051, the edge enabler client 810 may transmit the edge application information. For example, the edge application information may include address information of the edge application 1025 to be connected to the application client 1011. According to an embodiment of the disclosure, the edge enabler client 810 may transmit, to the application client 1011, the edge application information received from the edge data network configuration server 1021 in operation 1043.

In operation 1053, the application client 1011 may form a control session by using TCP/IP. For example, the application client 1011 may form the control session with the corresponding edge application 1025 by using TCP/IP. According to an embodiment of the disclosure, the control session may denote the control path 920-1 of FIG. 9. According to an embodiment of the disclosure, control information of the edge system 1020 for transmission and reception of data related to the application client 1011 may be transmitted via the formed control session.

In operation 1055, the application client 1011 may request generation of the data socket 821 for a data session. According to an embodiment of the disclosure, the application client 1011 may transmit a message requesting generation of the data socket 821 to the data socket 821 so as to form the data session for data transmission and reception with the edge application 1025. According to an embodiment of the disclosure, the data socket 821 may denote an application framework layer in the Android architecture. According to an embodiment of the disclosure, the data socket 821 may denote a software or hardware configuration capable of being implemented as a framework in Android.

In operation 1057, the data socket 821 may request the network protocol policy. For example, the data socket 821 generated in the data socket 821 may transmit a request message to the edge enabler client 810 to verify the network protocol to be used by the application client 1011.

In operation 1059, the edge enabler client 810 may respond with the network protocol policy. For example, the edge enabler client 810 may receive, from the edge enabler server 1023 in operation 1049, information about the network protocol to be used by the application client 1011, and store the information. Then, the edge enabler client 810 may transmit, to the data socket 821, the stored information about the network protocol to be used by the application client 1011, in response to the request message from the data socket 821. In other words, the edge enabler client 810 may transmit, to the data socket 821, the information about the network protocol to be used by the application client 1011.

In operation 1061, the data socket 821 may form the data session according to the provided network protocol policy. According to an embodiment of the disclosure, the data socket 821 of the framework may select a network socket, based on the network protocol received from the edge enabler client 810. Also, the data socket 821 may form the data session with the edge application 1025 based on the selected network socket.

For example, the data socket 821 may select the TCP socket 823 when the network protocol received from the edge enabler client 810 is TCP. Also, the data socket 821 may form the data session with the edge application 1025 by using the TCP socket 823. According to an embodiment of the disclosure, the data socket 821 may select the RDMA socket 825 based on the network protocol received from the edge enabler client 810 being the RDMA protocol. Also, the data socket 821 may form the data session with the edge application 1025 by using the RDMA socket 825. According to an embodiment of the disclosure, the data socket 821 may form the data session with the edge application 1025 by using the second TCP socket 863 when the network protocol received from the edge enabler client 810 is MPTCP. Here, the second TCP socket 863 may be the same as the TCP socket 823 for TCP.

In operation 1063, the application client 1011 and the edge application 1025 may start an edge application service. For example, the edge application 1025 may form the data session with the edge application 1025 via the data socket 821. The application client 1011 may receive data from the edge application 1025 via the formed data session. Also, the application client 1011 may transmit data to the edge application 1025 via the formed data session.

In the example of FIG. 10, the edge enabler server 1023 distributes the edge application 1025 to a particular edge data network, based on the pre-set standard related to distribution of MEC application (for example, the edge application 1025). Also, when selecting the network protocol to be used by the application client 1011, the edge enabler server 1023 may consider whether the particular edge data network to which the edge application 1025 is distributed supports the RDMA protocol or MPTCP. In other words, in the example of FIG. 10, substantially, the network protocol to be used by the application client 1011 may be determined according to the pre-set standard related to distribution of the edge application 1025. However, in an example of FIG. 11 described below, a network protocol to be used by an application client may be determined according to a pre-set network protocol selecting standard.

Figure 11:
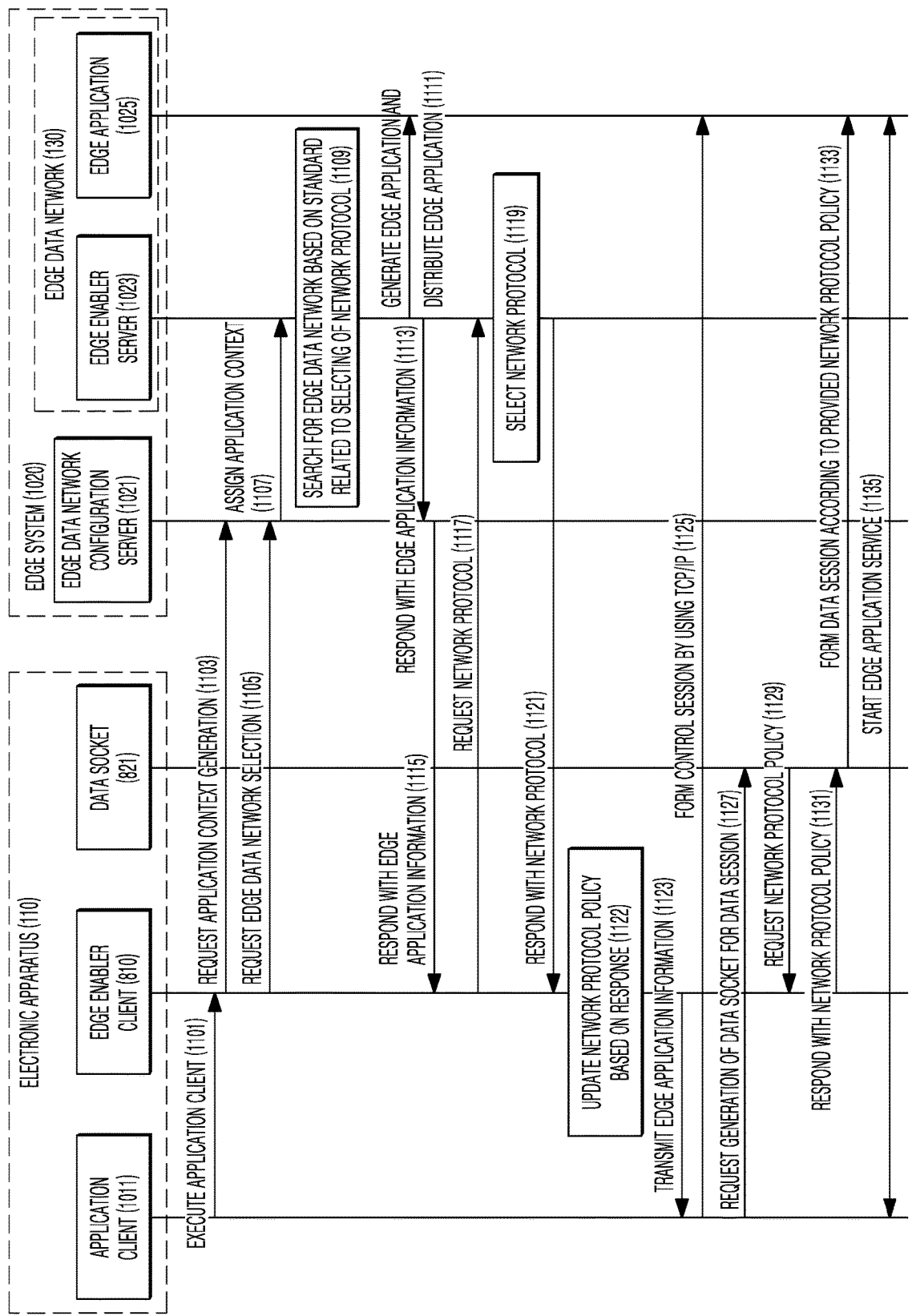
FIG. 11 is a sequence diagram showing a method of determining a network protocol to be used by a UE application, according to another example embodiment of the disclosure.

FIG. 11 is a sequence diagram showing a method of determining a network protocol to be used by an application client, according to another example embodiment of the disclosure.

In FIG. 11, the electronic apparatus 110 may include the application client 1011, the edge enabler client 810 (for example, an MEL), and the data socket 821. An edge system 1020 may include the edge data network configuration server 1021 and the edge data network 130, and the edge data network 130 may include the edge enabler server 1023 and the edge application 1025. Here, the edge data network 130 may be the master edge data network 310.

Referring to FIG. 11, in operation 1101, the electronic apparatus 110 may execute the application client 1011. For example, based on the electronic apparatus 110 executing the application client 1011, the application client 1011 may transmit information indicating that the application client 1011 is executed, to the edge enabler client 810.

In operation 1103, the edge enabler client 810 may request application context generation. For example, the edge enabler client 810 may transmit a message requesting application context generation to the edge data network configuration server 1021. According to an embodiment of the disclosure, the message requesting the application context generation may correspond to the address information request message of FIG. 5.

According to an embodiment of the disclosure, the message requesting the application context generation transmitted from the edge enabler client 810 to the edge data network configuration server 1021 may include information indicating a standard related to selecting of a network protocol. For example, the standard related to selecting of the network protocol may denote a standard pre-set to select a network protocol regarding an application client. According to an embodiment of the disclosure, the standard related to the selecting of the network protocol may include information about a network protocol preferred by the electronic apparatus 110.

According to an embodiment of the disclosure, the standard related to the selecting of the network protocol may be pre-set by a manufacturer of the electronic apparatus 110, a developer of the application client, or a mobile carrier, and stored in the electronic apparatus 110. Alternatively, the standard related to the selecting of the network protocol may be stored in the edge data network configuration server 1021. According to an embodiment of the disclosure, the standard related to the selecting of the network protocol may include information indicating TCP, information indicating an RDMA protocol, or information indicating MPTCP as a network protocol to be applied to an application client.

In operation 1105, the edge enabler client 810 may request edge data network selection. For example, the edge enabler client 810 may transmit a message requesting the edge data network selection to the edge data network configuration server 1021 so as to select an edge data network for providing an MEC service to the application client 1011. According to an embodiment of the disclosure, the message requesting the edge data network selection may include information about the electronic apparatus 110, information related to a preferred network protocol of an application client, and information related to a user of the electronic apparatus 110.

In operation 1107, the edge data network configuration server 1021 may assign application context. According to an embodiment of the disclosure, the edge data network configuration server 1021 may generate the application context in response to the requests in operations 1103 and 1105 from the edge enabler client 810. The edge data network configuration server 1021 may assign the generated application context to the edge enabler server 1023. In other words, the edge data network configuration server 1021 may transmit an application context assignment message including information related to the generated application context to the edge enabler server 1023. Here, the edge data network configuration server 1021 may transmit the information indicating the standard related to the selecting of the network protocol together with or in a message for assigning application context.

According to an embodiment of the disclosure, the information indicating the standard related to the selecting of the network protocol stored in the edge data network configuration server 1021 may denote information related to a network protocol usable by a specific edge application. For example, the information indicating the standard related to the selecting of the network protocol stored in the edge data network configuration server 1021 may denote information indicating that the specific edge application is able to use the RDMA protocol or information indicating that the specific edge application is able to use MPTCP. However, the information indicating that the specific edge application is able to use the RDMA protocol or the information indicating that the specific edge application is able to use MPTCP may be stored in a configuration (for example, the edge enabler server 1023) in the edge system 1020 other than the edge data network configuration server 1021.

In operation 1109, the edge enabler server 1023 may search for an edge data network based on the standard related to the selecting of the network protocol. In other words, the edge enabler server 1023 may search for an edge data network supporting a specific network protocol, based on the information indicating the standard related to the selecting of the network protocol, the information included in the message for assigning the application context received from the edge data network configuration server 1021.

For example, the edge enabler server 1023 may verify whether a network protocol indicated by the standard related to the selecting of the network protocol is the RDMA protocol. When the network protocol indicated by the standard related to the selecting of the network protocol is the RDMA protocol, the edge enabler server 1023 may verify whether the edge application 1025 used to form a data session with the application client 1011 supports the RDMA protocol. When the edge application 1025 supports the RDMA protocol, the edge enabler server 1023 may search for at least one edge data network supporting the RDMA protocol. By searching for the at least one edge data network supporting the RDMA protocol, the edge enabler server 1023 may verify whether at least one edge data network supporting the RDMA protocol is present.

According to an embodiment of the disclosure, the edge enabler server 1023 may verify whether a network protocol indicated by the standard related to the selecting of the network protocol is MPTCP. When the network protocol indicated by the standard related to the selecting of the network protocol is MPTCP, the edge enabler server 1023 may verify whether the edge application 1025 used to form a data session with the application client 1011 supports MPTCP. When the edge application 1025 supports MPTCP, the edge enabler server 1023 may search for at least one edge data network supporting MPTCP. By searching for the at least one edge data network supporting MPTCP, the edge enabler server 1023 may verify whether at least one edge data network supporting MPTCP is present.

According to an embodiment of the disclosure, the edge enabler server 1023 may denote an MEP of the master edge data network 310 in an environment in which a plurality of edge data networks are clustered. The edge enabler server 1023 is an MEP of the master edge data network 310 and may search for at least one edge data network supporting the RDMA protocol or MPTCP from among the master edge data network 310 and other edge data networks (for example, the first edge data network 320, the second edge data network 330, the third edge data network 340, and the Nth edge data network 350) connected to the master edge data network 310.

In operation 1111, the edge enabler server 1023 may generate an edge application and distribute the edge application. For example, the edge enabler server 1023 may generate the edge application 1025 used to form a data session with the application client 1011, based on the application context regarding the application client 1011 assigned from the edge data network configuration server 1021. However, the generating of the edge application 1025 may be performed in operation 1109. According to an embodiment of the disclosure, the edge enabler server 1023 may distribute the generated edge application 1025 to at least one edge data network found in operation 1109.

According to an embodiment of the disclosure, the edge enabler server 1023 may select an edge data network to which the edge application 1025 is to be distributed as described above in operations 503 to 513 of FIG. 5. For example, when the network protocol included in a message for requesting assignment of the application context is the RDMA protocol, the edge application 1025 supports the RDMA protocol, and an edge data network supporting the RDMA protocol is present, the edge enabler server 1023 may distribute the edge application 1025 to the edge data network supporting the RDMA protocol.

According to an embodiment of the disclosure, when the network protocol included in the message for requesting assignment of the application context is not the RDMA protocol, the edge application 1025 does not support the RDMA protocol, and the edge data network supporting the RDMA protocol is not present, the edge enabler server 1023 may distribute the edge application 1025 to any edge data network from among the plurality of edge data networks (for example, the edge data network 130, the first edge data network 320, the second edge data network 330, the third edge data network 340, and the Nth edge data network 350).

According to an embodiment of the disclosure, when selecting the edge data network to which the edge application 1025 is to be distributed, the edge enabler server 1023 may consider whether the edge application 1025 and the edge data network to which the edge application 1025 is to be distributed support MPTCP.

For example, when the network protocol included in a message for requesting assignment of the application context is MPTCP, the edge application 1025 supports MPTCP, and an edge data network supporting MPTCP is present, the edge enabler server 1023 may distribute the edge application 1025 to the edge data network supporting MPTCP.

According to an embodiment of the disclosure, when the network protocol included in the message for requesting assignment of the application context is not MPTCP, the edge application 1025 does not support MPTCP, and the edge data network supporting MPTCP is not present, the edge enabler server 1023 may distribute the edge application 1025 to any edge data network from among the plurality of edge data networks (for example, the edge data network 130, the first edge data network 320, the second edge data network 330, the third edge data network 340, and the Nth edge data network 350).

In operation 1113, the edge enabler server 1023 may respond with edge application information. According to an embodiment of the disclosure, the edge application information may include address information of the edge application 1025 distributed to the at least one edge data network. For example, the address information of the edge application 1025 may include IP, URL, or FQDN information. The edge enabler server 1023 may transmit, to the edge data network configuration server 1021, a message including the address information of the edge application 1025.

In operation 1115, the edge data network configuration server 1021 may respond with the edge application information. According to an embodiment of the disclosure, the edge data network configuration server 1021 may transmit, to the edge enabler client 810, the edge application information received from the edge enabler server 1023. For example, the edge data network configuration server 1021 may transmit, to the edge enabler client 810, the message including the address information of the edge application 1025 received from the edge enabler server 1023.

In operation 1117, the edge enabler client 810 may request a network protocol. For example, based on the application client 1011 being executed, the edge enabler client 810 may transmit, to the edge enabler server 1023, a request message for verifying a network protocol to be used by the application client 1011. According to an embodiment of the disclosure, the network protocol to be used by the application client 1011 may include TCP, an RDMA protocol, or MPTCP.

In operation 1119, the edge enabler server 1023 may select the network protocol. For example, because the at least one edge data network is searched for based on the standard related to the selecting of the network protocol and the edge application 1025 is distributed based on a result of the searching in operations 1109 and 1111, the edge enabler server 1023 may select the network protocol to be used by the application client 1011, based on an NIC currently available from among NICs provided by the at least one edge data network to which the edge application 1025 is distributed.

For example, as described above with reference to operations 601 through 603 of FIG. 6, the edge enabler server 1023 may select the network protocol to be used by the application client 1011 from among the plurality of network protocols. For convenience of description, details that overlap those of FIG. 6 are not provided again.

According to an embodiment of the disclosure, in addition to the standard of selecting the network protocol described with reference to FIG. 6, the edge enabler server 1023 may verify whether an NIC supporting MPTCP is included in the edge data network to which the edge application 1025 is distributed, whether the NIC supporting MPTCP is currently available, or whether an MPTCP socket option is applied to the edge data network to which the edge application 1025 is distributed, in operation 1119.

According to an embodiment of the disclosure, the edge enabler server 1023 may select the network protocol to be used by the application client 1011 from among the plurality of network protocols (for example, TCP, the RDMA protocol, and MPTCP).

In operation 1121, the edge enabler server 1023 may respond with the network protocol. For example, the edge enabler server 1023 may select the network protocol to be used by the application client 1011 in operation 1119. Then, the edge enabler server 1023 may transmit, to the edge enabler client 810, a message including information about the selected network protocol to be used by the application client 1011.

In operation 1122, the edge enabler client 810 may update the network protocol to be used by the application client 1011, based on the response.

In operation 1123, the edge enabler client 810 may transmit the edge application information.

In operation 1125, the application client 1011 may form a control session by using TCP/IP.

In operation 1127, the application client 1011 may request generation of the data socket 821 for a data session.

In operation 1129, the data socket 821 may request the network protocol policy.

In operation 1131, the edge enabler client 810 may respond with the network protocol policy.

In operation 1133, the data socket 821 may form the data session according to the provided network protocol policy.

In operation 1135, the application client 1011 and the edge application 1025 may start an edge application service.

Because operations 1122 through 1135 of FIG. 11 are performed in the same manner as operations 1050 through 1063 of FIG. 10, redundant details thereof will not be provided again.

In an example of FIG. 11 described above, the edge enabler server 1023 distributes an edge application (for example, the edge application 1025) to a particular edge data network, based on the standard related to the selecting of the network protocol. Also, when selecting a network protocol to be used by an application client (for example, the application client 1011), the edge enabler server 1023 may consider whether an NIC supporting the RDMA protocol provided by a particular edge data network to which an edge application (for example, the edge application 1025) is distributed is currently available. In other words, in the example of FIG. 11, substantially, a network protocol to be used by an application client may be determined according to information indicating a standard related to selecting of a network protocol, the information included in a message requesting generation of application context.

As described above, latency in the edge data network 130 may be reduced when the RDMA protocol is selected as the network protocol to be used by the application client (for example, the application client 1011). Hereinafter, an example of transmission latency including latency in the edge data network 130 will be described with reference to FIGS. 12 and 13A.

Figure 12:
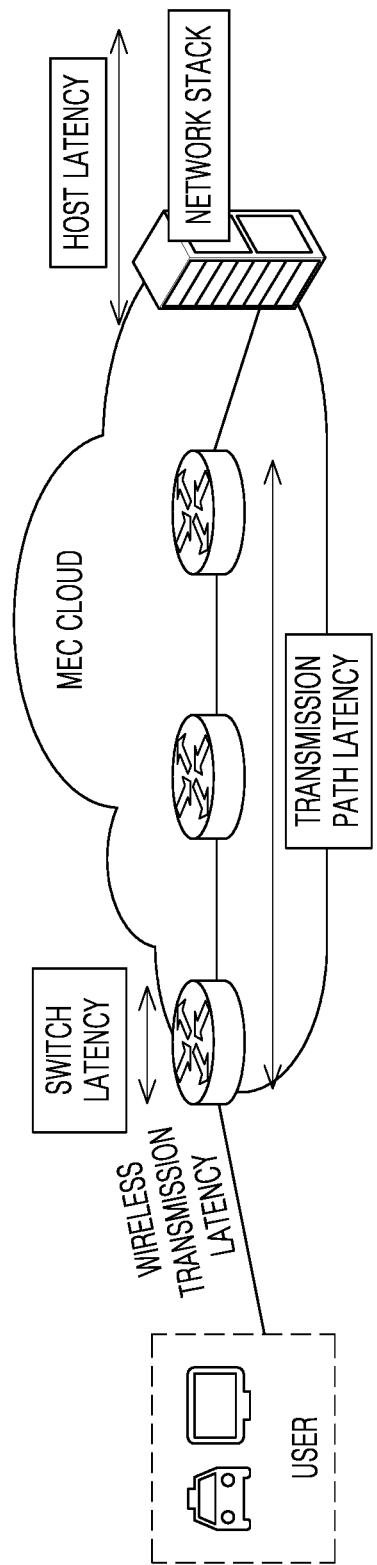
FIG. 12 is a diagram showing an example of an end-to-end transmission latency.

FIG. 12 is a diagram showing an example of an end-to-end transmission latency.

Referring to FIG. 12, a user, an MEC cloud, and a network stack may be present. Here, the user may denote the electronic apparatus 110 of the disclosure. The MEC cloud may denote an edge system (or an MEC system) of the disclosure. Also, the network stack may denote the edge data network 130 of the disclosure.

According to an embodiment of the disclosure, a base station may be present between the user (for example, the electronic apparatus 110) and the MEC cloud. When the user (for example, the electronic apparatus 110) and the MEC cloud transmit and receive data through the base station, wireless transmission latency may occur between the user (for example, the electronic apparatus 110) and the MEC cloud (for example, the edge system).

According to an embodiment of the disclosure, switch latency and transmission path latency may occur in the MEC cloud (for example, the edge system). For example, the switch latency may denote a process time that occurs when a switch operation is performed such that the user (for example, the electronic apparatus 110) accesses the MEC cloud (for example, the edge system). Also, the transmission path latency may denote a transmission latency that occurs when the user (for example, the electronic apparatus 110) transmits data to a network stack (for example, the edge data network 130) in the MEC cloud (for example, the edge system). The transmission patch latency may include the switch latency.

Also, the latency that occurs in the network stack (for example, the edge data network 130) may denote a time during which the edge data network 130 executes an MEC application corresponding to a UE application executed in the electronic apparatus 110 and data is transmitted and received. Embodiments of the disclosure may provide a method of reducing latency in the edge data network 130 among the above latencies.

Figure 13A:
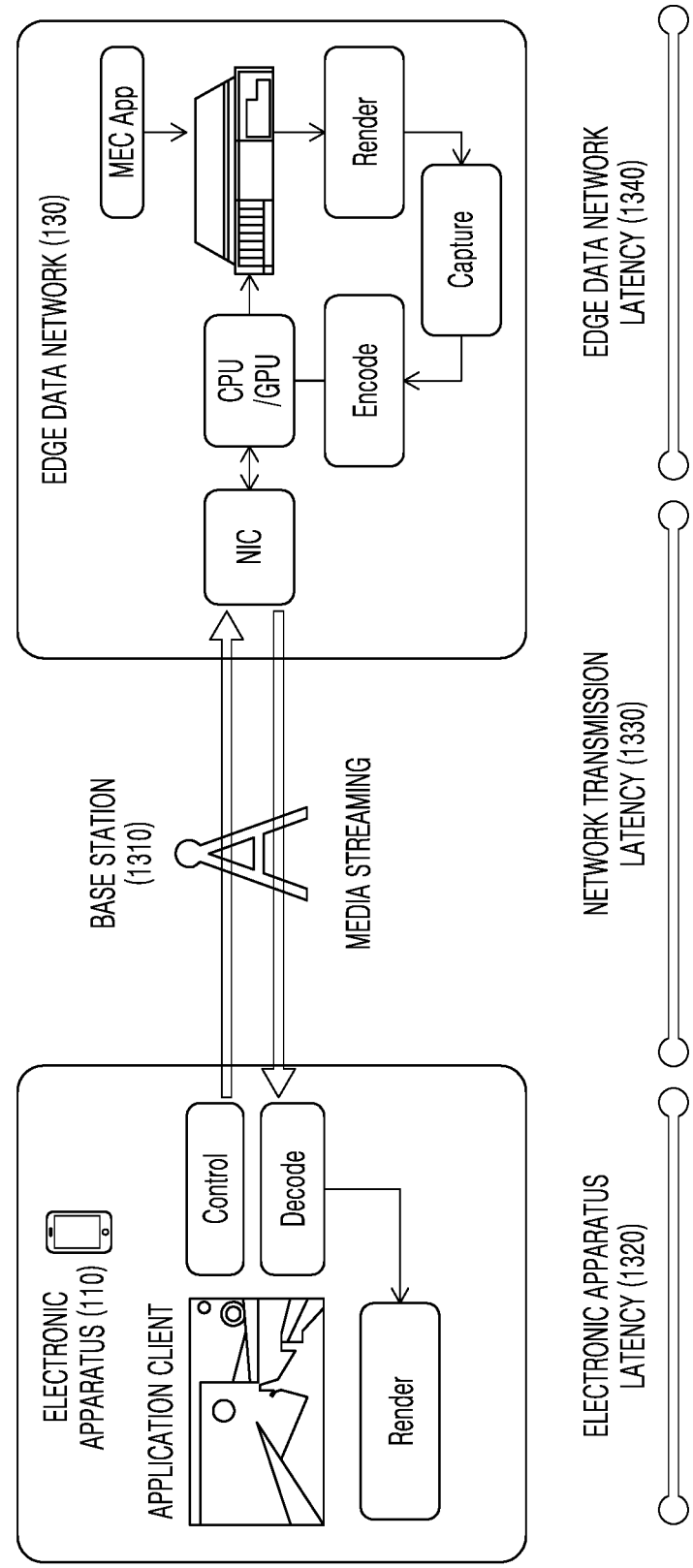
FIG. 13A is a diagram showing an example of a transmission latency in an environment of using an MEC service.

FIG. 13A is a diagram showing an example of a transmission latency in an environment of using an MEC service.

Referring to FIG. 13A, the electronic apparatus 110 may transmit or receive data to or from the edge data network 130 through a base station 1310. Accordingly, the electronic apparatus 110 may perform media streaming. An application performing the media streaming in the electronic apparatus 110 may denote an application client (for example, the first application client 111 or the second application client 113 of FIG. 9).

Here, electronic apparatus latency 1320, network transmission latency 1330, and edge data network latency 1340 may occur in the electronic apparatus 110, the base station 1310, and the edge data network 130, respectively.

According to an embodiment of the disclosure, the electronic apparatus latency 1320 may denote time required for information processing in the electronic apparatus 110. For example, the electronic apparatus latency 1320 may denote time required for the electronic apparatus 110 to control information to be transmitted, decode information received from the base station 1310, or render the decoded information into an image.

According to an embodiment of the disclosure, the network transmission latency 1330 may denote time required for the electronic apparatus 110 and the edge data network 130 to transmit or receive data through a network of the base station 1310.

According to an embodiment of the disclosure, the edge data network latency 1340 may denote time required for information processing in the edge data network 130. For example, the edge data network latency 1340 may denote time required for the edge data network 130 to render information to be transmitted in relation to an edge application (for example, the first MEC application 971 or the second MEC application 972 of FIG. 9), capture a rendered image, encode the captured image, process encoded information in a CPU or a graphics processing unit (GPU), and transmit the processed information through an NIC. Embodiments of the disclosure may provide a method of reducing latency in the edge data network 130 among the above latencies.

An RDMA protocol that may be used to reduce latency in the edge data network 130 will be described below with reference to FIGS. 14 through 16.

Figure 13B:
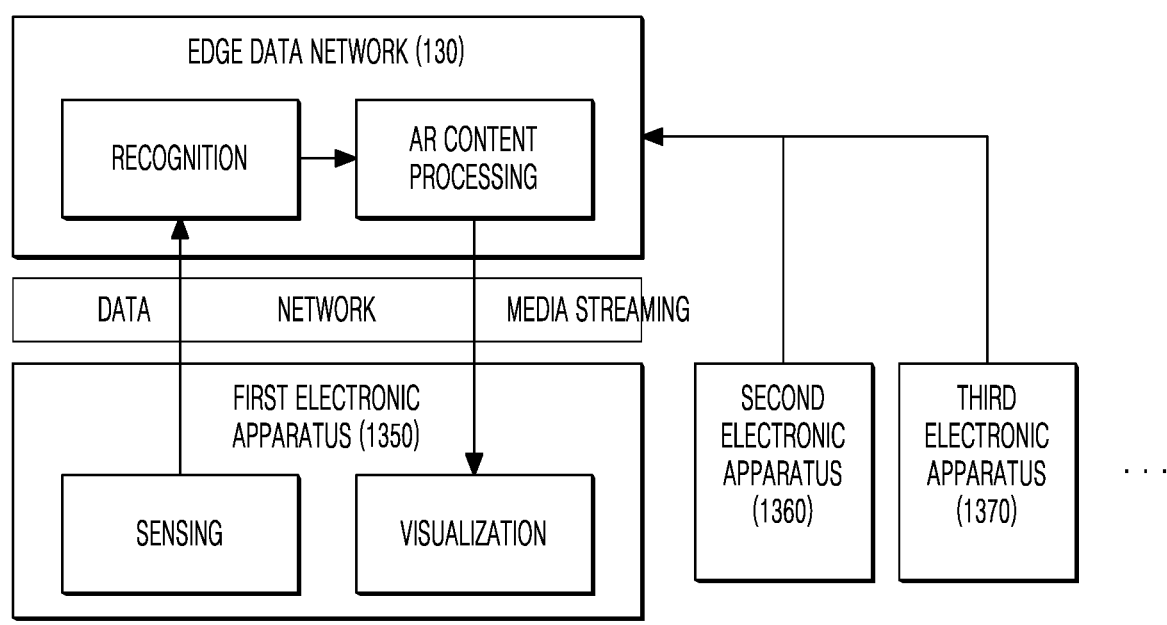
FIG. 13B is a diagram showing an example of an electronic apparatus providing an augmented reality (AR) service by using an edge data network.

FIG. 13B is a diagram showing an example of an electronic apparatus providing an augmented reality (AR) service by using the edge data network 130.

Referring to FIG. 13B, one or more electronic apparatuses (for example, a first electronic apparatus 1350, a second electronic apparatus 1360, and a third electronic apparatus 1370) may receive the AR service from the edge data network 130. According to an embodiment of the disclosure, the first electronic apparatus 1350 may correspond to the electronic apparatus 110 of FIG. 1.

For example, the first electronic apparatus 1350 may sense location-related information such as locations, inclinations, and the like of objects that are background of AR by using a global positioning sensor (GPS) and a six-axis sensor (for example, a six-axis tilt sensor). Then, the first electronic apparatus 1350 may transmit sensed data to the edge data network 130.

According to an embodiment of the disclosure, the edge data network 130 may receive the sensed data from the first electronic apparatus 1350. Then, the edge data network 130 may recognize an object and a space where the object is located, based on the sensed data. Then, the edge data network 130 may process information about the recognized object and space as AR content. For example, the AR content may include 2-dimensional (2D) or 3D content.

According to an embodiment of the disclosure, the edge data network 130 may transmit the AR content to the first electronic apparatus 1350. Then, the first electronic apparatus 1350 may visualize the received AR content. In other words, the first electronic apparatus 1350 may perform media streaming based on the AR content.

According to an embodiment of the disclosure, an NIC supporting an RDMA protocol may be included in the edge data network 130 or the electronic apparatus providing the AR service described with reference to FIG. 13B. In this case, the edge data network 130 and the electronic apparatus providing the AR service transmit and receive data through the RDMA protocol, and thus latency in the edge data network 130 or the electronic apparatus providing the AR service may be reduced.

Figure 13C:
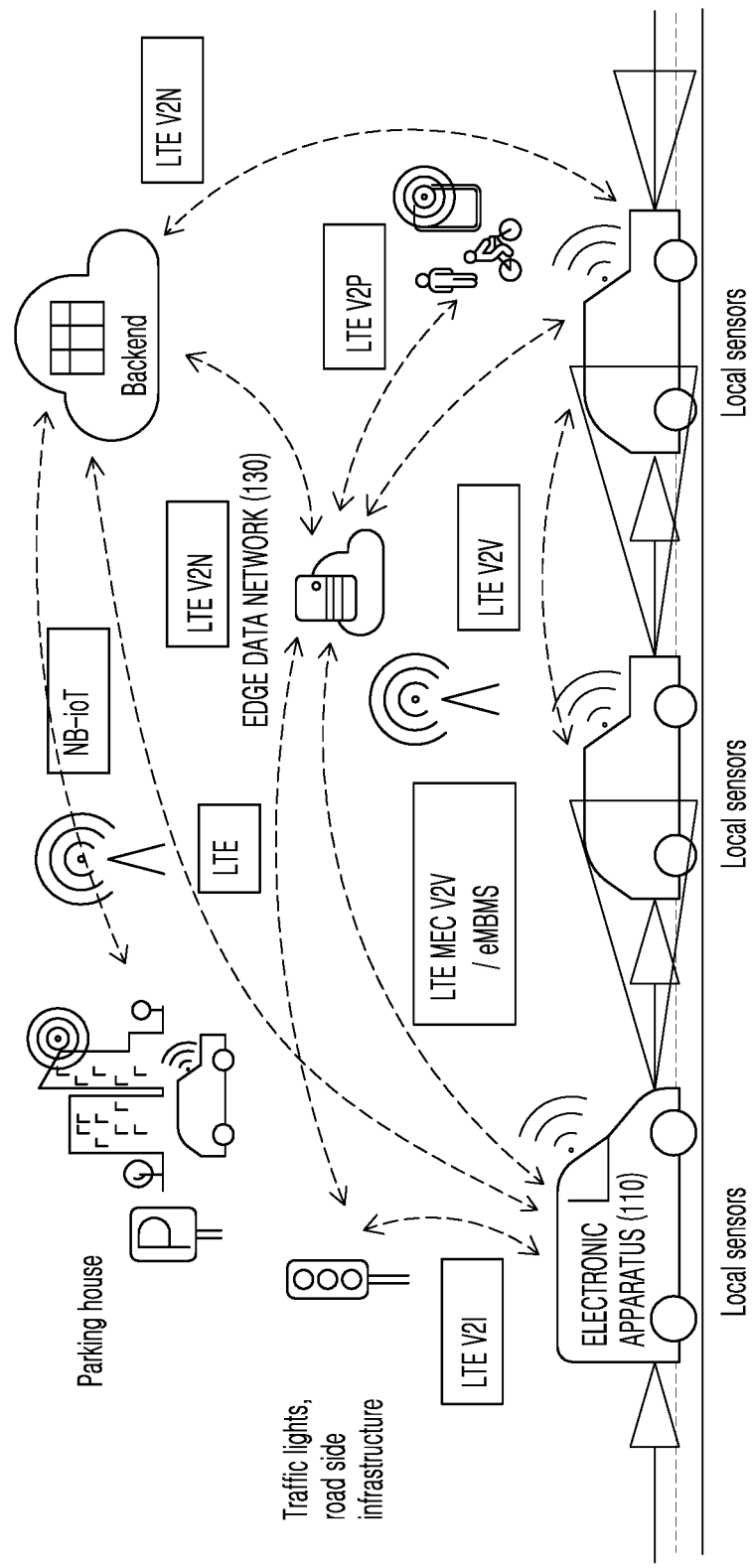
FIG. 13C is a diagram showing an example of a connected car communicating with an edge data network.

FIG. 13C is a diagram showing an example of a connected car communicating with the edge data network 130.

Referring to FIG. 13C, the electronic apparatus 110 may include a connected car communicably connected to various objects (for example, traffic lights, cars, and servers) to perform autonomous driving.

According to an embodiment of the disclosure, to provide an autonomous driving service, the electronic apparatus 110 may transmit and receive data to or from the edge data network 130. According to an embodiment of the disclosure, an NIC supporting an RDMA protocol may be included in the electronic apparatus 110 transmitting and receiving data to and from the edge data network 130. In this case, the electronic apparatus 110 may transmit and receive data to and from the edge data network 130 by using the RDMA protocol.

According to an embodiment of the disclosure, when the NIC supporting the RDMA protocol is included in the electronic apparatus 110 and the electronic apparatus 110 transmits and receives data to and from the edge data network 130 by using the RDMA protocol, latency in the electronic apparatus 110 may be reduced.

Figure 14:
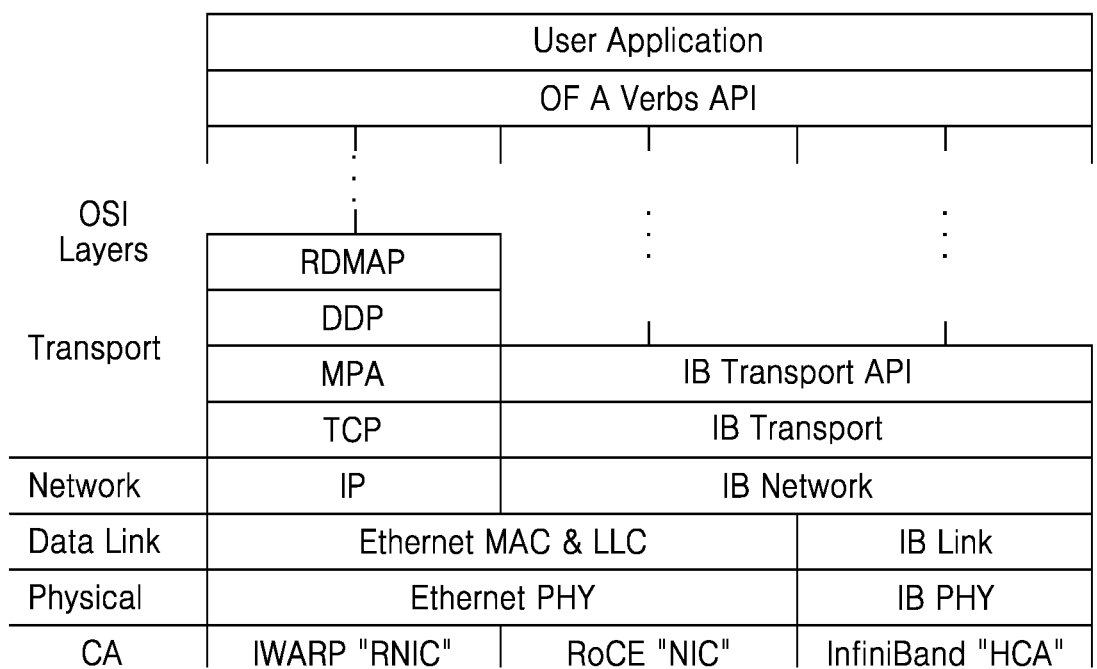
FIG. 14 illustrates a hierarchical structure of a remote direct memory access (RDMA) protocol, according to an example embodiment of the disclosure.

FIG. 14 illustrates a hierarchical structure of an RDMA protocol, according to an example embodiment of the disclosure.

Referring to FIG. 14, the RDMA protocol may be implemented in three types of protocol. For example, the three types of protocol may include an RDMA over converged Ethernet (RoCE) protocol, an Internet wide area RDMA protocol (iWARP), and an infinity band (InfiniBand) protocol.

The RoCE protocol may denote an RDMA protocol based on the Ethernet. In RoCE v2, routing may be possible based on UDP/IP but TOP-level packet transmission reliability may not be guaranteed. In general, the RoCE protocol may be mainly used in a network environment in a data sensor where routing is not required.

The iWARP protocol may denote an RDMA protocol based on TCP/IP. In iWARP, routing is possible based on TCP/IP and thus high level packet transmission reliability may be guaranteed. In general, iWARP may be mainly used in a network environment where routing is required such as a network between data centers. In the disclosure, iWARP is used among the three types of RDMA protocols described above.

The InfiniBand protocol may denote an RDMA protocol based on the self-standard (infinity band (IB) physical (PHY) or IB link) for supporting ultra-low latency and high bandwidth. In general, the InfiniBand protocol may be mainly used in an environment that requires ultra-low latency and very high network bandwidth, such as high-performance computing (HPC) and finance (for example, stocks).

In FIG. 14, each RDMA protocol may correspond to a channel adaptor (CA). For example, the CA of iWARP may be referred to as RDMA NIC (RNIC), the CA of RoCE protocol may be referred to as NIC, and the CA of the InfiniBand protocol may be referred to as a host channel adaptor (HCA). According to an embodiment of the disclosure, the iWARP may include an Ethernet PHY layer, an Ethernet media access control (MAC) & logical link control (LLC) layer, an IP layer, a TCP layer, an MPA layer, a DDP layer, and an RDMAP layer. According to an embodiment of the disclosure, the RoCE protocol may include an Ethernet PHY layer, an Ethernet MAC & LLC layer, an IB network layer, an IB transport layer, and an IB transport API. The iWARP, the RoCE protocol, and the InfiniBand protocol may be implemented as an open fabrics alliance (OFA) verbs API, and may include a user application layer.

Figure 15:
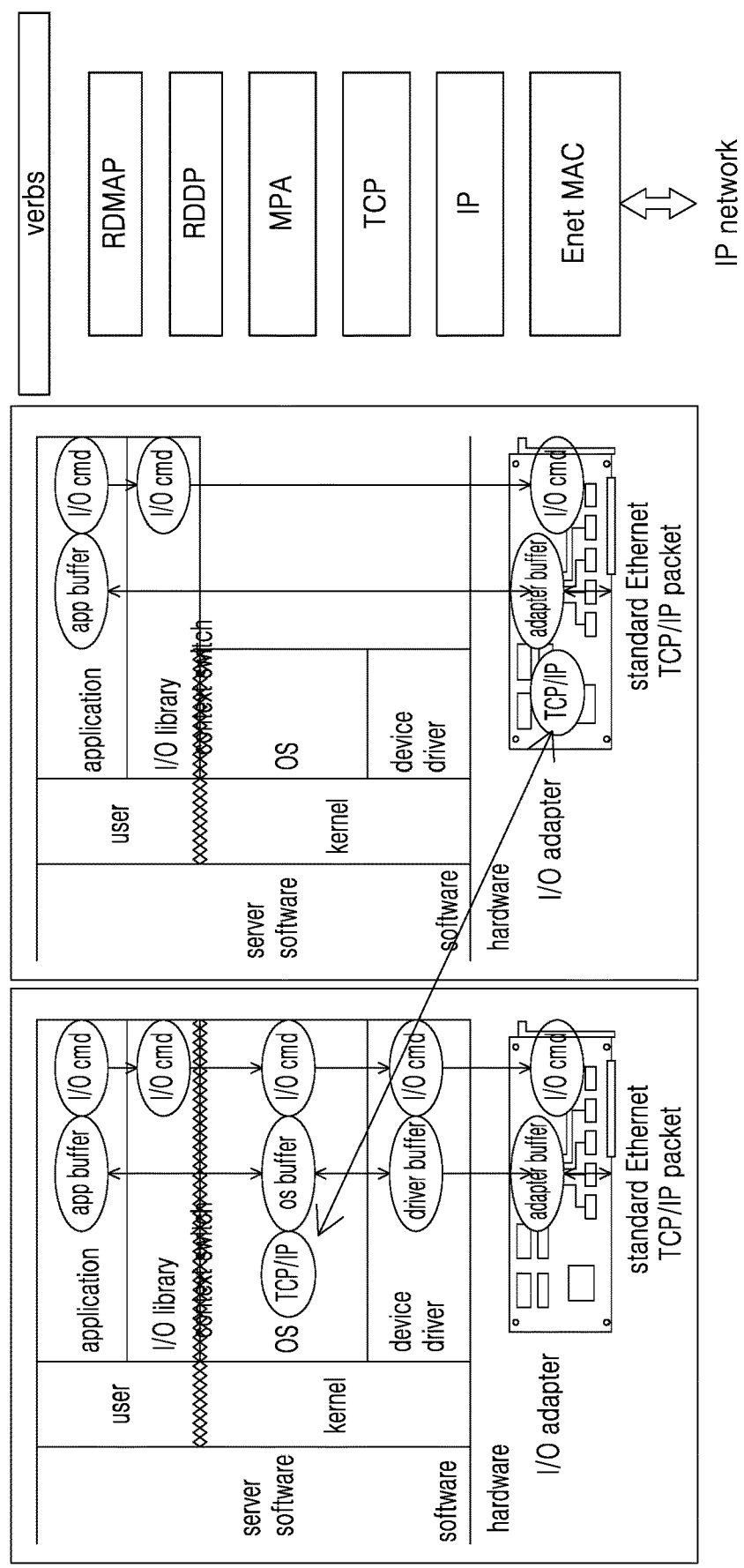
FIG. 15 is a diagram for describing a method of implementing an Internet wide area RDMA protocol (iWARP), according to an example embodiment of the disclosure.

FIG. 15 is a diagram for describing a method of implementing iWARP, according to an example embodiment of the disclosure.

Referring to FIG. 15, iWARP may denote a network protocol allowing RDMA to be performed based on TCP. iWARP may use RDMA via the standard Ethernet infrastructure (switches). An NIC supporting iWARP needs to be used for high performance of RDMA. When the NIC supporting iWARP is not used, all iWARP stacks are implemented as software and most RDMA performance may not be high.

In general, when iWARP is used, three detailed protocols may be configured on a TCP/IP stack. For example, the three details protocols may include a marker PDU aligned (MPA) protocol, a remote direct data placement (PDDP) protocol, and a RDMA protocol (RDMAP). According to an embodiment of the disclosure, verbs may be included in an application layer, an input/output (I/O) library layer, or an OS of a kernel.

According to an embodiment of the disclosure, iWARP may denote a protocol of processing, in a hardware manner, data to be transmitted by implementing a TCP/IP function provided by an OS in a hardware component (for example, an NIC) and implementing an additional protocol in a hardware component. According to an embodiment of the disclosure, the TCP/IP function being implemented in the hardware component (for example, the NIC) may be referred to as a TCP offloading engine (ToE).

For example, in FIG. 15, the TCP/IP function implemented as software on an OS of a kernel of server software may be implemented in a hardware manner on an I/O adaptor of a server (for example, implemented as an NIC). Also, a protocol for iWARP, such as the MPA protocol, the DDP protocol, and the RDMAP, may also be implemented in a hardware manner on the I/O adaptor of the server (for example, implemented as an NIC).

Figure 16:
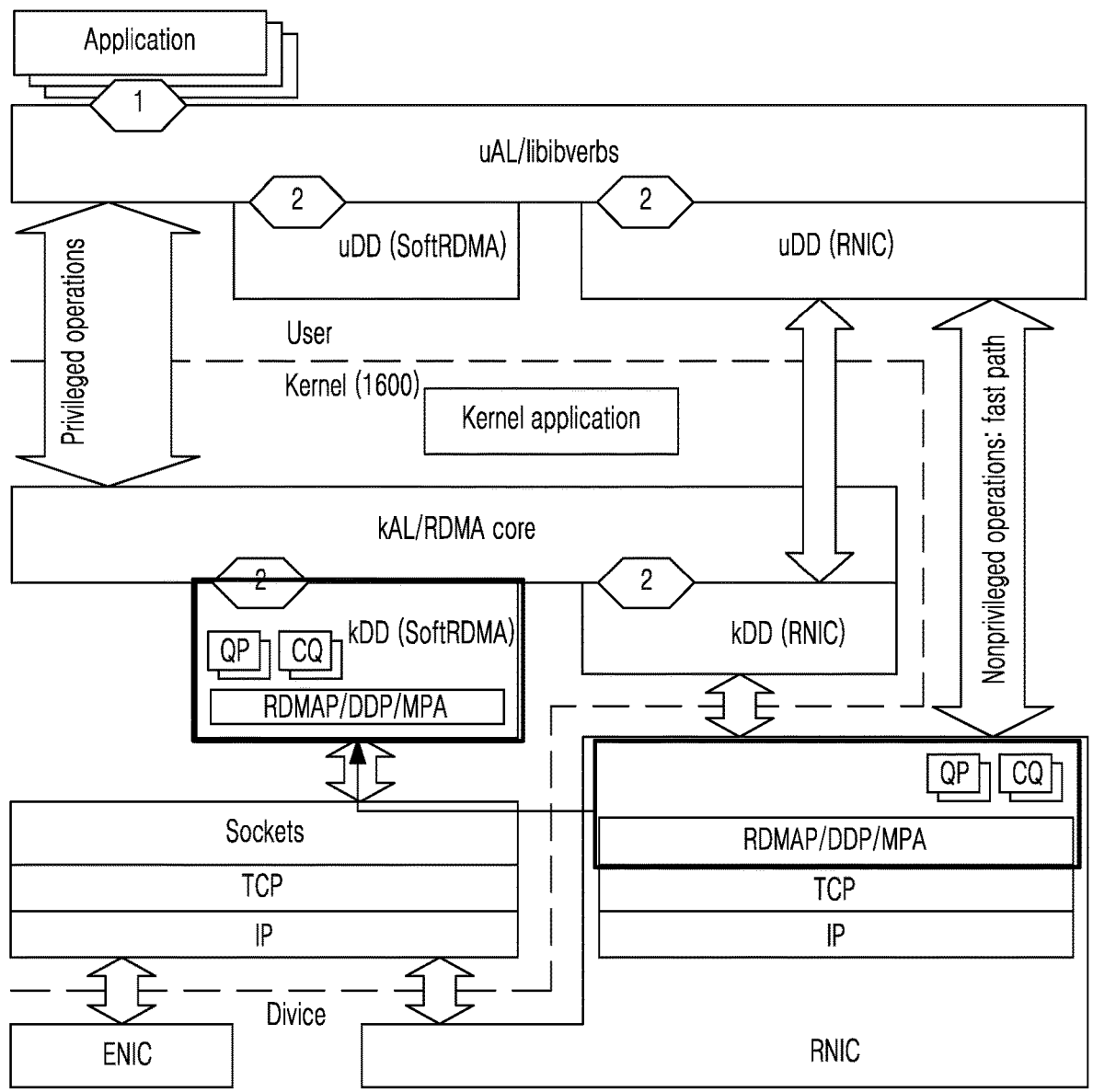
FIG. 16 is a diagram for describing a method of implementing an iWARP in software on a kernel, according to an example embodiment of the disclosure.

FIG. 16 is a diagram for describing a method of implementing iWARP in software on a kernel 1600, according to an embodiment of the disclosure.

Referring to FIG. 16, iWARP may be implemented in a software manner on the kernel 1600. According to an embodiment of the disclosure, iWARP being implemented in the software manner on the kernel 1600 may be referred to as siftiWARP. For example, the softiWARP may implement the RDMAP, DDP, and MPA protocol on a kernel module and use a TCP/IP stack of the kernel 1600. In other words, in the softiWARP, the RDMAP, DDP, and MPA protocol may be implemented in the software manner on the kernel 1600.

According to an embodiment of the disclosure, in case of a hardware-based iWARP, the RDMAP, DDP, and MPA protocol may be implemented on an NIC. Here, the TCP/IP stack may also be implemented on hardware (for example, an NIC) (for example, ToE).

According to an embodiment of the disclosure, when softiWARP is used, a terminal (for example, the electronic apparatus 110) without an NIC supporting an RDMA protocol may also communicate with a server (for example, the edge data network 130) by using the RDMA protocol. When the server (for example, the edge data network 130) communicating with the terminal (for example, the electronic apparatus 110) in which the softiWARP is implemented performs communication using the RDMA protocol, a packet processing CPU utilization of the server (for example, the edge data network 130) and packet latency in the server (for example, the edge data network 130) may be reduced. Accordingly, unidirectional end-to-end latency that occurs when the server (for example, the edge data network 130) transmits data to the terminal (for example, the electronic apparatus 110) may be reduced.

In embodiments of the disclosure, the RDMA protocol may be implemented in a software manner on the electronic apparatus 110. For example, iWARP may be implemented as software on a kernel of the electronic apparatus 110, in a form of softiWARP. In embodiments of the disclosure, the RDMA protocol may be implemented in a hardware manner on the edge data network 130. For example, iWARP may be implemented as hardware on an NIC of the edge data network 130. Accordingly, when the edge data network 130 transmits data to the electronic apparatus 110, latency in the edge data network 130 may be reduced. FIGS. 8, 15, and 16 are described based on iWARP, but the disclosure is not limited thereto. For example, the RDMA protocol of the disclosure may be executed based on an RoCE protocol.

Figure 17:
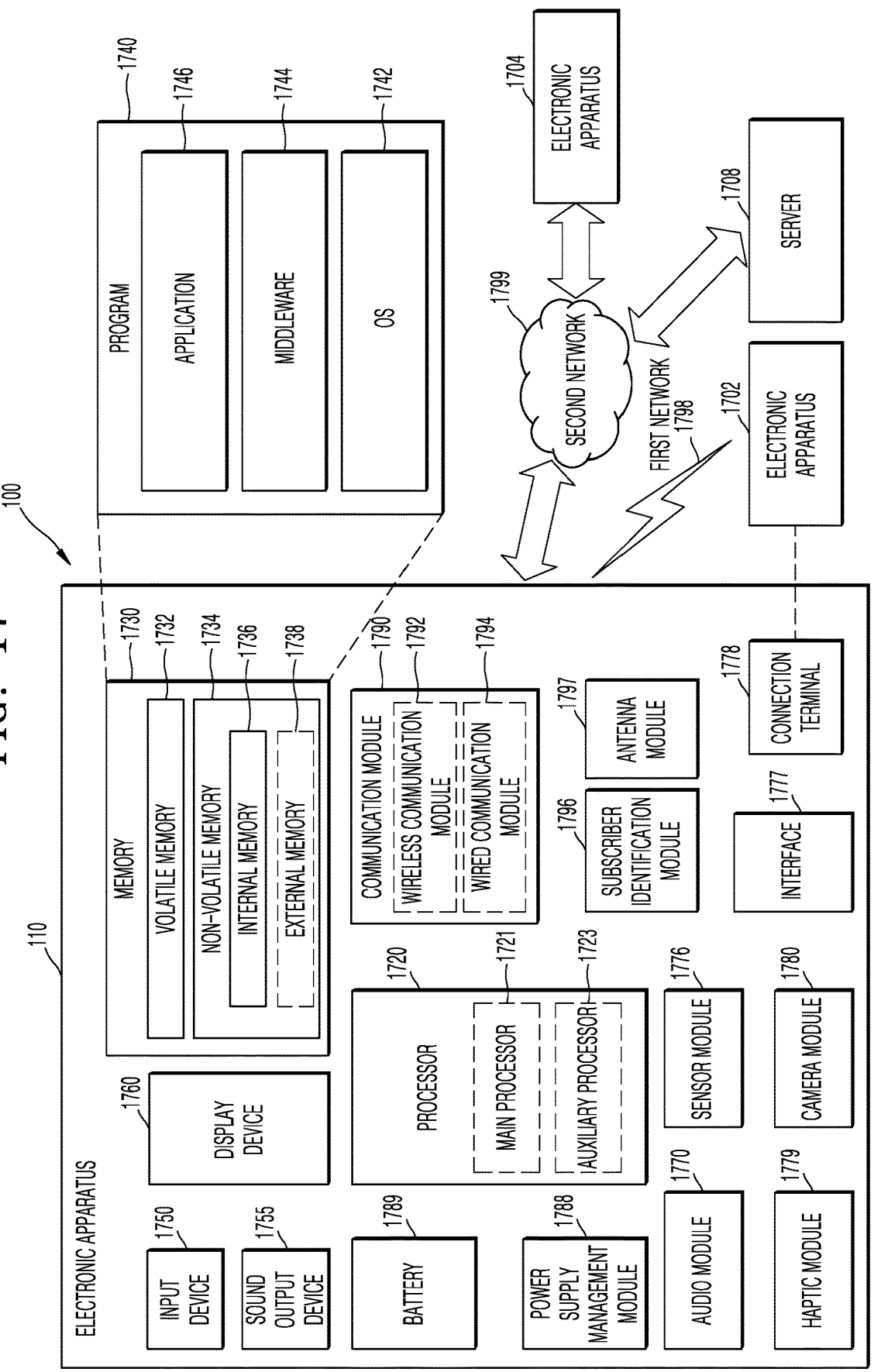
FIG. 17 is a block diagram of an electronic apparatus according to an example embodiment of the disclosure.

FIG. 17 is a block diagram of the electronic apparatus 110 according to an example embodiment of the disclosure.

FIG. 17 is a block diagram of the electronic apparatus 110 in the network environment 100, according to various embodiments of the disclosure.

Referring to FIG. 17, the electronic apparatus 110 in the network environment 100 may communicate with an electronic apparatus 1702 via a first network 1798 (for example, a short distance wireless communication network) or communicate with an electronic apparatus 1704 or a server 1708 via a second network 1799 (for example, a long distance wireless communication network). According to an embodiment of the disclosure, the electronic apparatus 110 may communicate with the electronic apparatus 1704 via the server 1708. According to an embodiment of the disclosure, the electronic apparatus 110 may include a processor 1720, a memory 1730, an input device 1750, a sound output device 1755, a display device 1760, an audio module 1770, a sensor module 1776, an interface 1777, a haptic module 1779, a camera module 1780, a power supply management module 1788, a battery 1789, a communication module 1790, a subscriber identification module 1796, and an antenna module 1797. According to some embodiments of the disclosure, the electronic apparatus 110 may not include at least one of the components (for example, the display device 1760 or the camera module 1780) or may additionally include one or more other components. According to some embodiments of the disclosure, some of the components may be implemented as one integrated circuit. For example, the sensor module 1776 (for example, a fingerprint sensor, an iris sensor, or an illumination sensor) may be implemented by being embedded in the display device 1760 (for example, a display).

The processor 1720 may control at least one component (for example, a hardware or software component) of the electronic apparatus 110 connected to the processor 1720 by executing, for example, software (for example, a program 1740) and perform various data processes and operations. According to an embodiment of the disclosure, as at least a part of the data processes or operations, the processor 1720 may load a command or data received from another component (for example, the sensor module 1776 or the communication module 1790) on a volatile memory 1732, process the command or data stored in the volatile memory 1732, and store result data in a non-volatile memory 1734.

According to an embodiment of the disclosure, the processor 1720 may execute an application client and transmit, to the edge data network 130, a request message for verifying a network protocol to be used by the application client as the application client is executed. Also, the processor 1720 may receive, from the edge data network 130, a response message indicating the network protocol to be used by the application client. The processor 1720 may update a network protocol to be used by a UE application, based on the response message. The processor 1720 may select a network socket corresponding to the updated network protocol. The processor 1720 may use the selected network socket to receive data generated with respect to the application client, from the edge data network 130.

According to an embodiment of the disclosure, the processor 1720 may include a main processor 1721 (for example, a CPU or an application processor (AP), and an auxiliary processor 1723 (for example, a GPU, an image signal processor (ISP), a sensor hub processor, or a communication processor (CP)) that is operable independently from or together with the main processor 1721. Additionally or alternatively, the auxiliary processor 1723 may be set to use lower power than the main processor 1721 or may be specified to an assigned function. The auxiliary processor 1723 may be implemented separately from or as a part of the main processor 1721.

The auxiliary processor 1723 may control at least some of functions or states related to at least one component (for example, the display device 1760, the sensor module 1776, or the communication module 1790) among the components of the electronic apparatus 110, for example, instead of the main processor 1721 while the main processor 1721 is in an inactive (for example, sleep) state or together with the main processor 1721 while the main processor 1721 is in an active (for example, application execution) state. According to an embodiment of the disclosure, the auxiliary processor 1723 (for example, the ISP or the CP) may be implemented as a part of another component (for example, the camera module 1780 or the communication module 1790) that is functionally related.

The memory 1730 may store various pieces of data used by at least one component (for example, the processor 1720 or the sensor module 1776) of the electronic apparatus 110. The data may include, for example, the software (for example, the program 1740) or input data or output data regarding a command related to the software. The memory 1730 may include the volatile memory 1732 and the non-volatile memory 1734.

The non-volatile memory 1734 may include an internal memory 1736 and an external memory 1738.

The program 1740 may be stored in the memory 1730 as the software and may include, for example, an OS 1742, middleware 1744, and an application 1746. According to an embodiment of the disclosure, the program 1740 may include the first application client 111 and the second application client 113 of FIG. 1. Also, the program 1740 may include the edge enabler client 810 of FIG. 8.

The input device 1750 (including, for example, input circuitry) may receive a command or data to be used by a component (for example, the processor 1720) of the electronic apparatus 110 from outside (for example, a user) of the electronic apparatus 110. The input device 1750 may include, for example, a microphone, a mouse, a keyboard, or a digital pen (for example, a stylus pen).

The sound output device 1755 (including, for example, sound output circuitry) may output a sound signal outside the electronic apparatus 110. The sound output device 1755 may include, for example, a speaker or a receiver. The speaker may be used for a general purpose, such as multimedia reproduction or recording reproduction, and the receiver may be used to receive an incoming call. According to an embodiment of the disclosure, the receiver may be implemented separately from or as a part of the speaker.

The display device 1760 (including, for example, display circuitry) may visually provide information to the outside (for example, the user) of the electronic apparatus 110. The display device 1760 may include, for example, a display, a hologram device, a projector, and a control circuit for controlling thereof. According to an embodiment of the disclosure, the display device 1760 may include a touch circuitry configured to detect touch or a sensor circuitry (for example, a pressure sensor) configured to measure strength of force generated by the touch.

The audio module 1770 (including, for example, audio circuitry) may convert sound into an electric signal or vice versa. According to an embodiment of the disclosure, the audio module 1770 may obtain sound through the input device 1750 or output sound through the sound output device 1755 or an external electronic apparatus (for example, the electronic apparatus 1702 (for example, a speaker or a headphone)) connected to the electronic apparatus 110 directly or wirelessly.

The sensor module 1776 (including, for example, sensor circuitry) may detect an operation state (for example, power supply or temperature) of the electronic apparatus 110 or an external environment state (for example, a user state), and generate an electric signal or data value corresponding to the detected state. According to an embodiment of the disclosure, the sensor module 1776 may include a sensor module including, for example, a gesture sensor, a gyro sensor, a barometer sensor, a magnetic sensor, an acceleration sensor, a grip sensor, a proximity sensor, a color sensor (for example, a red, green, blue (RGB) sensor), an infrared (IR) sensor, a biometric sensor, a temperature sensor, a humidity sensor, an illuminance sensor, or sensors related to an autonomous driving car (for example, an inertial measurement unit (IMU), a GPS sensor, a camera, a light imaging detection and ranging (LIDAR), and a radio detection and ranging (RADAR).

The interface 1777 (including, for example, interface circuitry) may support at least one assigned protocol that may be used to be connected to an external electronic apparatus (for example, the electronic apparatus 1702) of the electronic apparatus 110 directly or wirelessly. According to an embodiment of the disclosure, the interface 1777 may include, for example, a high definition multimedia interface (HDMI), a universal serial bus (USB) interface, a secure digital (SD) card interface, or an audio interface.

A connection terminal 1778 may include a connector through which the electronic apparatus 110 is physically connected to the external electronic apparatus (for example, the electronic apparatus 1702) According to an embodiment of the disclosure, the connection terminal 1778 may include, for example, an HDMI connector, a USB connector, an SD card connector, or an audio connector (for example, a headphone connector).

The haptic module 1779 (including, for example, haptic circuitry) may convert an electric signal into a mechanical stimulus (for example, vibration or movement) or into electric stimulus that may be recognized by a user via his/her tactile or motion senses. According to an embodiment of the disclosure, the haptic module 1779 may include, for example, a motor, a piezoelectric element, or an electrical stimulation device.

The camera module 1780 (including, for example, one or more cameras) may capture a still image or a moving image. According to an embodiment of the disclosure, the camera module 1780 may include one or more lenses, image sensors, image signal processors, or flashes.

The power supply management module 1788 may manage power supplied to the electronic apparatus 110. According to an embodiment of the disclosure, the power supply management module 1788 may be implemented as, for example, at least a part of a power management integrated circuit (PMIC).

The battery 1789 may supply power to at least one component of the electronic apparatus 110. According to an embodiment of the disclosure, the battery 1789 may include, for example, a non-rechargeable primary battery, a rechargeable secondary battery, or a fuel cell.

The communication module 1790 (including, for example, communication circuitry) may establish a direct (for example, wired) communication channel or a wireless communication channel between the electronic apparatus 110 and an external electronic apparatus (for example, the electronic apparatus 1702, the electronic apparatus 1704, or the server 1708) and support communication through the established communication channel. The communication module 1790 may include one or more communication processors that is operated independently from the processor 1720 (for example, the application processor) and supporting direct (for example, wired) communication or wireless communication. According to an embodiment of the disclosure, the communication module 1790 may include a wireless communication module 1792 (for example, a cellular communication module, a short distance wireless communication module, or a global navigation satellite system (GNSS) communication module including wireless communication circuitry) or a wired communication module 1794 (for example, a local area network (LAN) communication module or a power line communication line including wired communication circuitry). Thereamong, a corresponding communication module may communicate with the external electronic apparatus via the first network 1798 (for example, a short distance communication network such as Bluetooth, WiFi direct, or infrared data association (IrDA)) or the second network 1799 (for example, a long distance communication network such as a cellular network, the Internet, or a computer network (for example, LAN or a wide area network (WAN)). Such several types of communication modules may be integrated in one component (for example, a single chip) or implemented as a plurality of individual components (for example, a plurality of chips).

The wireless communication module 1792 may verify and authenticate the electronic apparatus 110 in a communication network such as the first network 1798 or the second network 1799 by using subscriber information (for example, international mobile subscriber identity (IMSI) stored in the subscriber identification module 1796.

The antenna module 1797 may transmit or receive a signal or power to or from the outside (for example, an external electronic apparatus). According to an embodiment of the disclosure, the antenna module 1797 may include one antenna including a conductor formed on a substrate (for example, a printed circuit board (PCB)) or a radiator having a conductive pattern. According to an embodiment of the disclosure, the antenna module 1797 may include a plurality of antennas. In this case, at least one antenna suitable to a communication method used in a communication network such as the first network 1798 or the second network 1799 may be selected from the plurality of antennas by, for example, the communication module 1790. The signal or power may be transmitted or received between the communication module 1790 and the external electronic apparatus via the selected at least one antenna. According to some embodiments of the disclosure, another component (for example, a radio frequency integrated circuit (RFIC)) other than the radiator may be additionally provided as a part of the antenna module 1797.

At least some of the above components may be connected to each other via a communication method (for example, a bus, a general purpose input and output (GPIO), a serial peripheral interface (SPI), or a mobile industry processor interface (MIPI) between peripheral devices), and exchange a signal (for example, a command or data) therebetween.

According to some embodiments of the disclosure, the command or data may be transmitted or received between the electronic apparatus 110 and the electronic apparatus 1704 through the server 1708 connected to the second network 1799. The electronic apparatuses 1702 and 1704 may each be a type same as or different from the electronic apparatus 110.

According to an embodiment of the disclosure, all or some of operations performed by the electronic apparatus 110 may be performed by one or more external apparatuses among the external electronic apparatuses (the electronic apparatus 1702, the electronic apparatus 1704, and the server 1708). For example, when the electronic apparatus 110 is to perform a function or service automatically or in response to a request from the user or another apparatus, the electronic apparatus 110 may request one or more external electronic apparatuses (the electronic apparatuses 1702 and 1704) to perform at least a part of the function or service instead of or in addition to the function or service performed by itself. Upon receiving the request, the one or more external electronic apparatuses (the electronic apparatuses 1702 and 1704) may perform the requested at least a part of the function or service or an additional function or service related to the request, and transmit a result of the performing to the electronic apparatus 110. The electronic apparatus 110 may provide the result as it is or process the result, and then may provide the result as at least a part of a response to the request. In this regard, for example, a cloud computing, distributed computing, or client-server computing technology may be used.

Figure 18:
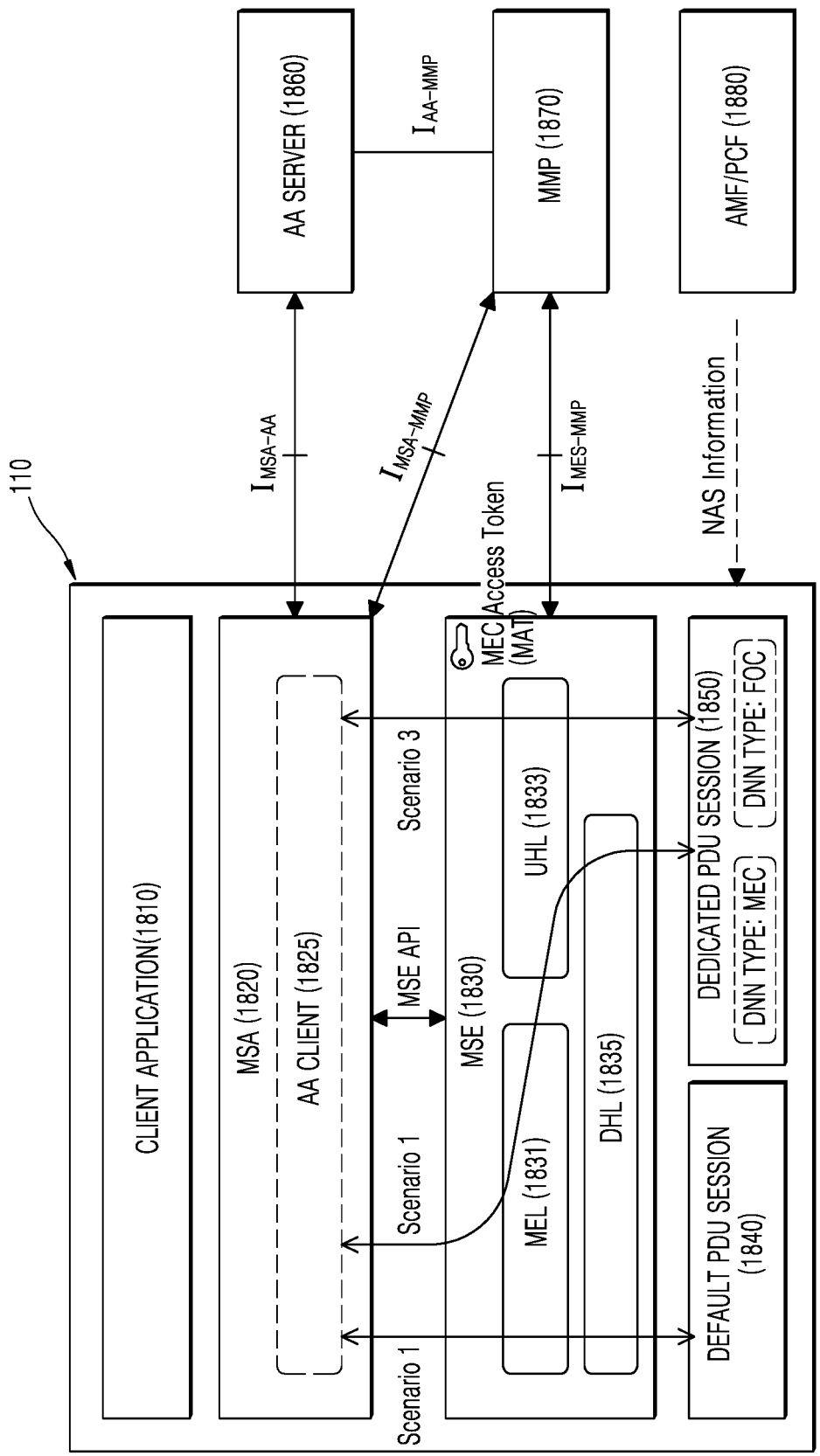
FIG. 18 is a diagram of an electronic apparatus and an external server for supporting an MEC-based service, according to an example embodiment of the disclosure.

FIG. 18 is a diagram of an electronic apparatus and an external server for supporting an MEC-based service, according to an example embodiment of the disclosure.

FIG. 18 illustrates an example of a software architecture for the electronic apparatus 110 to perform MEC authentication/authorization (MEC AA) and MEC discovery.

According to an embodiment of the disclosure, the electronic apparatus 110 may include at least one application for an MEC service (hereinafter, referred to as a client application 1810), service agent for an MEC service (hereinafter, referred to as MSA 1820), and a service enabler for an MEC service (hereinafter, referred to as MSE 1830). According to an embodiment of the disclosure, the electronic apparatus 110 may include a network interface (for example, the wireless communication module 1792 of FIG. 17) for establishment of a protocol data unit (PDU) session related to data transmission, and although not shown, may include a network driver (for example, software) controlling driving of the network interface. According to an embodiment of the disclosure, the client application 1810, the MSA 1820, and the MSE 1830 may be configured to be mounted on the electronic apparatus 110 as software or to have a physical configuration. According to an embodiment of the disclosure, the MSA 1820 and the MSE 1830 may be driven as a part of a processor (for example, the processor 1720 of FIG. 17). According to an embodiment of the disclosure, the MSA 1820 and the MSE 1830 may be individual hardware components operated independently from the processor 1720. According to another embodiment of the disclosure, the MSA 1820 and the MSE 1830 may be software (for example, the program 1740 of FIG. 17). For example, the MSA 1820 and the MSE 1830 in a software form may be stored in a memory (for example, the memory 1730 of FIG. 17) as instructions and operations of the MSA 1820 and the MSE 1830 may be performed by the processor 1720.

According to an embodiment of the disclosure, the client application 1810 may include a third party application installed in the electronic apparatus 110 by a user. According to an embodiment of the disclosure, the client application 1810 may be an application using an MEC service or a fog computing (FOC) service.

According to an embodiment of the disclosure, the client application 1810 for MEC may denote an application of the electronic apparatus 110 accessing an MEC application (for example, the first edge application 131 or the second edge application 133 of FIG. 1) driven by an MEC host (for example, the edge data network 130 of FIG. 1). According to an embodiment of the disclosure, the MEC application may denote an application communicating with the client application 1810 by being installed and executed in the MEC host (for example, the edge data network 130 of FIG. 1) adjacent to or in the vicinity of the user. According to an embodiment of the disclosure, the client application 1810 may be authenticated via the MSA 1820 (for example, a service agent) operating as a separate authentication client. According to an embodiment of the disclosure, the client application 1810 may access a network based on a particular PDU session (for example, an MEC dedicated PDU session) via a network interface or access an MEC application based on an existing PDU session (for example, a default PDU session 1840) via a DNS proxy function of the MSE 1830 (for example, a service enabler).

According to an embodiment of the disclosure, upon receiving MSE service authentication and authorization through communication with an AA server 1860, the MSA 1820 may enable/disable the MSE 1830 (for example, enable/disable the MSE service) by using an MSE application programming interface (API) with respect to an authorized service type, register a unique identifier (UID) and rule (for example, ApnSettings) of the client application 1810 available for each service type, and request routing setting. According to an embodiment of the disclosure, the MSE API may include an API provided from the electronic apparatus 110 to a higher application layer for enabling/disabling for each MSE service type and routing rule setting for each UID. Also, the MSE API may include an API for setting a policy for MEC discovery, a context monitoring policy, or the like. According to an embodiment of the disclosure, the client application 1810 may access a corresponding service (for example, MEC or FOC) via authentication and authorization assignment with the MSA 1820.

According to an embodiment of the disclosure, the MSA 1820 may configure a dedicated PDU session 1850 by directly requesting a URSP handling layer (UHL) 1833 of the MSE 1830 without passing through an MEL 1831 of the MSE 1830. For example, based on a sponsored application being executed in the electronic apparatus 110, the MSA 1820 may provide a corresponding service through the dedicated PDU session 1850 by requesting the UHL 1833, when pre-agreed with a specific server or network. According to an embodiment of the disclosure, the MSA 1820 may provide separate information for identifying a service to the UHL 1833 by further generating the separate information or receiving the separate information from an external server. In FIG. 18, the MEL 1831 is included in the MSE 1830, but an embodiment of the disclosure is not limited thereto. In other words, in embodiments of the disclosure, the sum of the MSA 1820 and the MSE 1830 may denote an MEL.

According to an embodiment of the disclosure, the MSE 1830 may include the MEL 1831, the UHL 1833, and a domain name system (DNS) handling layer (DHL) 1835. However, in FIG. 18, the MEL 1831 is included in the MSE 1830, but an embodiment of the disclosure is not limited thereto. In other words, in embodiments of the disclosure, the sum of the MSA 1820 and the MSE 1830 may denote an MEL.

According to an embodiment of the disclosure, the MEL 1831 may perform a task required to use an MEC service among MSE services. For example, the MEL 1831 may process functions of MEC service registration, MEC service discovery, route selection (for example, DNN handling), performance pre-measurement, location services, and/or mobility handling.

According to an embodiment of the disclosure, the UHL 1833 may request dedicated PDU session for each service type according to API call and bind to the dedicated PDU session set for a corresponding application.

According to an embodiment of the disclosure, the DHL 1835 may support a DNS pre-resolving or DNS proxy function for a third party application.

According to an embodiment of the disclosure, the AA server 1860 may provide authentication and authorization assignment for use of the MSE service. According to an embodiment of the disclosure, the MSA 1820 of the electronic apparatus 110 may be authenticated via the AA server 1860 and authorized for each service type according to subscriber information.

According to an embodiment of the disclosure, an MMP server (hereinafter, simply referred to as MMP) 1870 may denote a proxy server communicating with the electronic apparatus 110 for authentication of the electronic apparatus 110 or for MEC control. According to an embodiment of the disclosure, the MMP 1870 may perform request/response message exchange based on, for example, hypertext transfer protocol (HTTP).

According to an embodiment of the disclosure, an access and mobility function (AMF)/policy control function (PCF) server 1880 may register MMP information and UE route selection policy (URSP) rule in PCF and receive corresponding information from AMF via NAS signaling, for example, when MEC is supported in the 5G new radio (NR) standard.

According to an embodiment of the disclosure, a method, performed by an electronic apparatus, of identifying a network protocol to be used by an application client includes: executing the application client; based on the application client being executed, transmitting a request message for verifying the network protocol to be used by the application client to an edge data network; receiving, from the edge data network, a response message indicating the network protocol to be used by the application client; updating a network protocol policy corresponding to the network protocol to be used by the application client to a data socket, based on the response message; selecting a network socket corresponding to the network protocol to be used by the application client, by using the data socket; and receiving data generated with respect to the application client, from the edge data network by using the selected network socket.

According to an embodiment of the disclosure, the network protocol to be used by the application client may be selected by the edge data network from among a plurality of network protocols.

According to an embodiment of the disclosure, an edge application used to form a data session with the application client may be generated by the edge data network, wherein the receiving of the generated data may include receiving the generated data from the edge data network, through the data session generated by using the edge application.

According to an embodiment of the disclosure, at least one other edge data network connected to the edge data network may be determined based on a pre-set standard related to distribution of the edge application, and the edge application may be distributed from the edge data network to the at least one other edge data network.

According to an embodiment of the disclosure, the plurality of network protocols may include a transmission control protocol (TCP), a remote direct memory access (RDMA) protocol, and a multipath transmission control protocol (MPTCP), and the network protocol to be used by the application client may be selected based on whether the RDMA protocol is supported or MPTCP is supported in the edge data network or the at least one other edge data network.

According to an embodiment of the disclosure, the plurality of network protocols may include TCP, an RDMA protocol, and MPTCP, and the network protocol to be used by the application client may be selected based on a network interface card (NIC) currently available from among NICs supporting the RDMA protocol or NICs supporting MPTCP, which are provided by the edge data network or the at least one other edge data network.

According to an embodiment of the disclosure the plurality of network protocols may include TCP, an RDMA protocol, and MPTCP, and the network protocol to be used by the application client may be selected based on whether the RDMA protocol is supported or MPTCP is supported in the electronic apparatus.

According to an embodiment of the disclosure, the method may further include transmitting, to the edge data network, information about a standard pre-set to select a network protocol regarding the application client.

According to an embodiment of the disclosure, the plurality of network protocols may include TCP, an RDMA protocol, and MPTCP, and when a network protocol to be applied to the application client is determined to be the RDMA protocol or MPTCP according to the pre-set standard, the edge application may be distributed to the edge data network or at least one other edge data network connected to the edge data network, the edge application may support the RDMA protocol or MPTCP, and the edge data network or the at least one other edge data network may support the RDMA protocol or MPTCP.

According to an embodiment of the disclosure, the network protocol to be used by the application client may be selected based on an NIC currently available from among NICs supporting the RDMA protocol or NICs supporting MPTCP, which are provided by the edge data network or the at least one other edge data network.

According to another embodiment of the disclosure, a method, performed by an edge data network, of identifying a network protocol to be used by an application client of an electronic apparatus includes: based on the electronic apparatus executing the application client, receiving, from the electronic apparatus, a request message for verifying a network protocol to be used by the application client;

selecting the network protocol to be used by the application client from among a plurality of network protocols; transmitting a response message indicating the network protocol to be used by the application client to the electronic apparatus, based on a result of the selecting; and transmitting, to the electronic apparatus, data generated with respect to the application client by using a network socket selected based on the response message.

According to an embodiment of the disclosure, the method may further include generating an edge application used to form a data session with the application client, wherein the transmitting of the generated data may include transmitting the generated data to the electronic apparatus through the data session generated by using the edge application.

According to an embodiment of the disclosure, the method may further include determining at least one other edge data network connected to the edge data network, based on a pre-set standard related to distribution of the edge application; and distributing the edge application to the at least one other edge data network.

According to an embodiment of the disclosure, the plurality of network protocols may include a transmission control protocol (TCP), a remote direct memory access (RDMA) protocol, and a multipath transmission control protocol (MPTCP), wherein the selecting of the network protocol to be used by the application client from among the plurality of network protocols may include: verifying whether the edge data network or the at least one other edge data network supports the RDMA protocol or MPTCP; and selecting the network protocol to be used by the application client, based on a result of the verifying.

According to an embodiment of the disclosure, the plurality of network protocols may include TCP, an RDMA protocol, and MPTCP, wherein the selecting of the network protocol to be used by the application client from among the plurality of network protocols may include selecting the network protocol to be used by the application client, based on a parameter related to the RDMA protocol or MPTCP, which are provided in real-time by the edge data network or the at least one other edge data network.

According to an embodiment of the disclosure, the plurality of network protocols may include TCP, an RDMA protocol, and MPTCP, wherein the selecting of the network protocol to be used by the application client from among the plurality of network protocols may include: verifying whether the RDMA protocol is supported or MPTCP is supported in the electronic apparatus; and selecting the network protocol to be used by the application client, based on a result of the verifying.

According to an embodiment of the disclosure, the method may further include receiving, from the electronic apparatus, information about a standard pre-set to select a network protocol regarding the application client.

According to an embodiment of the disclosure, the plurality of network protocols may include TCP, an RDMA protocol, and MPTCP, and based on determining a network protocol to be applied to the application client is the RDMA protocol or MPTCP according to the pre-set standard, the method may further include distributing the edge application to the edge data network or at least one other edge data network connected to the edge data network.

According to an embodiment of the disclosure, the edge application may support the RDMA protocol or MPTCP, and the edge data network or the at least one other edge data network may support the RDMA protocol or MPTCP.

According to an embodiment of the disclosure, the selecting of the network protocol to be used by the application client from among the plurality of network protocols may include selecting the network protocol to be used by the application client, based on a network interface card (NIC) currently available from among NICs supporting the RDMA protocol or NICs supporting MPTCP, which are provided by the edge data network or the at least one other edge data network.

According to another embodiment of the disclosure, an electronic apparatus for identifying a network protocol to be used by an application client includes: a network interface; a memory in which a plurality of instructions are stored; and a processor configured to execute the plurality of instructions to: execute the application client; based on the application client being executed, transmit, to an edge data network, a request message for verifying the network protocol to be used by the application client; receive, from the edge data network, a response message indicating the network protocol to be used by the application client; updating a network protocol policy corresponding to the network protocol to be used by the application client to a data socket, based on the response message; select a network socket corresponding to the network protocol to be used by the application client by using the data socket; and receive, from the edge data network, data generated with respect to the application client by using the selected network socket.

According to an embodiment of the disclosure, the network protocol to be used by the application client may be selected by the edge data network from among a plurality of network protocols.

According to an embodiment of the disclosure, an edge application used to form a data session with the application client may be generated by the edge data network and the processor is further configured to receive the generated data from the edge data network, through the data session generated by using the edge application.

According to an embodiment of the disclosure, at least one other edge data network connected to the edge data network may be determined based on a pre-set standard related to distribution of the edge application, and the edge application may be distributed from the edge data network to the at least one other edge data network.

According to an embodiment of the disclosure, the plurality of network protocols may include a transmission control protocol (TCP), a remote direct memory access (RDMA) protocol, and a multipath transmission control protocol (MPTCP), and the network protocol to be used by the application client may be selected based on whether the RDMA protocol is supported or MPTCP is supported in the edge data network or the at least one other edge data network.

According to an embodiment of the disclosure, the plurality of network protocols may include TCP, an RDMA protocol, and MPTCP, and the network protocol to be used by the application client may be selected based on a network interface card (NIC) currently available from among NICs supporting the RDMA protocol or NICs supporting MPTCP, which are provided by the edge data network or the at least one other edge data network.

According to an embodiment of the disclosure the plurality of network protocols may include TCP, an RDMA protocol, and MPTCP, and the network protocol to be used by the application client may be selected based on whether the RDMA protocol is supported or MPTCP is supported in the electronic apparatus.

According to an embodiment of the disclosure, the processor may be further configured to transmit, to the edge data network, information about a standard pre-set to select a network protocol regarding the application client.

According to an embodiment of the disclosure, the plurality of network protocols may include TCP, an RDMA protocol, and MPTCP, and based on a network protocol to be applied to the application client being determined to be the RDMA protocol or MPTCP according to the pre-set standard, the edge application may be distributed to the edge data network or at least one other edge data network connected to the edge data network, the edge application may support the RDMA protocol or MPTCP, and the edge data network or the at least one other edge data network may support the RDMA protocol or MPTCP.

According to an embodiment of the disclosure, the network protocol to be used by the application client may be selected based on an NIC currently available from among NICs supporting the RDMA protocol or NICs supporting MPTCP, which are provided by the edge data network or the at least one other edge data network.

According to another embodiment of the disclosure, an edge data network for identifying a network protocol to be used by an application client of an electronic apparatus includes: a network interface; a memory in which a plurality of instructions are stored; and a processor configured to execute the plurality of instructions to: based on the electronic apparatus executing the application client, receive, from the electronic apparatus, a request message for verifying the network protocol to be used by the application client; select the network protocol to be used by the application client from among a plurality of network protocols; transmit, to the electronic apparatus, a response message indicating the network protocol to be used by the application client, based on a result of the selection; and transmitting, to the electronic apparatus, data generated with respect to the application client by using a network socket selected based on the response message.

Methods according to embodiments of the disclosure described in claims or specification may be implemented in a form of hardware, software, or a combination of hardware and software.

When implemented as software, a computer-readable storage medium or a computer program product storing one or more programs (software modules) may be provided. The one or more programs stored in the computer-readable storage medium or computer program product may be configured to be executed by one or more processors in an electronic apparatus. The one or more programs include instructions allowing the electronic apparatus to perform the methods according to the embodiments of the disclosure described in claims or specification.

Such a program (software module, software) may be stored in a non-volatile memory including a random access memory or a flash memory, a read only memory (ROM), an electrically erasable programmable read only memory (EEPROM), a magnetic disc storage device, a compact disc-ROM (CD-ROM), a digital versatile disc (DVD) or another type of optical storage device, or a magnetic cassette. Alternatively, the program may be stored in a memory including a combination of some or all of the above-mentioned storage media. Also, a plurality of such memories may be included.

Also, the program may be stored in an attachable storage device accessible through a communication network such as the Internet, the Intranet, LAN, wide LAN (WLAN), or a storage area network (SAN) or a combination thereof. Such a storage device may access an apparatus according to an embodiment of the disclosure through an external port. Also, a separate storage device on a communication network may access the apparatus according to an embodiment of the disclosure.

In the disclosure, the term "computer program product" or "computer-readable medium" may be used to collectively refer to non-transitory media including, but not limited to, computer memory, magnetic storage devices such as a hard disk installed in a hard disk drive, optical storage, electro-optic storage, semiconductor storage, and the like. The "computer program product" or "computer-readable recording medium" is provided to a software computer system including instructions for transmitting a request message for verifying a network protocol to be used by an application client, receiving a response message indicating the network protocol to be used by the application client, updating the network protocol to be used by the application client based on the response message, selecting a network socket corresponding to the updated network protocol, and receiving data from an edge data network using the selected network socket, according to the disclosure.

In specific embodiments of the disclosure, components of the disclosure are expressed in singular form or plural form according to the proposed specific embodiments. However, the singular or plural form is selected appropriately for a situation assumed for convenience of description, the disclosure is not limited to the singular or plural form, and an element expressed in a singular form may include a plurality of elements and elements expressed in a plural form may include a single element.

The embodiments of the disclosure provide an apparatus and method for effectively performing an MEC-based service.

Meanwhile, specific embodiments of the disclosure have been described in the detailed description, specific, but various modifications may be possible without departing from the scope of the disclosure. Therefore, the scope of the disclosure should not be limited to the described embodiments of the disclosure, but should be determined not only by the scope of following claims, but also by the equivalents of the claims.

What is claimed is:

1. A method performed by an edge data network including an edge enabler server and an edge application, the method comprising:
based on an execution of an application client of an electronic apparatus, receiving, by the edge enabler server, from an edge enabler client of the electronic apparatus, a request message for identifying a network protocol to be used by the application client; and
based on a remote direct memory access (RDMA) protocol being supported by the edge application, the RDMA protocol being supported for the application client, and a network interface card (NIC) supporting the RDMA protocol being included in the edge data network,
selecting, by the edge enabler server, the RDMA protocol as the network protocol to be used by the application client from among a plurality of network protocols;
transmitting, by the edge enabler server, to the edge enabler client, a response message indicating the RDMA protocol; and
transmitting, by the edge application, to the application client, data for the application client via a data session, wherein the data session is established between the edge application and the application client based on a network socket, and wherein the network socket is selected based on the RDMA protocol.

2. The method of claim 1, further comprising generating, by the edge enabler server, the edge application to form the data session with the application client.

3. The method of claim 2, further comprising:
determining, by the edge enabler server, at least one other edge data network connected to the edge data network, based on a pre-set standard related to distribution of the edge application; and
distributing, by the edge enabler server, the edge application to one of the at least one other edge data network.

4. The method of claim 3, wherein the plurality of network protocols comprise a transmission control protocol (TCP), the RDMA protocol, and a multipath transmission control protocol (MPTCP), wherein the selecting the RDMA protocol as the network protocol comprises:
identifying, by the edge enabler server, whether the at least one other edge data network supports the RDMA protocol; and
selecting, by the edge enabler server, the RDMA protocol as the network protocol to be used by the application client among the plurality of network protocols, further based on identifying that the at least one other edge network supports the RDMA protocol.

5. The method of claim 3, wherein the plurality of network protocols comprise a transmission control protocol (TCP), the RDMA protocol, and a multipath transmission control protocol (MPTCP), wherein the selecting the RDMA protocol as the network protocol comprises:
selecting, by the edge enabler server, the RDMA protocol as the network protocol to be used by the application client among the plurality of network protocols, further based on a parameter related to the RDMA protocol, which is provided in real-time by the edge data network or the at least one other edge data network.

6. The method of claim 2, further comprising receiving, by the edge enabler server, from the edge enabler client, information about a standard pre-set to select a network protocol regarding the application client.

7. The method of claim 6, wherein the plurality of network protocols comprise a transmission control protocol (TCP), the RDMA protocol, and a multipath transmission control protocol (MPTCP), wherein the selecting the RDMA protocol as the network protocol comprises:
selecting, by the edge enabler server, the RDMA protocol as the network protocol to be used by the application client further based on the pre-set standard; and
distributing the edge application to the edge data network or at least one other edge data network connected to the edge data network.

8. The method of claim 7,
wherein the edge application supports the RDMA protocol, and
wherein the edge data network or the at least one other edge data network supports the RDMA protocol.

9. An edge data network including an edge enabler server and an edge application, the edge data network comprising:
a processor; and
a memory storing one or more instructions executed by the processor,
wherein the one or more instructions comprise instructions for:

based on an execution of an application client of an electronic apparatus, receiving, by the edge enabler server, from an edge enabler client of the electronic apparatus, a request message for identifying a network protocol to be used by the application client;
based on a remote direct memory access (RDMA) protocol being supported by the edge application, the RDMA protocol being supported for the application client and a network interface card (NIC) supporting the RDMA protocol being included in the edge data network:
selecting, by the edge enabler server, the RDMA protocol as the network protocol to be used by the application client from among a plurality of network protocols;
transmitting, by the edge enabler server, to the edge enabler client, a response message indicating the RDMA protocol; and
transmitting, by the edge application, to the application client, data for the application client via a data session, wherein the data session is established between the edge application and the application client based on a network socket, and wherein the network socket is selected based on the RDMA protocol.

10. The edge data network of claim 9, wherein the one or more instructions further comprise instructions for generating, by the edge enabler server, the edge application to form the data session with the application client.

11. The edge data network of claim 10, wherein the one or more instructions further comprise instructions for:
determining, by the edge enabler server, at least one other edge data network connected to the edge data network, based on a pre-set standard related to distribution of the edge application; and
distributing, by the edge enabler server, the edge application to one of the at least one other edge data network.

12. The edge data network of claim 11,
wherein the plurality of network protocols comprise a transmission control protocol (TCP), the RDMA protocol, and a multipath transmission control protocol (MPTCP), and
wherein the one or more instructions further comprise instructions for:
identifying, by the edge enabler server, whether the at least one other edge data network supports the RDMA protocol; and
selecting, by the edge enabler server, the RDMA protocol as the network protocol to be used by the application client among the plurality of network protocols, further based on identifying that the at least one other edge data network supports the RDMA protocol.

13. The edge data network of claim 11,
wherein the plurality of network protocols comprise a transmission control protocol (TCP), the RDMA protocol, and a multipath transmission control protocol (MPTCP), and
wherein the one or more instructions further comprise instructions for selecting, by the edge enabler server, the RDMA protocol as the network protocol to be used by the application client among the plurality of network protocols, further based on a parameter related to the RDMA protocol, which is provided in real-time by the edge data network or the at least one other edge data network.

14. The edge data network of claim 10, wherein the one or more instructions further comprise instructions for receiving, by the edge enabler server, from the edge enabler client, information about a standard pre-set to select a network protocol regarding the application client.

15. The edge data network of claim 14,
wherein the plurality of network protocols comprise a transmission control protocol (TCP), the RDMA protocol, and a multipath transmission control protocol (MPTCP), and
wherein the one or more instructions further comprise instructions for:
selecting, by the edge enabler server, the RDMA protocol as the network protocol to be used by the application client further based on the pre-set standard; and
distributing the edge application to the edge data network or at least one other edge data network connected to the edge data network.

16. The edge data network of claim 15,
wherein the edge application supports the RDMA protocol, and
wherein the edge data network or the at least one other edge data network supports the RDMA protocol.

* * * * *